United States Patent
Hayashi et al.

(10) Patent No.: US 9,370,712 B2
(45) Date of Patent: Jun. 21, 2016

(54) INFORMATION PROCESSING SYSTEM, INFORMATION PROCESSING APPARATUS, STORAGE MEDIUM HAVING INFORMATION PROCESSING PROGRAM STORED THEREIN, AND IMAGE DISPLAY METHOD FOR CONTROLLING VIRTUAL OBJECTS BASED ON AT LEAST BODY STATE DATA AND/OR TOUCH POSITION DATA

(75) Inventors: Yugo Hayashi, Kyoto (JP); Keiichi Minato, Kyoto (JP)

(73) Assignee: Nintendo Co., Ltd., Koyoto (JP)

( * ) Notice: Subject to any disclaimer, the term of this patent is extended or adjusted under 35 U.S.C. 154(b) by 1058 days.

(21) Appl. No.: 13/352,091

(22) Filed: Jan. 17, 2012

(65) Prior Publication Data
US 2012/0229510 A1    Sep. 13, 2012

(30) Foreign Application Priority Data

| Mar. 8, 2011 | (JP) | 2011-050039 |
|---|---|---|
| Apr. 5, 2011 | (JP) | 2011-083453 |
| Apr. 5, 2011 | (JP) | 2011-083454 |
| Apr. 5, 2011 | (JP) | 2011-083455 |
| Apr. 5, 2011 | (JP) | 2011-083456 |
| May 24, 2011 | (JP) | 2011-115402 |
| May 24, 2011 | (JP) | 2011-115403 |
| May 24, 2011 | (JP) | 2011-115404 |
| May 27, 2011 | (JP) | 2011-118901 |
| May 27, 2011 | (JP) | 2011-118902 |
| Jun. 1, 2011 | (JP) | 2011-123644 |
| Jun. 1, 2011 | (JP) | 2011-123645 |
| Jun. 1, 2011 | (JP) | 2011-123646 |
| Oct. 13, 2011 | (JP) | 2011-225538 |

(51) Int. Cl.
*G06T 3/20* (2006.01)
*G06T 3/60* (2006.01)
(Continued)

(52) U.S. Cl.
CPC ............... *A63F 13/06* (2013.01); *A63F 13/211* (2014.09); *A63F 13/26* (2014.09); *A63F 13/428* (2014.09);
(Continued)

(58) Field of Classification Search
CPC ............. G06T 3/20; G06T 3/60; A63F 13/26; A63F 2300/301
See application file for complete search history.

(56) References Cited

U.S. PATENT DOCUMENTS

| 5,838,909 A | 11/1998 | Roy et al. |
|---|---|---|
| 5,853,324 A | 12/1998 | Kami et al. |

(Continued)

FOREIGN PATENT DOCUMENTS

| EP | 1 726 342 A2 | 11/2006 |
|---|---|---|
| EP | 2 218 485 | 8/2010 |

(Continued)

OTHER PUBLICATIONS

Dec. 5, 2013 Office Action in U.S. Appl. No. 13/283,032, 35 pages.
(Continued)

*Primary Examiner* — Jeffery A Brier
(74) *Attorney, Agent, or Firm* — Nixon & Vanderhye, P.C.

(57) ABSTRACT

An action of a first object placed in a virtual world is controlled on the basis of body state data output from a portable display apparatus. An action of a second object placed in the virtual world is controlled on the basis of touch position data based on a touch position on a touch panel provided on a surface of a display screen of the portable display apparatus. Then, a first image including at least a part of the first object and at least a part of the second object is generated, and the first image is displayed on the portable display apparatus.

30 Claims, 21 Drawing Sheets

(51) Int. Cl.

| | | |
|---|---|---|
| *G06T 11/60* | (2006.01) | |
| *A63F 13/20* | (2014.01) | |
| *A63F 13/428* | (2014.01) | |
| *A63F 13/26* | (2014.01) | |
| *A63F 13/211* | (2014.01) | |
| *A63F 13/5255* | (2014.01) | |
| *G06F 3/01* | (2006.01) | |
| *G06F 3/0481* | (2013.01) | |

(52) U.S. Cl.
 CPC ............ *A63F 13/5255* (2014.09); *G06F 3/011* (2013.01); *G06T 3/20* (2013.01); *G06T 3/60* (2013.01); *G06T 11/60* (2013.01); *A63F 2300/105* (2013.01); *A63F 2300/1068* (2013.01); *A63F 2300/301* (2013.01); *A63F 2300/403* (2013.01); *A63F 2300/6045* (2013.01); *A63F 2300/6676* (2013.01); *A63F 2300/6684* (2013.01); *A63F 2300/8005* (2013.01); *G06F 3/04815* (2013.01)

(56) References Cited

U.S. PATENT DOCUMENTS

| | | |
|---|---|---|
| 6,201,554 B1 | 3/2001 | Lands |
| 6,225,977 B1 | 5/2001 | Li |
| 6,290,600 B1 | 9/2001 | Glasson |
| 6,416,410 B1 | 7/2002 | Abou-Samra et al. |
| 6,450,886 B1 | 9/2002 | Oishi et al. |
| 6,483,540 B1 | 11/2002 | Akasawa et al. |
| 6,500,070 B1 | 12/2002 | Tomizawa et al. |
| 6,540,614 B1 | 4/2003 | Nishino et al. |
| 6,712,703 B2 | 3/2004 | Miyamoto et al. |
| 6,762,746 B2 | 7/2004 | Fukuda |
| 6,908,388 B2 | 6/2005 | Shimizu et al. |
| 6,966,837 B1 | 11/2005 | Best |
| 7,326,117 B1 | 2/2008 | Best |
| 7,588,498 B2 | 9/2009 | Iizuka et al. |
| 2002/0006827 A1 | 1/2002 | Ogata et al. |
| 2002/0022518 A1 | 2/2002 | Okuda et al. |
| 2002/0140666 A1 | 10/2002 | Bradski |
| 2002/0165028 A1 | 11/2002 | Miyamoto et al. |
| 2003/0134665 A1 | 7/2003 | Kato et al. |
| 2003/0216176 A1 | 11/2003 | Shimizu et al. |
| 2003/0220142 A1 | 11/2003 | Siegel |
| 2004/0046736 A1* | 3/2004 | Pryor et al. ............ 345/156 |
| 2004/0092309 A1 | 5/2004 | Suzuki |
| 2004/0219980 A1 | 11/2004 | Bassett et al. |
| 2004/0229687 A1 | 11/2004 | Miyamoto et al. |
| 2005/0014543 A1 | 1/2005 | Itoi et al. |
| 2005/0119053 A1 | 6/2005 | Suzuki et al. |
| 2005/0130738 A1 | 6/2005 | Miyamoto et al. |
| 2005/0187015 A1 | 8/2005 | Suzuki et al. |
| 2005/0255900 A1 | 11/2005 | Takahashi et al. |
| 2006/0017692 A1 | 1/2006 | Wehrenberg et al. |
| 2006/0040740 A1 | 2/2006 | DiDato |
| 2006/0046848 A1 | 3/2006 | Abe et al. |
| 2006/0262120 A1 | 11/2006 | Rosenberg |
| 2006/0262210 A1 | 11/2006 | Smith et al. |
| 2006/0266200 A1 | 11/2006 | Goodwin |
| 2007/0007143 A1 | 1/2007 | Hayashi et al. |
| 2007/0008298 A1 | 1/2007 | Ohta |
| 2007/0015577 A1 | 1/2007 | Hsu |
| 2007/0018968 A1 | 1/2007 | Iwamoto et al. |
| 2007/0072662 A1 | 3/2007 | Templeman |
| 2007/0073196 A1 | 3/2007 | Tanaka et al. |
| 2007/0208528 A1 | 9/2007 | Seo et al. |
| 2007/0265085 A1 | 11/2007 | Miyamoto et al. |
| 2008/0009332 A1 | 1/2008 | Kake |
| 2008/0042973 A1 | 2/2008 | Zhao et al. |
| 2008/0062198 A1 | 3/2008 | Takahashi et al. |
| 2008/0070686 A1 | 3/2008 | Satsukawa et al. |
| 2008/0096654 A1 | 4/2008 | Mondesir et al. |
| 2008/0096657 A1 | 4/2008 | Benoist |
| 2008/0102951 A1 | 5/2008 | Eto et al. |
| 2008/0216974 A1 | 9/2008 | Pitcher et al. |
| 2008/0254821 A1 | 10/2008 | Kusuda et al. |
| 2008/0261696 A1 | 10/2008 | Yamazaki et al. |
| 2008/0268956 A1 | 10/2008 | Suzuki |
| 2008/0274813 A1 | 11/2008 | Sato |
| 2008/0318681 A1 | 12/2008 | Rofougaran et al. |
| 2009/0002391 A1* | 1/2009 | Williamson ......... G06F 1/1626 345/619 |
| 2009/0069096 A1 | 3/2009 | Nishimoto |
| 2009/0070093 A1 | 3/2009 | Nakanishi et al. |
| 2009/0093305 A1 | 4/2009 | Okamoto et al. |
| 2009/0156308 A1 | 6/2009 | Hsu |
| 2009/0187371 A1 | 7/2009 | Ohta |
| 2009/0244064 A1 | 10/2009 | Inokuchi et al. |
| 2009/0298585 A1 | 12/2009 | Cannon et al. |
| 2009/0303204 A1 | 12/2009 | Nasiri et al. |
| 2010/0045666 A1 | 2/2010 | Kornmann et al. |
| 2010/0045667 A1 | 2/2010 | Kornmann et al. |
| 2010/0048357 A1 | 2/2010 | Nakagawa et al. |
| 2010/0053322 A1 | 3/2010 | Marti et al. |
| 2010/0058254 A1 | 3/2010 | Narita |
| 2010/0081505 A1 | 4/2010 | Alten et al. |
| 2010/0087248 A1 | 4/2010 | Takahashi |
| 2010/0137063 A1 | 6/2010 | Shirakawa et al. |
| 2010/0169110 A1 | 7/2010 | Sawano et al. |
| 2010/0178988 A1 | 7/2010 | Izuno et al. |
| 2010/0188937 A1 | 7/2010 | Watanabe |
| 2010/0214216 A1 | 8/2010 | Nasiri et al. |
| 2010/0245236 A1 | 9/2010 | Takayama |
| 2010/0245685 A1 | 9/2010 | Onodera et al. |
| 2010/0279770 A1 | 11/2010 | Ikeda |
| 2010/0283723 A1 | 11/2010 | Konishi |
| 2010/0285882 A1 | 11/2010 | Hsu |
| 2010/0292006 A1 | 11/2010 | Terrell et al. |
| 2010/0302238 A1 | 12/2010 | Yonemori et al. |
| 2010/0304857 A1 | 12/2010 | Suzuki et al. |
| 2011/0039618 A1 | 2/2011 | Ichiyanagi et al. |
| 2011/0054359 A1 | 3/2011 | Sazonov et al. |
| 2011/0070953 A1 | 3/2011 | Konishi |
| 2011/0077088 A1 | 3/2011 | Hayashi et al. |
| 2011/0092289 A1 | 4/2011 | Dagman et al. |
| 2011/0159960 A1 | 6/2011 | Ueshima et al. |
| 2011/0169928 A1* | 7/2011 | Gassel et al. .................... 348/53 |
| 2011/0172013 A1 | 7/2011 | Shirasaka et al. |
| 2011/0244956 A1 | 10/2011 | Sakakibara et al. |
| 2011/0244957 A1 | 10/2011 | Nishimura et al. |
| 2011/0250964 A1 | 10/2011 | Kulas |
| 2011/0250965 A1 | 10/2011 | Kulas et al. |
| 2011/0281650 A1 | 11/2011 | Yamazaki et al. |
| 2011/0300930 A1 | 12/2011 | Hsu |
| 2011/0306425 A1 | 12/2011 | Rivard et al. |
| 2012/0014558 A1 | 1/2012 | Stafford et al. |
| 2012/0017236 A1 | 1/2012 | Stafford et al. |
| 2012/0079080 A1 | 3/2012 | Pishevar |
| 2012/0086630 A1 | 4/2012 | Zhu et al. |
| 2012/0086631 A1 | 4/2012 | Osman et al. |
| 2012/0115596 A1 | 5/2012 | Otani |
| 2012/0115609 A1 | 5/2012 | Sugiyama et al. |
| 2013/0017876 A1 | 1/2013 | Koumbourlis |
| 2013/0038532 A1 | 2/2013 | Okura et al. |

FOREIGN PATENT DOCUMENTS

| | | |
|---|---|---|
| EP | 2 497 545 A2 | 9/2012 |
| EP | 2 497 545 A3 | 10/2012 |
| EP | 2015854 | 11/2013 |
| GB | 2 442 259 | 4/2008 |
| GB | 2 442 259 A | 4/2008 |
| JP | H07-36612 A | 2/1995 |
| JP | H9-091110 | 4/1997 |
| JP | H 09-294260 | 11/1997 |
| JP | H11-90043 A | 4/1999 |
| JP | 2000-316143 | 11/2000 |
| JP | 2000-325653 | 11/2000 |
| JP | 2001-34247 A | 2/2001 |
| JP | 2002-298160 | 10/2002 |
| JP | 2002-325963 | 11/2002 |
| JP | 2003-61940 | 3/2003 |
| JP | 2003-512142 | 4/2003 |

(56) References Cited

FOREIGN PATENT DOCUMENTS

| JP | 2003-325974 A | 11/2003 |
|---|---|---|
| JP | 2003-334379 | 11/2003 |
| JP | 2004-030408 | 1/2004 |
| JP | 2004-159781 | 6/2004 |
| JP | 2004-329744 | 11/2004 |
| JP | 2005-103154 | 4/2005 |
| JP | 2005-137921 | 6/2005 |
| JP | 2005-230263 | 9/2005 |
| JP | 2006-31307 | 2/2006 |
| JP | 2006-39635 | 2/2006 |
| JP | 2007-301048 | 11/2007 |
| JP | 2008-15679 | 1/2008 |
| JP | 2008-264195 | 11/2008 |
| JP | 2008-264402 | 11/2008 |
| JP | 2009-172010 | 8/2009 |
| JP | 2009-237680 | 10/2009 |
| JP | 2009-536058 | 10/2009 |
| JP | 2010-055511 | 3/2010 |
| JP | 2010-233705 | 10/2010 |
| JP | 2010-259611 | 11/2010 |
| JP | 2010-273839 | 12/2010 |
| JP | 2011-015752 | 1/2011 |
| JP | 2011-19810 | 2/2011 |
| JP | 2011-019817 | 2/2011 |
| JP | 2011-53838 | 3/2011 |
| JP | 2011-056049 | 3/2011 |
| WO | 00/67864 | 11/2000 |
| WO | WO 01/30470 A1 | 5/2001 |
| WO | WO 2004/103244 | 2/2004 |
| WO | 2010/060211 | 6/2010 |
| WO | 2011/004629 | 1/2011 |

OTHER PUBLICATIONS

U.S. Office Action dated Jun. 27, 2014 issued in co-pending U.S. Appl. No. 13/283,072.
Final Office Action (36 pages) dated Jul. 2, 2014 issued in co-pending U.S. Appl. No. 13/283,032.
Feb. 20, 2014 Office Action in U.S. Appl. No. 13/333,045, 24 pages.
Office Action in corresponding U.S. Appl. No. 13/287,320 dated Feb. 27, 2015.
Office Action in corresponding U.S. Appl. No. 13/343,913 dated Mar. 4, 2015.
Jul. 18, 2013 Office Action in U.S. Appl. No. 13/362,255, 20 pages.
Office Action dated Aug. 20, 2014 issued in U.S. Appl. No. 13/343,913.
Oct. 17, 2013 Office Action in U.S. Appl. No. 13/287,320, 65 pages.
Office Action in co-pending U.S. Appl. No. 13/271,510 dated Sep. 18, 2014.
Office Action in co-pending U.S. Appl. No. 13/287,320 dated Oct. 3, 2014.
Office Action in co-pending U.S. Appl. No. 13/283,072 dated Oct. 10, 2014.
Nov. 21, 2012 Office Action from U.S. Appl. No. 13/271,510, 22 pages.
Sep. 4, 2012 European Search Report for EP 11185811.4, 7 pages.
Sep. 4, 2012 European Search Report for EP 11186930.1, 7 pages.
Oct. 2, 2012 European Search Report for EP 11186933.5, 7 pages.
Sep. 4, 2012 European Search Report for EP 11187473.1, 7 pages.
Sep. 7, 2012 European Search Report for EP 12156629.3, 7 pages.
European Search Report EP Application No. 12 15 0272.8 dated Oct. 28, 2014.
European Search Report EP Application No. 12 15 3067.9 dated Oct. 29, 2014.
Apr. 10, 2013 Office Action from U.S. Appl. No. 13/277,561, 43 pages.
Aug. 29, 2013 Office Action in U.S. Appl. No. 13/362,289, 71 pages.
Aug. 29, 2013 Office Action in U.S. Appl. No. 13/400,944, 58 pages.
Aug. 29, 2013 Office Action in U.S. Appl. No. 13/402,026, 87 pages.
Aug. 30, 2013 Office Action in U.S. Appl. No. 13/401,054, 71 pages.
Oct. 1, 2013 Search Report in EP 12156630.1, 9 pages.
Office Action dated Dec. 10, 2014 in corresponding U.S. Appl. No. 13/283,032.
Office Action issued Japanese Patent Appln. No. 2011-083454 dated Jan. 22, 2015 (with translation).
Office Action issued Japanese Patent Appln. Nos. 2011-123645 and 2011-123646 dated Feb. 20, 2015.
The Legend of Zelda: Ocarina of Time, Nintendo Dream, Kabushiki Kaisha Anbitto, Mar. 1, 2011, vol. 203 p. 11.
European Search Report for EP11194630.7 dated Feb. 16, 2015.
Office Action dated Jun. 30, 2015 in corresponding U.S. Appl. No. 13/287,320.
Office Action in corresponding Japanese Patent Application No. 2011-225538 mailed May 21, 2015.
Wei et al., "Novel Interface for First Person Shooting Games on PDAs," 2008, pp. 113-121.
Office Action in corresponding U.S. Appl. No. 13/343,913 dated Jul. 29, 2015.
Decision of Refusal in corresponding Japanese Appln. No. 2011-123645 dated Aug. 6, 2015.
Oct. 17, 2013 Office Action is U.S. Appl. No. 13/287,320, 65 pages.
European Search Report in corresponding European Application No. 14166174.4 dated Jan. 14, 2016.
Office Action dated Jan. 20, 2016, issued in corresponding U.S. Appl. No. 13/287,320, filed Nov. 2, 2011.
"Virtual Camera System." Wikipedia. Wikimedia Foundation, Feb. 25, 2011. Web. Jan. 7, 2016. <https://en.wikipedia.org/w/index.php?fitle=Virtual_camera_system&oldid=415917860>.
Japanese Notice of Reasons for Refusal dated Mar. 16, 2015 in corresponding JP Application No. 2011-118902.
"Minna no Ennichi," Shukan Famitsu, vol. 27, No. 10, Enterbrain Inc., Feb. 23, 2012, pp. 32-33.
"Close-up!," Mobile Software Palm OS, Mobile Press, vol. 5, No. 1, Japan—Gijutsu-Hyohron Co., Ltd., Feb. 24, 2005, p. 213.
"iPhone 3G Perfect Guide," Mac People, vol. 14, No. 9, Japan, ASCII Media Works, Inc., Sep. 1, 2008, pp. 122-127.
"The Legend of Zelda: Ocarina of Time 3D," Famitsu DS+Wii, Enterbrain Inc., Apr. 21, 2011, vol. 13, No. 6.
Samurai Slash, [online], Aug. 27, 2015, the date of publication: Jun. 18, 2009 URL:http://raku-job.jp/blog/2009/06/iponeipod-touch.html.
Office Action dated Aug. 28, 2015 issued in corresponding JP Patent Application No. 2011-123644.
Office Action dated Sep. 1, 2015 issued in corresponding JP Patent Application No. 2011-118901 and English Translation.
Office Action dated Sep. 1, 2015 issued in corresponding JP Patent Application No. 2011-115402 and English Translation.
Office Action dated Sep. 1, 2015 issued in corresponding JP Patent Application No. 2011-115404 and English Translation.

\* cited by examiner

F I G. 4
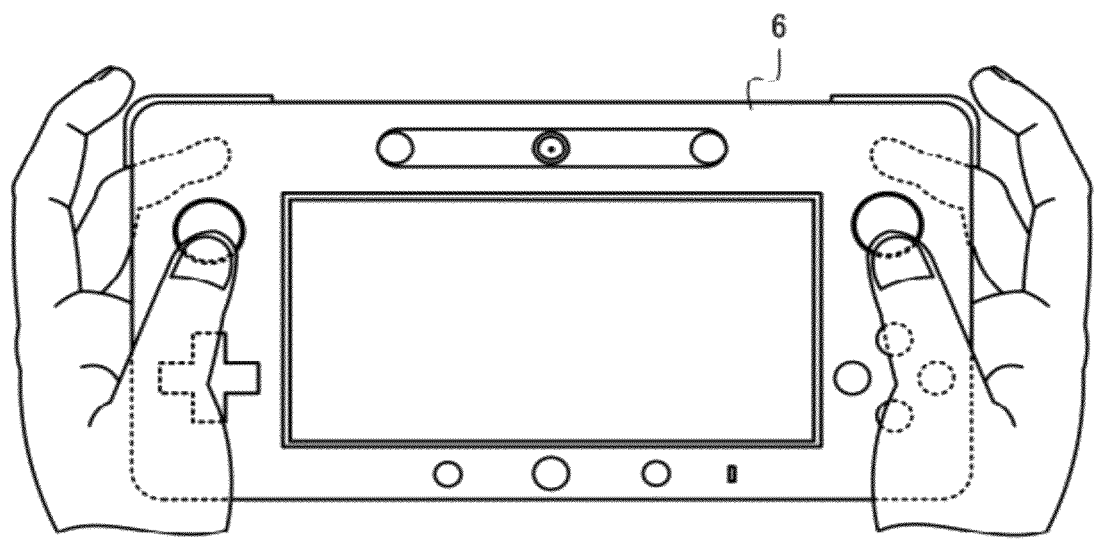

F I G. 6
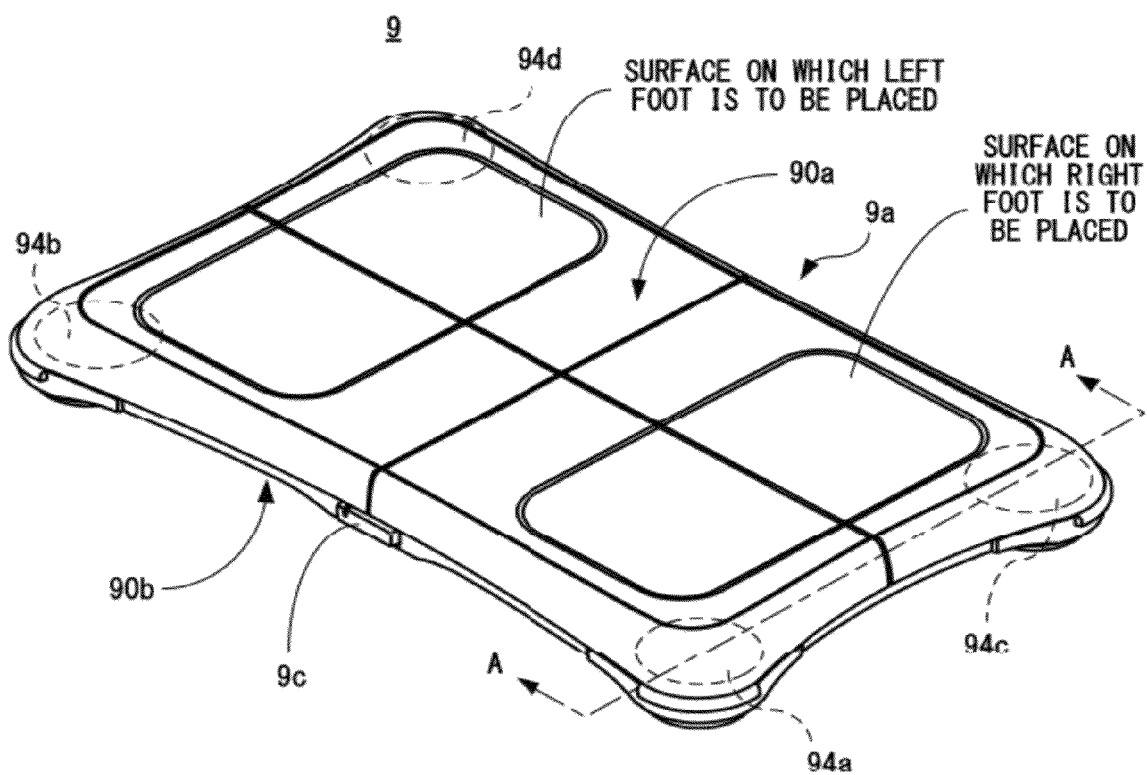

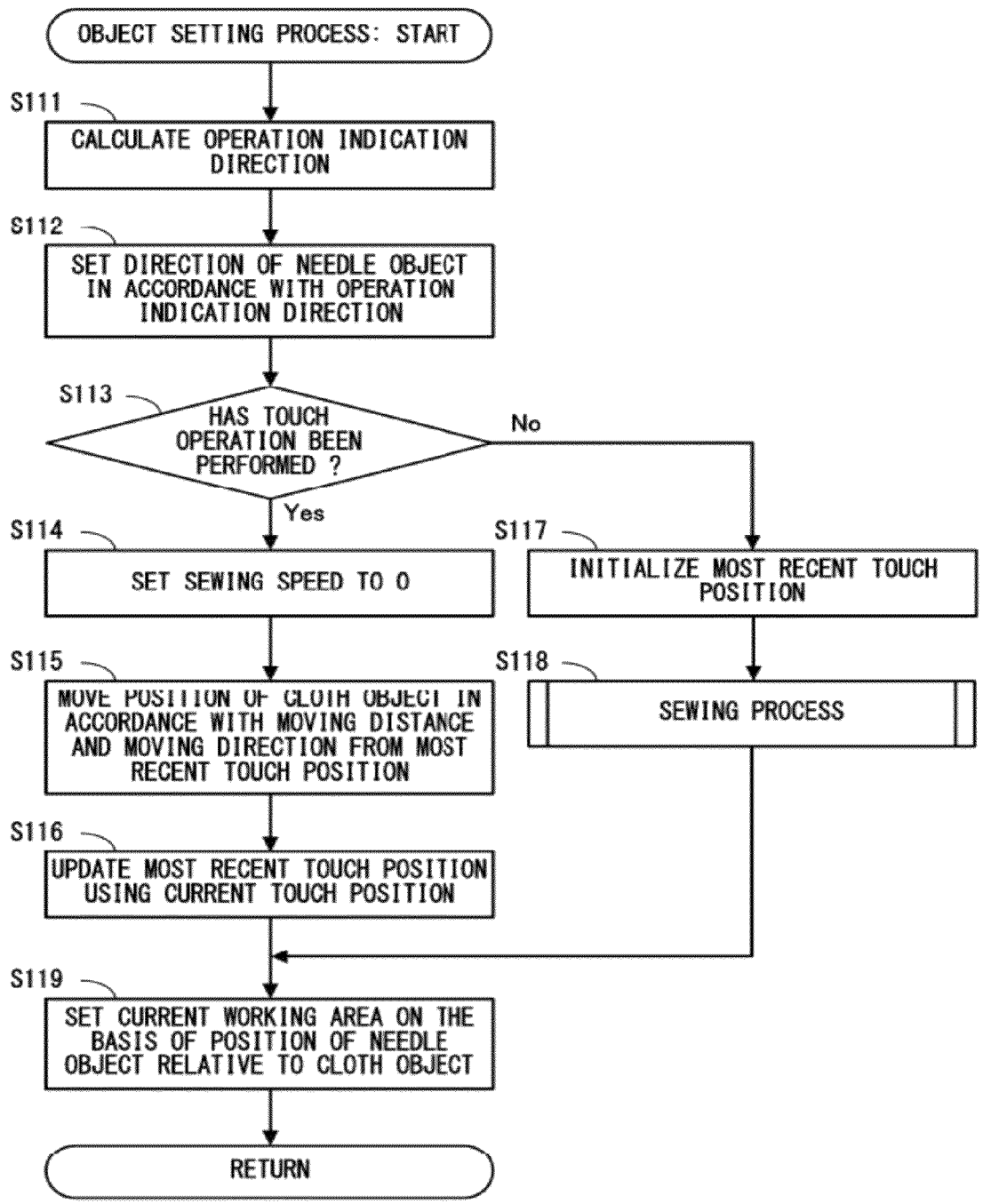

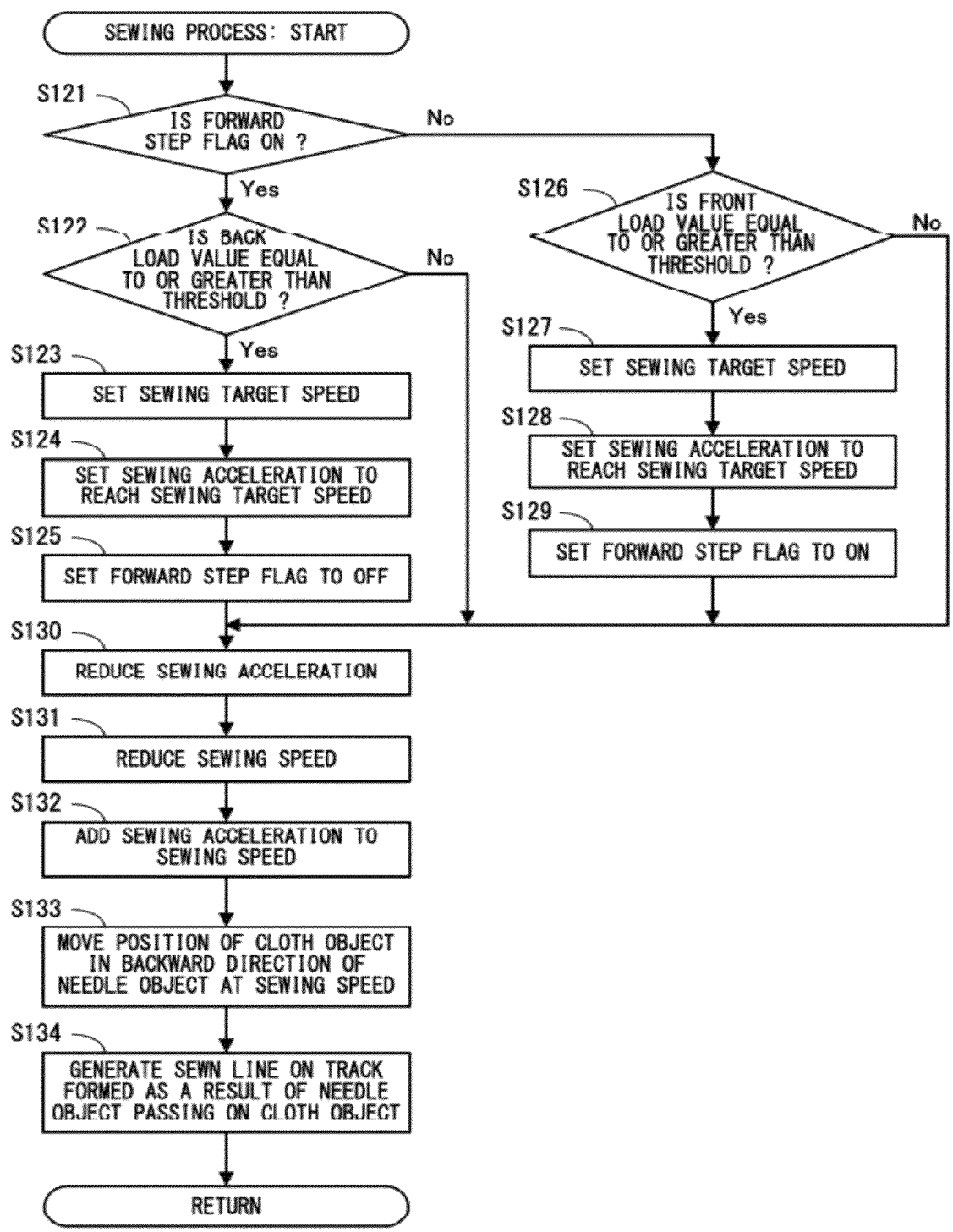

INFORMATION PROCESSING SYSTEM, INFORMATION PROCESSING APPARATUS, STORAGE MEDIUM HAVING INFORMATION PROCESSING PROGRAM STORED THEREIN, AND IMAGE DISPLAY METHOD FOR CONTROLLING VIRTUAL OBJECTS BASED ON AT LEAST BODY STATE DATA AND/OR TOUCH POSITION DATA

CROSS REFERENCE TO RELATED APPLICATION

The disclosures of Japanese Patent Application No. 2011-050039, filed on Mar. 8, 2011, Japanese Patent Application No. 2011-083453, Japanese Patent Application No. 2011-083454, Japanese Patent Application No. 2011-083455, and Japanese Patent Application No. 2011-083456, filed on Apr. 5, 2011, Japanese Patent Application No. 2011-115402, Japanese Patent Application No. 2011-115403, and Japanese Patent Application No. 2011-115404, filed on May 24, 2011, Japanese Patent Application No. 2011-118901 and Japanese Patent Application No. 2011-118902, filed on May 27, 2011, Japanese Patent Application No. 2011-123644, Japanese Patent Application No. 2011-123645, and Japanese Patent Application No. 2011-123646, filed on Jun. 1, 2011, and Japanese Patent Application No. 2011-225538, filed on Oct. 13, 2011, are incorporated herein by reference.

FIELD

The technique shown here relates to a storage medium having stored thereon an information processing program, an information processing apparatus, an information processing system, and an information processing method, and in particular, relates to a storage medium having stored thereon an information processing program that, for example, displays a virtual world, and an information processing apparatus, an information processing system, and an information processing method that, for example, display a virtual world.

BACKGROUND AND SUMMARY

Conventionally, there is a game where a user operates a mobile hand-held terminal (hand-held game apparatus) while holding it, and an event is executed in accordance with the attitude and the position of the mobile hand-held terminal in real space. The mobile hand-held terminal includes a sensor that detects the position and the attitude of the mobile hand-held terminal in real space, and the user of the terminal advances the game by moving the mobile hand-held terminal and changing the attitude of the mobile hand-held terminal. For example, in accordance with the attitude of the mobile hand-held terminal in real space, the mobile hand-held terminal scrolls an image displayed on a display screen of the mobile hand-held terminal. Then, a scope is displayed at the center of the display screen of the mobile hand-held terminal, so that when a predetermined button of the mobile hand-held terminal has been pressed in the state where a virtual object (e.g., an insect object) is included in the scope, it is considered that the virtual object has been caught in the scope.

The mobile hand-held terminal described above, however, merely allows the operation of scrolling the image on the basis of the attitude of the mobile hand-held terminal, and placing the virtual object in a fixed manner at the center of the display screen of the mobile hand-held terminal. It is not possible to, for example, control the virtual object per se, the scope, and the like in accordance with the operation of a user. Thus, it is merely possible to perform the operation of scrolling an image, which leads to monotonous operations. This may possibly reduce the verisimilitude and the fun of operations.

Therefore, it is an object of the exemplary embodiment to provide a storage medium having stored thereon an information processing program capable of, when a plurality of objects appear in a virtual world, varying the operations of a user to be performed on the objects, and an information processing apparatus, an information processing system, and an information processing method that are capable of, when a plurality of objects appear in a virtual world, varying the operations of a user to be performed on the objects.

To achieve the above object, the exemplary embodiment may employ, for example, the following configurations. It is understood that when the description of the scope of the appended claims is interpreted, the scope should be interpreted only by the description of the scope of the appended claims. If the description of the scope of the appended claims contradicts the description of these columns, the description of the scope of the appended claims has priority.

In an exemplary configuration of a computer-readable storage medium having stored thereon an information processing program according to the exemplary embodiment, the information processing program is executed by a computer of an information processing apparatus capable of displaying an image on a portable display apparatus that outputs at least body state data based on an attitude and/or a motion of the portable display apparatus body and touch position data based on a touch position on a touch panel provided in the portable display apparatus. The information processing program causes the computer to execute: controlling, on the basis of the body state data, an action of a first object placed in a virtual world; controlling, on the basis of the touch position data, an action of a second object placed in the virtual world; generating a first image including at least a part of the first object and at least a part of the second object; and displaying the first image on the portable display apparatus.

It should be noted that the information processing apparatus may be an apparatus that performs game processing and generates an image based on the game processing, or may be a versatile apparatus such as a general personal computer. The portable display apparatus may have a size small enough to be carried by a user. Typically, the portable display apparatus may be a display apparatus that allows the user to view an image displayed thereon by holding it with both hands. Further, as in a terminal apparatus according to the embodiment described later, the portable display apparatus may or may not include components other than: means for outputting at least data based on the attitude and/or the motion of the portable display apparatus body; means for outputting touch position data based on a touch position on a touch panel provided on a surface of a display screen of the portable display apparatus; and a display screen that displays the first image.

Based on the above, when the first object and the second object appear in the virtual world, it is possible to control the action of the first object by an operation based on the attitude and/or the motion of the portable display apparatus body, and it is possible to control the action of the second object by a touch operation performed on the touch panel provided on a display screen of the portable display apparatus. This makes it possible to vary the operations of a user to be performed on a plurality of objects.

In addition, the information processing program may further cause the computer to execute calculating the attitude and/or the motion of the portable display apparatus on the basis of the body state data. In this case, the action of the first object may be controlled on the basis of the calculated attitude and/or motion of the portable display apparatus.

Based on the above, it is possible to calculate the attitude and/or the motion of the portable display apparatus using the body state data output from the portable display apparatus, and control the action of the first object on the basis of the attitude and/or the motion of the portable display apparatus.

In addition, the action of the first object may be controlled on the basis of the attitude and/or the motion of the portable display apparatus such that the first object rotates. The action of the second object may be controlled on the basis of the touch position data such that the second object moves.

Based on the above, the user can perform various operations such as: causing the first object to rotate, by performing the operation based on the attitude and/or the motion of the portable display apparatus body; and causing the second object to move, by performing the touch operation on the touch panel provided on the display screen of the portable display apparatus.

In addition, the action of the first object may be controlled such that the first object rotates relative to the second object. The action of the second object may be controlled such that the second object moves relative to the first object.

Based on the above, the user can perform various operations such as: causing the first object to rotate relative to the second object, by performing the operation based on the attitude and/or the motion of the portable display apparatus body; and causing the second object to move relative to the first object, by performing the touch operation on the touch panel provided on the display screen of the portable display apparatus.

In addition, the information processing program may further cause the computer to execute acquiring data based on a load applied to a load detection device. In this case, the second object may be controlled on the basis of the acquired data so as to move in a moving direction defined by a direction of the first object.

It should be noted that the load detection device may be, as an example, a device that detects a load applied to the load detection device with at least a part of the user's body placed thereon, and is turned on/off in accordance with the load. Such a device may be: one operated by the user mounted thereon with both soles in surface contact with the top surface of the device; one operated by the user with only one foot placed on the top surface of the device; one operated by the user with another part of the body (e.g., a hand) placed on the device; or the like.

Based on the above, it is also possible, by the operation performed by the user using the load detection device, to cause the second object to move in the direction defined by the direction of the first object. This enables the user to perform the operation of causing the second object to move relative to the first object using the load detection device, while adjusting the moving direction of the second object by moving the portable display apparatus while viewing the first image on the portable display apparatus, and also adjusting the relative positional relationship between the first object and the second object by operating the touch panel provided on the display screen on which the first image is displayed. This enables the user to perform an operation in an unprecedented operation environment.

In addition, only when the touch position data indicates that a touch operation is not being performed on the touch panel, the second object may be controlled on the basis of the acquired data so as to move.

Based on the above, during the touch operation performed on the touch panel, the operation performed on the second object using the load detection device becomes invalid, and the operation performed on the second object using the touch operation has priority.

In addition, the information processing program may further cause the computer to execute calculating, on the basis of the touch position data, a displacement of the touch position input to the touch panel. In this case, the second object may be controlled on the basis of the displacement of the touch position so as to move.

Based on the above, it is possible to cause the second object to move in the virtual world, by performing the operation of changing the touch position on the touch panel, such as the drag operation performed on the touch panel.

In addition, a moving direction in which the second object is to be caused to move may be calculated on the basis of a direction of the displacement of the touch position, and the second object may be controlled so as to move in the moving direction.

Based on the above, the moving direction of the second object is set on the basis of the direction in which the touch position on the touch panel is changed. This makes it possible to cause the second object to move in the direction desired by the user.

In addition, a direction corresponding to the direction of the displacement and included in the virtual world displayed so as to overlap the displacement of the touch position may be calculated as the moving direction, and the second object may be controlled so as to move in the moving direction.

Based on the above, it is possible to cause the second object to move in the same direction as the direction in which the touch position on the touch panel is changed. This makes it possible to cause the second object to move in an intuitive manner.

In addition, a moving distance at which the second object is to be caused to move may be calculated on the basis of an amount of the displacement of the touch position, and the second object may be controlled so as to move at the moving distance.

Based on the above, the moving distance of the second object is set on the basis of the amount of change in the touch position on the touch panel. This makes it possible to cause the second object to move at the distance desired by the user.

In addition, a distance corresponding to the amount of the displacement and included in the virtual world displayed so as to overlap the displacement of the touch position may be calculated as the moving distance, and the second object may be controlled so as to move at the moving distance.

Based on the above, it is possible to cause the second object to move at the same distance as the amount of change in the touch position on the touch panel. This makes it possible to cause the second object to move in an intuitive manner.

In addition, at least an attitude and/or a motion of the portable display apparatus that are obtained by rotating the portable display apparatus about a perspective direction of, and perpendicular to, a display screen of the portable display apparatus may be calculated. The action of the first object may be controlled in accordance with the attitude and/or the motion of the portable display apparatus that are obtained by rotating the portable display apparatus about the perspective direction.

Based on the above, it is possible to cause the first object to take action in the virtual world, by moving the portable display apparatus so as to rotate (roll) about the perspective direction of the display screen of the portable display apparatus.

In addition, the action of the first object may be controlled such that in accordance with a direction of rotation in which the portable display apparatus rotates about the perspective direction, the first object rotates or moves about a predetermined direction set in the virtual world and in a direction opposite to the direction of rotation.

Based on the above, when the portable display apparatus has been moved so as to rotate (roll) about the perspective direction of the display screen of the portable display apparatus, the first object displayed on the display screen rotates or moves in the direction opposite to the direction of rotation of the display screen. This makes it possible to, even when the display screen of the portable display apparatus has rotated in real space, display the first object with such a motion as not to follow the rotation of the portable display apparatus.

In addition, the action of the first object may be controlled such that the first object rotates or moves in accordance with an angle by which a facing direction of the portable display apparatus body changes about the perspective direction.

Based on the above, the user can control the action of the first object by changing the direction of the portable display apparatus.

In addition, the action of the first object may be controlled such that the first object rotates or moves by the same angle as the angle by which the facing direction of the portable display apparatus body changes.

Based on the above, the user can cause the first object to rotate or move by the same angle as the angle by which the attitude and/or the position of the portable display apparatus is changed.

In addition, the action of the first object may be controlled such that in accordance with the attitude and/or the motion of the portable display apparatus that are obtained by rotating the portable display apparatus about the perspective direction, the first object rotates or moves about a predetermined direction set in the virtual world.

Based on the above, it is possible to control the action of the first object with respect to the predetermined direction in the virtual world.

In addition, the action of the first object may be controlled such that on the basis of the attitude and/or the motion of the portable display apparatus with respect to a direction of gravity in real space, and in accordance with the attitude and/or the motion of the portable display apparatus that are obtained by rotating the portable display apparatus about the perspective direction, the first object rotates or moves about a direction of gravity set in the virtual world.

Based on the above, it is possible to control the action of the first object with respect to the direction of gravity in the virtual world.

In addition, the action of the first object may be controlled such that in accordance with a direction of rotation and an angle of rotation in and by which the portable display apparatus rotates about the perspective direction, the first object rotates about a predetermined direction in the virtual world in a direction opposite to the direction of rotation and by the angle of rotation. When the touch position data indicates an operation of dragging the touch panel, the action of the second object may be controlled such that in accordance with a moving direction and a moving distance of the touch position in the virtual world displayed on the display screen so as to overlap the touch position indicated by the touch position data, the second object moves along a plane perpendicular to the predetermined direction in the virtual world in the moving direction and at the moving distance.

Based on the above, when the portable display apparatus has been moved so as to rotate (roll) about the perspective direction of the display screen of the portable display apparatus, the first object displayed on the display screen rotates or moves in the direction opposite to the direction of rotation of the display screen and by the same angle. This makes it possible to, even when the display screen of the portable display apparatus has rotated, display only the first object always in the same direction in real space, and display the second object so as to rotate in real space. Further, when a drag operation has been performed on the touch panel of the portable display apparatus, it is possible to display the second object so as to move, following the drag operation.

In addition, the information processing program may further cause the computer to execute setting a first virtual camera for generating the first image, and controlling an attitude and/or a position of the first virtual camera on the basis of the calculated attitude and/or motion of the portable display apparatus. At least an attitude and/or a motion of the portable display apparatus that are obtained by rotating the portable display apparatus about a perspective direction of, and perpendicular to, a display screen of the portable display apparatus may be calculated. The action of the first object may be controlled such that in accordance with a direction of rotation and an angle of rotation in and by which the portable display apparatus rotates about the perspective direction, the first object rotates about a direction of a line of sight of the first virtual camera in the direction of rotation and by the angle of rotation. The attitude of the first virtual camera may be controlled such that in accordance with the direction of rotation and the angle of rotation in and by which the portable display apparatus rotates about the perspective direction, the first virtual camera rotates about the direction of the line of sight in the direction of rotation and by the angle of rotation. When the touch position data indicates an operation of dragging the touch panel, the action of the second object may be controlled such that in accordance with a moving direction and a moving distance of the touch position in the virtual world displayed on the display screen so as to overlap the touch position indicated by the touch position data, the second object moves along a plane perpendicular to the direction of the line of sight in the virtual world in a direction opposite to the moving direction and at the moving distance. When the touch position data indicates the operation of dragging the touch panel, the position of the first virtual camera may be controlled such that in accordance with the moving direction and the moving distance of the touch position in the virtual world displayed on the display screen so as to overlap the touch position indicated by the touch position data, the first virtual camera moves along the plane perpendicular to the direction of the line of sight in the virtual world in the direction opposite to the moving direction and at the moving distance.

Based on the above, when the portable display apparatus has been moved so as to rotate (roll) about the perspective direction of the display screen of the portable display apparatus, the first object displayed on the display screen rotates or moves relatively in the direction opposite to the direction of rotation of the display screen and by the same angle. This makes it possible to, even when the display screen of the portable display apparatus has rotated, display only the first object always in the same direction in real space, and display the second object so as to rotate in real space. Further, when a drag operation has been performed on the touch panel of the portable display apparatus, it is possible to display the second object so as to move relatively, following the drag operation.

In addition, the portable display apparatus may include at least one of a gyro sensor and an acceleration sensor. The attitude and/or the motion of the portable display apparatus may be calculated on the basis of data output from the at least one of the gyro sensor and the acceleration sensor.

Based on the above, using the data that is output from the gyro sensor and indicates the angular velocity generated in the portable display apparatus and/or the data that is output from the acceleration sensor and indicates the acceleration generated in the portable display apparatus, it is possible to accurately calculate the attitude and the motion of the portable display apparatus.

In addition, image data indicating the first image may be output to the portable display apparatus. The portable display apparatus may include an image data acquisition unit. The image data acquisition unit acquires the image data output from the information processing apparatus. A display screen of the portable display apparatus may display the first image indicated by the image data acquired by the image data acquisition unit.

Based on the above, the portable display apparatus can function as a so-called thin-client terminal, which does not perform information processing such as game processing.

In addition, the information processing program may further cause the computer to execute generating compression image data by compressing the image data indicating the first image. In this case, the generated compression image data may be output to the portable display apparatus. The image data acquisition unit may acquire the compression image data output from the information processing apparatus. The portable display apparatus may further include a display image decompression unit. The display image decompression unit decompresses the compression image data to obtain the image data indicating the first image. The display screen of the portable display apparatus may display the first image indicated by the image data that has been acquired by the image data acquisition unit and has been decompressed by the display image decompression unit.

Based on the above, the first image is decompressed before being output from the information processing apparatus to the portable display apparatus. This makes it possible to output the first image at a high speed, and reduce delay caused between the generation of the first image and the display of the first image on the portable display apparatus.

In addition, besides the first image, a second image representing the virtual world may be further displayed on another display apparatus connected to the information processing apparatus.

It should be noted that said another display apparatus described above is a display apparatus connected to the information processing apparatus, like a monitor 2 according to the embodiment described later. Said another display apparatus may be a component separate from the portable display apparatus, and may be any apparatus so long as it is capable of displaying the second image generated by the information processing apparatus. For example, said another display apparatus described above may be integrated with the information processing apparatus (in a single housing).

Based on the above, when processing based on the operation of moving the portable display apparatus is performed, it is possible to display the results of the processing not only on the portable display apparatus but also on said another display apparatus connected to the information processing apparatus. This enables the user to use, in accordance with the state of the operation or the user's preference, either one of images displayed on, for example, two apparatuses, and also view an image suitable for an operation of the user. Further, it is possible to use an image displayed on said another display apparatus connected to the information processing apparatus, as, for example, an image to be viewed by another person different from the user. This makes it possible to provide a viewing environment suitable also for the case where a plurality of people view the results of the processing.

In addition, the information processing program may further cause the computer to execute generating compression image data by compressing the image data indicating the first image. In this case, the generated compression image data may be output to the portable display apparatus, and, besides the compression image data, image data indicating the second image may be output to said another display apparatus without being compressed. The portable display apparatus may include an image data acquisition unit and a display image decompression unit. The image data acquisition unit acquires the compression image data output from the information processing apparatus. The display image decompression unit decompresses the compression image data to obtain the image data indicating the first image. A display screen of the portable display apparatus may display the first image indicated by the image data that has been acquired by the image data acquisition unit and has been decompressed by the display image decompression unit.

Based on the above, the first image is decompressed and then output from the information processing apparatus to the portable display apparatus. This makes it possible to output the first image at a high speed, and reduce delay caused between the generation of the first image and the display of the first image on the portable display apparatus.

In addition, an image including at least a part of the first object and at least a part of the second object in the virtual world viewed from a point of view different from a point of view toward the virtual world for generating the first image may be displayed as the second image on said another display apparatus.

Based on the above, the same virtual world is displayed not only on the portable display apparatus but also on said another display apparatus, and images of the virtual world that are different in the point of view are displayed thereon. This enables the user to use, in accordance with the state of the operation or the user's preference, either one of the images displayed on the two apparatuses when performing an operation.

In addition, a point of view toward the virtual world for generating the second image may be set at a position further away from the first object or the second object than a point of view toward the virtual world for generating the first image is from the first object or the second object. A range wider than a range of the virtual world represented by the first image may be displayed as the second image on said another display apparatus.

Based on the above, an image of the virtual world in a display range wider than that of an image of the virtual world displayed on the portable display apparatus is displayed on said another display apparatus connected to the information processing apparatus. This makes it possible to display on each display apparatus, for example, an image suitable for an operation of the user when the state of the virtual world is presented to the user.

In addition, a point of view for generating the second image may be set at a position of viewing from a bird's-eye view the first object and the second object in the virtual world. An image obtained by viewing from a bird's-eye view at least a part of the first object placed in the virtual world and at least a part of the second object placed in the virtual world may be displayed as the second image on said another display apparatus.

Based on the above, the same virtual world is displayed not only on the portable display apparatus but also on said another display apparatus, and images of the virtual world obtained by viewing it from a bird's-eye view are displayed on said another display apparatus. This makes it possible to display on each display apparatus, for example, an image suitable for an operation of the user when the state of the virtual world is presented to the user.

In addition, the information processing program may further cause the computer to execute setting a second virtual camera for generating the second image, and controlling an attitude and/or a position of the second virtual camera. In this case, the attitude of the second virtual camera may be controlled such that in accordance with a direction of rotation and an angle of rotation in and by which the portable display apparatus rotates about a perspective direction of, and perpendicular to, a display screen of the portable display apparatus and which are calculated on the basis of the body state data, the second virtual camera rotates about a direction of a line of sight in a direction opposite to the direction of rotation and by the angle of rotation.

Based on the above, when the portable display apparatus has been moved so as to rotate (roll) about the perspective direction of the display screen of the portable display apparatus, the virtual world displayed on another display apparatus is displayed so as to rotate in a similar manner to the portable display apparatus. This makes it possible to easily understand the positional relationship between the virtual world displayed on the portable display apparatus and the virtual world displayed on said another display apparatus.

In addition, the exemplary embodiment may be carried out in the forms of an information processing apparatus and an information processing system, each including units that perform the above processes, and an information processing method including the above operations.

The exemplary embodiment makes it possible to, when a plurality of objects appear in a virtual world, vary the operations of a user to be performed on the objects.

These and other objects, features, aspects and advantages of the exemplary embodiment will become more apparent from the following detailed description when taken in conjunction with the accompanying drawings.

BRIEF DESCRIPTION OF THE DRAWINGS

FIG. 4 is a diagram showing a non-limiting example of the state where a user holds the terminal apparatus 6;

FIG. 6 is a perspective view showing a non-limiting example of the appearance of a board-type controller 9 of FIG. 1;

FIG. 20 is a subroutine flow chart showing a non-limiting example of an object setting process in step 83 in FIG. 19; and FIG. 21 is a subroutine flow chart showing a non-limiting example of a sewing process in step 118 in FIG. 20.

DETAILED DESCRIPTION OF NON-LIMITING EXAMPLE EMBODIMENTS

Figure 1:
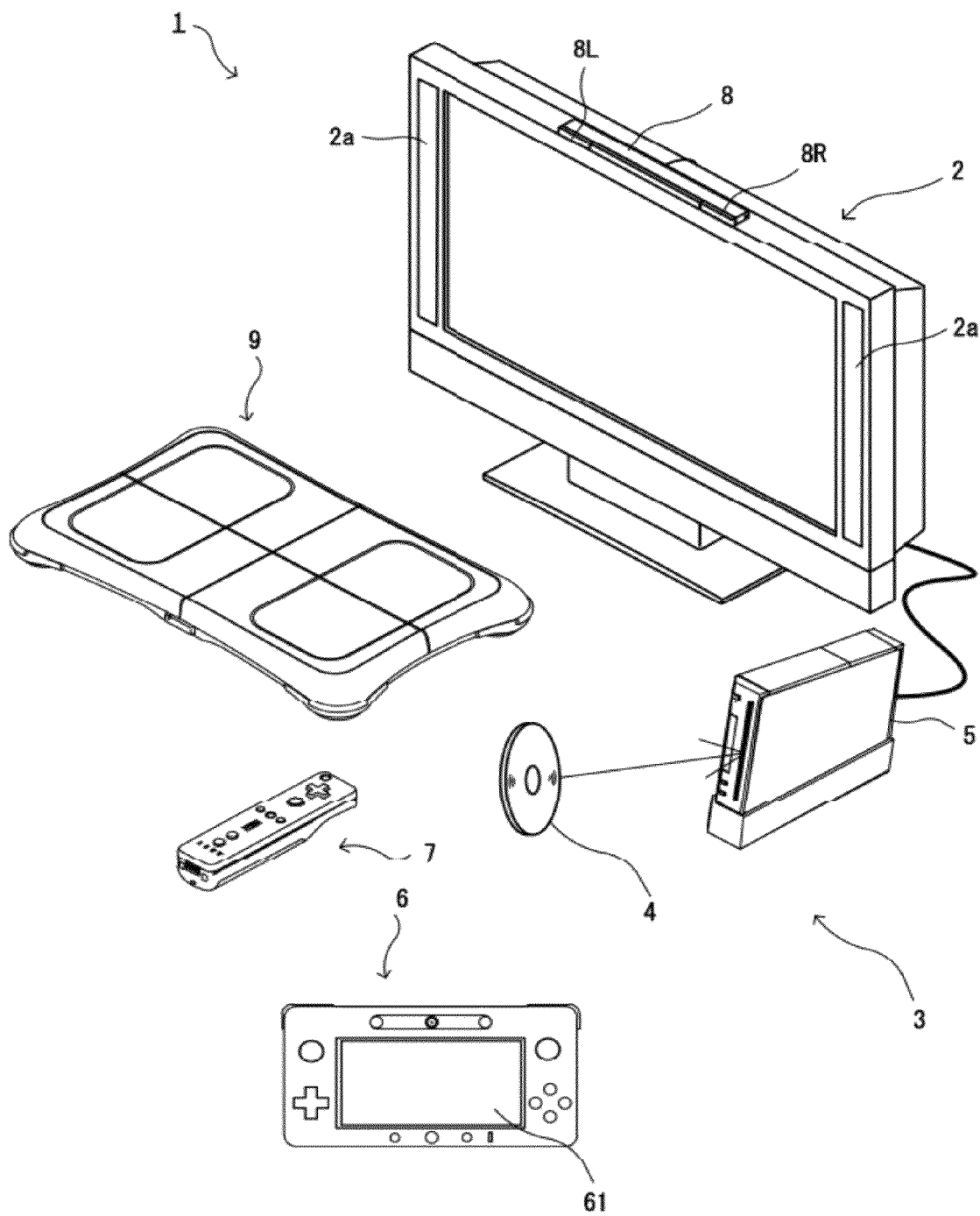
FIG. 1 is an external view showing an example of a game system 1 according to a non-limiting exemplary embodiment.
Figure 2:
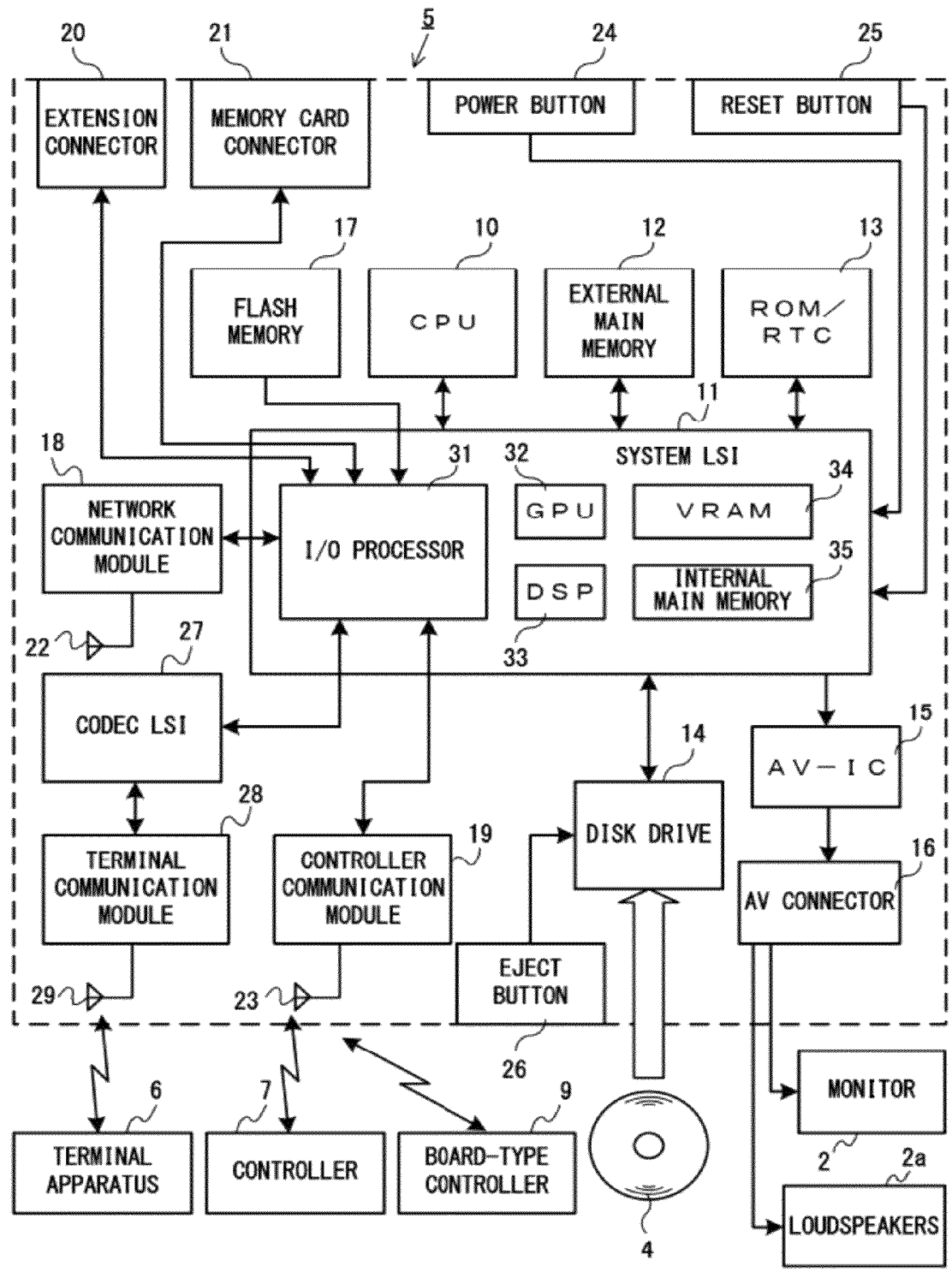
FIG. 2 is a functional block diagram showing a non-limiting example of a game apparatus body 5 of FIG. 1.

With reference to FIG. 1, an information processing apparatus for executing an information processing program according to an exemplary embodiment and an information processing system including the information processing apparatus is described. Hereinafter, in order to provide a specific description, a stationary game apparatus body 5 is used as an example of the information processing apparatus, and a game system including the game apparatus body 5 is described. FIG. 1 is an external view showing an example of the game system 1 including the stationary game apparatus body 5. FIG. 2 is a block diagram showing an example of the game apparatus body 5. Hereinafter, the game system 1 is described.

As shown in FIG. 1, the game system 1 includes a household television receiver (hereinafter referred to as a "monitor") 2 which is an example of display means, and the stationary game apparatus 3 connected to the monitor 2 via a connection cord. The monitor 2 includes loudspeakers 2a for outputting, in the form of sound, a sound signal outputted from the game apparatus 3. Further, the game apparatus 3 includes: an optical disk 4 having stored therein a program (e.g., a game program), which is an example of the information processing program according to the exemplary embodiment; the game apparatus body 5 having a computer for executing the program stored in the optical disk 4 to display a game screen on the monitor 2; a terminal apparatus 6; a controller 7 for providing the game apparatus body 5 with operation information used to operate, for example, objects displayed on the display screen; and a board-type controller 9. The game system 1 performs game processing on the game apparatus body 5 in accordance with a game operation using at least one of the terminal apparatus 6, the controller 7, and the board-type controller 9, and displays a game image obtained by the game processing on the monitor 2 and/or the terminal apparatus 6. The game apparatus body 5 is wirelessly connected to the terminal apparatus 6, the controller 7, and the board-type controller 9 so as to enable wireless communication therebetween. For example, the wireless communication is performed according to the Bluetooth (registered trademark) standard or the IEEE 802.11n standard. The wireless communication, however, may be performed in accordance with other standards such as standards for infrared communication.

The optical disk 4, typifying an information storage medium used for the game apparatus body 5 in an exchangeable manner, is detachably inserted in the game apparatus body 5. The optical disk 4 has stored therein the information processing program (typically, a game program) to be performed by the game apparatus body 5. The game apparatus body 5 has, on a front surface thereof, an insertion opening for the optical disk 4. The game apparatus body 5 reads and executes the information processing program stored in the optical disk 4 inserted into the insertion opening to perform the game processing.

The monitor 2 is connected to the game apparatus body 5 via a connection cord. The monitor 2 displays a game image obtained by the game processing performed by the game apparatus body 5. The monitor 2 includes the loudspeakers 2a. The loudspeakers 2a each output a game sound obtained as a result of the game processing. In another embodiment, the game apparatus body 5 and a stationary display apparatus may be integrated with each other. The communication between the game apparatus body 5 and the monitor 2 may be wireless communication.

The game apparatus body 5 has mounted thereto a flash memory 17 (see FIG. 2) which functions as a backup memory for fixedly storing data such as saved data. The game apparatus body 5 executes the game program or the like stored in the optical disk 4, and displays a result thereof as a game image on the monitor 2 and/or the terminal apparatus 6. The game program or the like to be executed may be stored in advance in the flash memory 17 as well as in the optical disk 4. Further, the game apparatus body 5 may reproduce a state of a game played in the past, using the saved data stored in the flash memory 17, and display an image of the game state on the monitor 2 and/or the terminal apparatus 6. A user of the game apparatus 3 can enjoy the game progress by operating at least one of the terminal apparatus 6, the controller 7, and the board-type controller 9 while viewing the game image displayed on the monitor 2 and/or the terminal apparatus 6.

The controller 7 and the board-type controller 9 each wirelessly transmit transmission data such as operation information, using, for example, the Bluetooth technology, to the game apparatus body 5 having a controller communication module 19. The controller 7 is operation means for performing, for example, selection of options displayed on the display screen of the monitor 2. The controller 7 includes a housing which is small enough to be held by one hand, and a plurality of operation buttons (including a cross key and the like) which are exposed at the surface of the housing. In addition, as is described later, the controller 7 includes an imaging information calculation section for taking an image viewed from the controller 7. As exemplary imaging targets of the imaging information calculation section, two LED modules (hereinafter referred to as "markers") 8L and 8R are provided in the vicinity of the display screen of the monitor 2 (above the screen in FIG. 1). Although details will be described later, a user (player) is allowed to perform a game operation while moving the controller 7, and the game apparatus body 5 uses a marker 8 to calculate the movement, position, attitude and the like of the controller 7. The marker 8 has two markers 8L and 8R at both ends thereof. Specifically, the marker 8L (as well as the marker 8R) includes one or more infrared LEDs (Light Emitting Diodes), and emits infrared light forward from the monitor 2. The marker 8 is connected to the game apparatus body 5, so that the game apparatus body 5 can control the infrared LEDs included in the marker 8 to be lit on or off. The marker 8 is a portable unit, so that the user is allowed to place the marker 8 in a given position. Although FIG. 1 shows a case where the marker 8 is placed on the monitor 2, the location and direction of the marker 8 may be appropriately selected. Further, the controller 7 is capable of receiving, at a communication section, transmission data wirelessly transmitted from the controller communication module 19 of the game apparatus body 5, to generate a sound or vibration based on the transmission data.

In another embodiment, the controller 7 and/or the board-type controller 9 may be wire-connected to the game apparatus body 5. Further, in the exemplary embodiment, the game system 1 includes a controller 7 and a board-type controller 9. The game apparatus body 5, however, is capable of communicating with a plurality of controllers 7 and a plurality of board-type controllers 9. Therefore, a plurality of players can play a game using a predetermined number of controllers 7 and board-type controller 9 simultaneously.

The controller 7 includes a housing which is formed by, for example, plastic molding, and has a plurality of operation sections (operation buttons) in the housing 71. Then, the controller 7 transmits, to the game apparatus body 5, operation data indicating the states of inputs provided to the operation sections (indicating whether or not each operation button has been pressed).

In addition, the controller 7 has the imaging information calculation section that analyzes image data of an image captured by capturing means and determines an area having a high brightness, and thereby calculates the position of the center of gravity, the size, and the like of the area. For example, the imaging information calculation section has capturing means fixed in the housing of the controller 7, and uses as an imaging target a marker that outputs infrared light, such as a marker section 65 of the terminal apparatus 6 and/or the marker 8. The imaging information calculation section calculates the position of the imaging target in a captured image captured by the capturing means, and transmits, to the game apparatus body 5, marker coordinate data indicating the calculated position. The marker coordinate data varies depending on the direction (the angle of tilt) or the position of the controller 7, and therefore, the game apparatus body 5 can calculate the direction and the position of the controller 7 using the marker coordinate data.

In addition, the controller 7 includes therein an acceleration sensor and/or a gyro sensor. The acceleration sensor detects the acceleration generated in the controller 7 (including the gravitational acceleration), and transmits, to the game apparatus body 5, data indicating the detected acceleration. The acceleration detected by the acceleration sensor varies depending on the direction (the angle of tilt) or the movement of the controller 7, and therefore, the game apparatus body 5 can calculate the direction and the movement of the controller 7 using the acquired acceleration data. The gyro sensor detects the angular velocities generated about three axes set in the controller 7, and transmits, to the game apparatus body 5, angular velocity data indicating the detected angular velocities. The acceleration detected by the gyro sensor varies depending on the direction (the angle of tilt) or the movement of the controller 7, and therefore, the game apparatus body 5 can calculate the direction and the movement of the controller 7 using the acquired acceleration data. As described above, the user is allowed to perform a game operation by pressing any of the operation sections 72 provided on the controller 7, and moving the controller 7 so as to change the position and the attitude (tilt) thereof.

The controller 7 has a loudspeaker and a vibrator. The controller 7 processes sound data transmitted from the game apparatus body 5, and outputs sound corresponding to the sound data from the loudspeaker. Further, the controller 7 processes vibration data transmitted from the game apparatus body 5, and generates vibration by actuating the vibrator in accordance with the vibration data. It should be noted that in the exemplary embodiment described later, it is possible to play a game without using the controller 7. A detailed configuration of the board-type controller 9 will be described later.

The terminal apparatus 6 is a portable apparatus that is small enough to be held by the user, and the user is allowed to move the terminal apparatus 6 with hands, or place the terminal apparatus 6 at any location. Although a detailed configuration of the terminal apparatus 6 will be described later, the terminal apparatus 6 includes an LCD (Liquid Crystal Display) 61 as display means, and input means (a touch panel 62, a gyro sensor 604, and the like described later). The terminal apparatus 6 and the game apparatus body 5 (a terminal communication module 28 (see FIG. 2)) are capable of communicating with each other wirelessly or wired. The terminal apparatus 6 receives, from the game apparatus body 5, data of an image (e.g., a game image) generated in the game apparatus body 5, and displays the image represented by the data on an LCD 61. Although the LCD 61 is used as a display apparatus in the exemplary embodiment, the terminal apparatus 6 may include a given other display apparatus, such as a display apparatus utilizing EL (Electro Luminescence), for example. Further, the terminal apparatus 6 transmits, to the game apparatus body 5 having the terminal communication module 28, operation data representing the content of an operation performed on the terminal apparatus 6.

Next, with reference to FIG. 2, the internal configuration of the game apparatus body 5 is described. FIG. 2 is a block diagram showing an example of the internal configuration of the game apparatus body 5. The game apparatus body 5 includes a CPU (Central Processing Unit) 10, a system LSI (Large Scale Integration) 11, an external main memory 12, a ROM/RTC (Read Only Memory/Real Time Clock) 13, a disk drive 14, an AV-IC (Audio Video-Integrated Circuit) 15 and the like.

The CPU 10, serving as a game processor, executes a program stored in the optical disk 4 to perform a process. The CPU 10 is connected to the system LSI 11. In addition to the CPU 10, the external main memory 12, the ROM/RTC 13, the disk drive 14, and the AV-IC 15 are connected to the system LSI 11. The system LSI 11 performs processes such as control of data transmission between the respective components connected thereto, generation of an image to be displayed, and acquisition of data from an external apparatus. The internal configuration of the system LSI 11 will be described later. The external main memory 12, which is a volatile memory, stores programs loaded from the optical disk 4 or the flash memory 17, and stores various data. The external main memory 12 is used as a work area and a buffer area for the CPU 10. The ROM/RTC 13 includes a ROM (so-called boot ROM) incorporating a program for booting the game apparatus body 5, and a clock circuit (RTC) for counting time. The disk drive 14 reads, from the optical disk 4, program data, texture data and the like, and writes the read data into an internal main memory 35 described below or the external main memory 12.

The system LSI 11 includes an input/output processor (I/O processor) 31, a GPU (Graphics Processor Unit) 32, a DSP (Digital Signal Processor) 33, a VRAM (Video RAM) 34, and the internal main memory 35. These components 31 to 35 are connected to each other via an internal bus (not shown).

The GPU 32, which is a part of rendering means, generates an image in accordance with a graphics command (draw command) supplied from the CPU 10. The VRAM 34 stores data (such as polygon data and texture data) used by the GPU 32 to execute the graphics command. When an image is generated, the GPU 32 generates image data using the data stored in the VRAM 3. In the exemplary embodiment, the game apparatus body 5 may generate both a game image to be displayed on the monitor 2 and a game image to be displayed on the terminal apparatus 6. Hereinafter, the game image to be displayed on the monitor 2 may be referred to as a "monitor game image", and the game image to be displayed on the terminal apparatus 6 may be referred to as a "terminal game image".

The DSP 33, serving as an audio processor, generates sound data using sound data and sound waveform (tone quality) data stored in the internal main memory 35 and the external main memory 12. In the exemplary embodiment, similarly to the game images, both a game sound to be output from the loudspeakers 2a of the monitor 2 and a game sound to be output from the loudspeakers of the terminal apparatus 6 may be generated. Hereinafter, the game sound to be output from the monitor 2 may be referred to as a "monitor game sound", and the game sound to be output from the terminal apparatus 6 may be referred to as a "terminal game sound".

Among the image data and sound data generated by the game apparatus body 5, the image data and sound data to be output to the monitor 2 are read by the AV-IC 15. The AV-IC 15 outputs the read image data to the monitor 2 via an AV connector 16, and outputs the read sound data to the loudspeakers 2a included in the monitor 2. Thereby, an image is displayed on the monitor 2, and a sound is output from the loudspeakers 2a.

Further, among the image data and sound data generated by the game apparatus body 5, the image data and sound data to be output to the terminal apparatus 6 are transmitted to the terminal apparatus 6 by the I/O processor 31 or the like. Data transmission to the terminal apparatus 6 by the I/O processor 31 or the like will be described later.

The I/O processor 31 performs data reception and transmission with the components connected thereto, and download of data from an external apparatus. The I/O processor 31 is connected to the flash memory 17, the network communication module 18, the controller communication module 19, an extension connector 20, a memory card connector 21, and a codec LSI 27. An antenna 23 is connected to the controller communication module 19. The codec LSI 27 is connected to the terminal communication module 28, and an antenna 29 is connected to the terminal communication module 28.

The game apparatus body 5 is connected to a network such as the Internet so as to communicate with external information processing apparatuses (e.g., other game apparatuses or various servers). That is, the I/O processor 31 is connected to a network via the network communication module 18 and the antenna 22 so as to communicate with external information processing apparatuses connected to the network. The I/O processor 31 accesses the flash memory 17 at regular intervals so as to detect for data to be transmitted to the network. When data to be transmitted is detected, the data is transmitted to the network via the network communication module 18 and the antenna 22. Further, the I/O processor 31 receives, via the network, the antenna 22 and the network communication module 18, data transmitted from the external information processing apparatuses or data downloaded from a download server, and stores the received data in the flash memory 17. The CPU 10 executes a program, and reads the data stored in the flash memory 17 to use the data for execution of the program. The flash memory 17 may store not only the data transmitted and received between the game apparatus body 5 and the external information processing apparatuses, but also saved data (result data or progress data of the process) of the game played with the game apparatus body 5. Further, the flash memory 17 may store programs such as a game program.

The game apparatus body 5 can receive operation data from the controller 7 and/or the board-type controller 9. That is, the I/O processor 31 receives, via the antenna 23 and the controller communication module 19, operation data or the like transmitted from the controller 7 and/or the board-type controller 9, and stores (temporarily) the data in a buffer region of the internal main memory 35 or the external main memory 12. Similarly to the external main memory 12, the internal main memory 35 may store a program loaded from the optical disk 4 or a program loaded from the flash memory 17, and various data. The internal main memory 35 may be used as a work region or buffer region of the CPU 10.

The game apparatus body 5 is capable of transmitting/receiving image data, sound data and the like to/from the terminal apparatus 6. When transmitting a game image (terminal game image) to the terminal apparatus 6, the I/O processor 31 outputs data of a game image generated by the GPU 32 to the codec LSI 27. The codec LSI 27 performs a predetermined compression process on the image data supplied from the I/O processor 31. The terminal communication module 28 performs wireless communication with the terminal apparatus 6. Accordingly, the image data compressed by the codec LSI 27 is transmitted by the terminal communication module 28 to the terminal apparatus 6 via the antenna 29. In the exemplary embodiment, the codec LSI 27 compresses the image data using a highly efficient compression technique, for example, the H.264 standard. The codec LSI 27 may adopt other compression techniques. When the communication rate is sufficiently high, uncompressed image data may be transmitted. The terminal communication module 28 is, for example, a Wi-Fi certified communication module. The terminal communication module 28 may perform wireless communication with the terminal apparatus 6 at a high speed using, for example, the technique of MIMO (Multiple Input Multiple Output) adopted in the IEEE 802.11n standard, or may use other communication techniques.

The game apparatus body 5 transmits, to the terminal apparatus 6, sound data as well as the image data. That is, the I/O processor 31 outputs sound data generated by the DSP 33 to the terminal communication module 28 via the codec LSI 27. The codec LSI 27 performs a compression process on the sound data in a similar manner to that for the image data. Any compression technique may be adopted for the sound data. In another embodiment, uncompressed sound data may be transmitted. The terminal communication module 28 transmits the compressed image data and sound data to the terminal apparatus 6 via the antenna 29.

The game apparatus body 5 transmits, in addition to the image data and sound data, various control data to the terminal apparatus 6, where necessary. The control data represent control instructions for the components included in the terminal apparatus 6, such as an instruction to control on/off of a marker section (a marker section 65 shown in FIG. 5), and an instruction to control image taking of a camera (a camera 66 shown in FIG. 10). The I/O processor 31 transmits the control data to the terminal apparatus 6 in response to an instruction from the CPU 5. In the exemplary embodiment, the codec LSI 27 does not perform a data compression process on the control data. Alternatively, in another embodiment, the codec LSI 27 may perform a compression process on the control data. The above data transmitted from the game apparatus body 5 to the terminal apparatus 6 may be encrypted where necessary, or may not be encrypted.

The game apparatus body 5 can receive various data from the terminal apparatus 6. Although details will be described later, in the exemplary embodiment, the terminal apparatus 6 transmits operation data, image data, and sound data. The respective data transmitted from the terminal apparatus 6 are received by the terminal communication module 28 via the antenna 29. The image data and sound data transmitted from the terminal apparatus 6 have been subjected to a similar compression process to that for the image data and sound data transmitted from the game apparatus body 5 to the terminal apparatus 6. Accordingly, these image data and sound data are transmitted from the terminal communication module 28 to the codec LSI 27, and subjected to a decompression process by the codec LSI 27. The decompressed data are output to the I/O processor 31. On the other hand, the operation data transmitted from the terminal apparatus 6 is smaller in amount than the image data and sound data, and therefore, the operation data does not need to be compressed. The operation data may be encrypted where necessary, or may not be encrypted. Accordingly, the operation data, which has been received by the terminal communication module 28, is output to the I/O processor 31 via the codec LSI 27. The I/O processor 31 stores (temporarily) the data received from the terminal apparatus 6 in the buffer region of the internal main memory 35 or the external main memory 12.

The game apparatus body 5 is connectable to other devices and external storage media. That is, an extension connector 20 and a memory card connector 21 are connected to the I/O processor 31. The expansion connector 20 is an interface connector as typified by a USB and an SCSI, and is capable of performing communication with the network, instead of the network communication module 18, by connecting thereto a medium such as an external storage medium, a peripheral device such as another controller, or a wired communication connector. The memory card connector 21 is a connector for connecting thereto an external storage medium such as a memory card. For example, the I/O processor 31 accesses the external storage medium via the expansion connector 20 or the memory card connector 21 to save or read data.

The game apparatus body 5 includes (on the front main surface thereof, for example) a power button 24, a reset button 25, an insertion slot in which the optical disk 4 is inserted, an eject button 26 for ejecting the optical disk 4 from the insertion slot of the game apparatus body 5, and the like. The power button 24 and the reset button 25 are connected to the system LSI 11. When the power button 24 is turned on, the respective components of the game apparatus body 5 are supplied with power. When the reset button 25 is pressed, the system LSI 11 re-executes the boot program of the game apparatus body 5. The eject button 26 is connected to the disk drive 14. When the eject button 26 is pressed, the optical disk 4 is ejected from the disk drive 14.

In another embodiment, some of the components of the game apparatus body 5 may be constituted as an extension device separated from the game apparatus body 5. At this time, the extension device may be connected to the game apparatus body 5 via the extension connector 20. Specifically, the extension device may include, for example, the codec LSI 27, the terminal communication module 28, and the antenna 29, and may be detachably connected to the extension connector 20. Thus, by connecting the extension device to the game apparatus body which does not have the above components, the game apparatus body can be made capable of communicating with the terminal apparatus 6.

Figure 3:
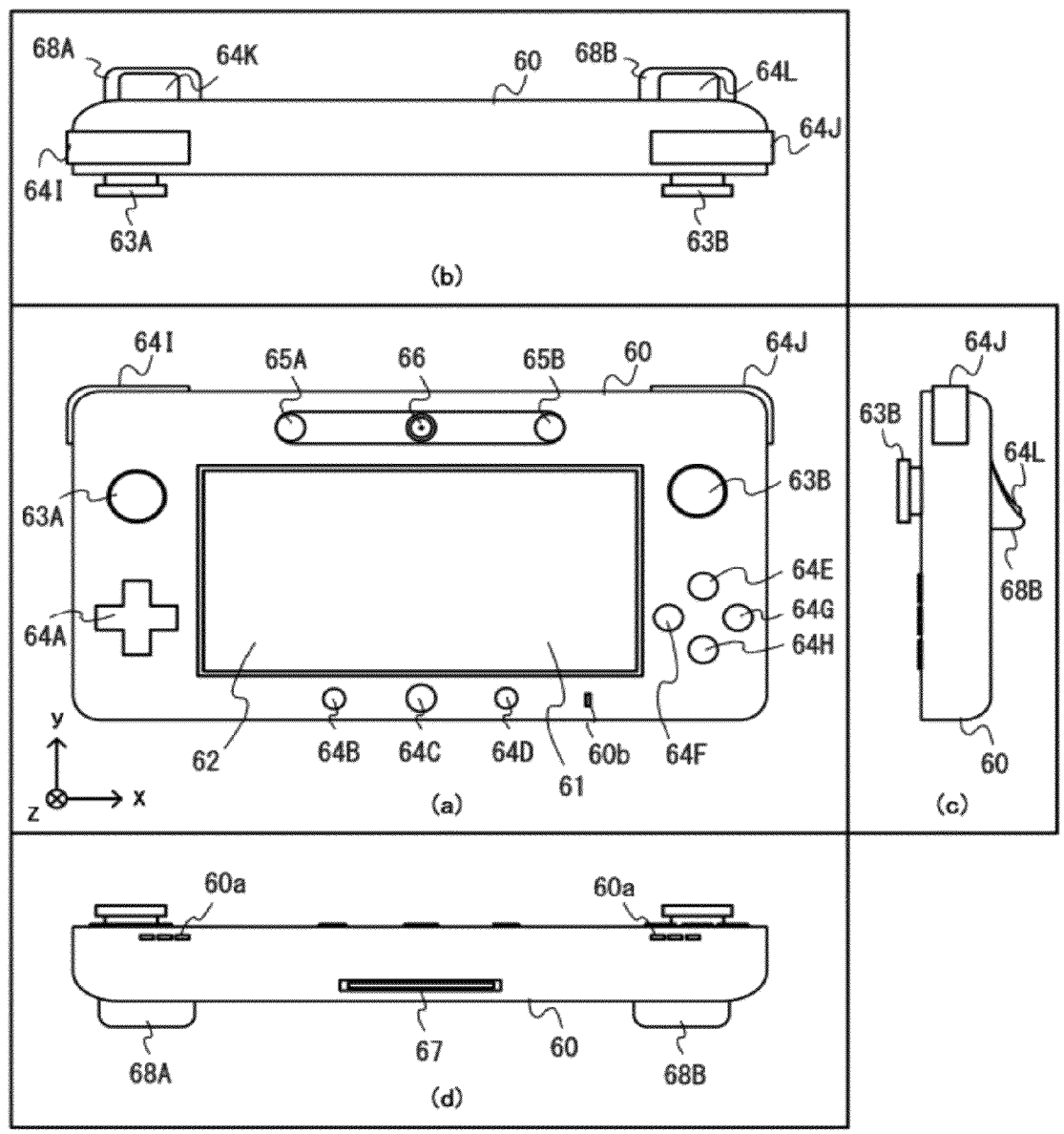
FIG. 3 is a diagram showing a non-limiting example of the external configuration of a terminal apparatus 6 of FIG. 1.
Figure 5:
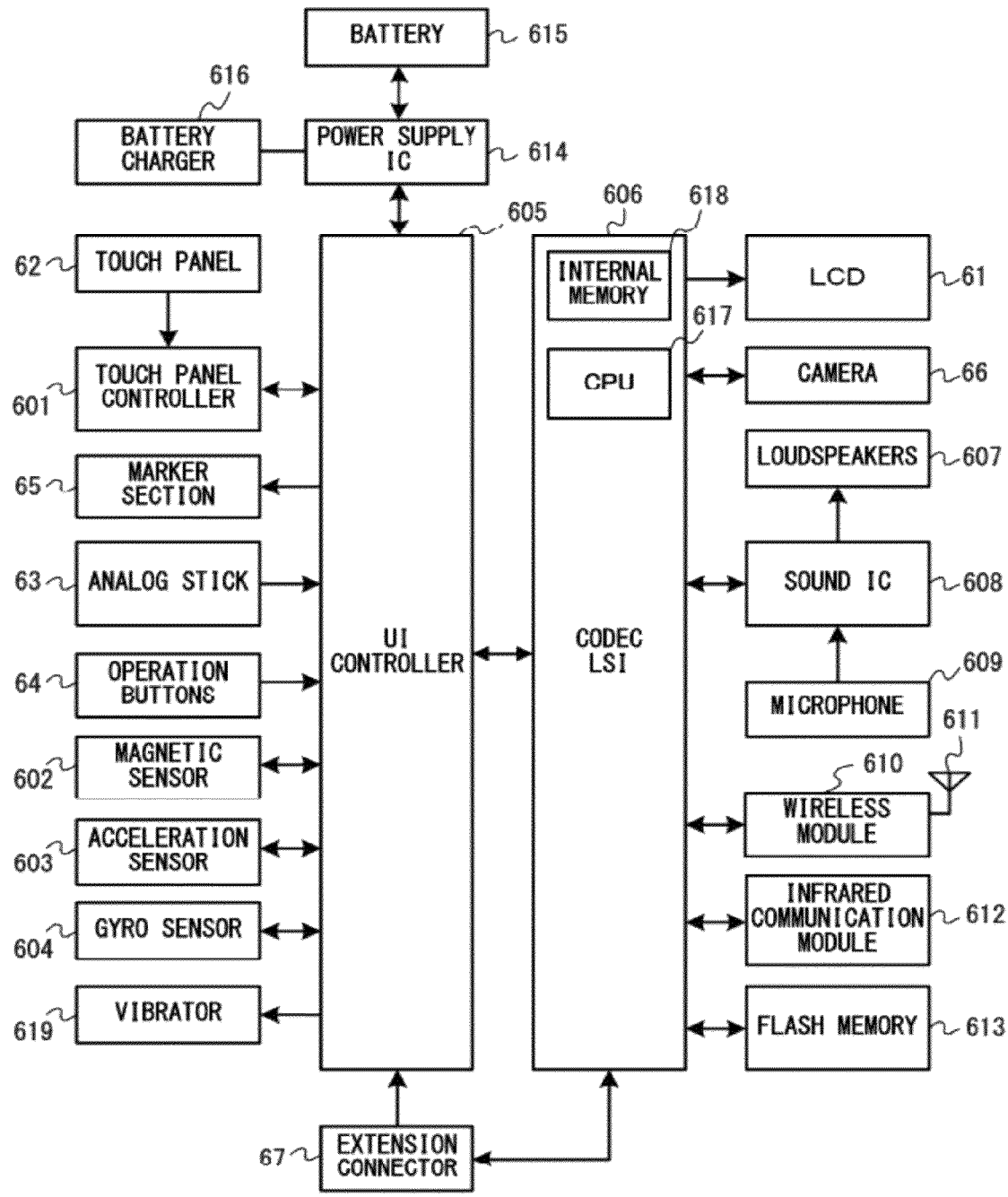
FIG. 5 is a block diagram showing a non-limiting example of the internal configuration of the terminal apparatus 6 of FIG. 3.

Next, with reference to FIGS. 3 through 5, the configuration of the terminal apparatus 6 is described. FIG. 3 is a diagram showing an example of the external configuration of the terminal apparatus 6. More specifically, (a) of FIG. 3 is a front view of the terminal apparatus 6, (b) of FIG. 3 is a top view, (c) of FIG. 3 is a right side view, and (d) of FIG. 3 is a bottom view. FIG. 4 shows an example of the state where a user holds the terminal apparatus 6 with both hands.

As shown in FIG. 3, the terminal apparatus 6 includes a housing 60 which generally has a horizontally long plate-like rectangular shape. The housing 60 is small enough to be held by the user. Therefore, the user is allowed to move the terminal apparatus 6 with hands, and change the location of the terminal apparatus 6.

The terminal apparatus 6 includes an LCD 61 on a front surface of the housing 60. The LCD 61 is provided near the center of the front surface of the housing 60. Therefore, as shown in FIG. 4, the user, holding the housing 60 at portions to the right and left of the LCD 61, is allowed to move the terminal apparatus 6 while viewing a screen of the LCD 61. FIG. 4 shows an example where the user holds the terminal apparatus 6 horizontally (i.e., with the longer sides of the terminal apparatus 6 being oriented horizontally) by holding the housing 60 at portions to the right and left of the LCD 61. The user, however, may hold the terminal apparatus 6 vertically (i.e., with the longer sides of the terminal apparatus 6 being oriented vertically).

As shown in (a) of FIG. 3, the terminal apparatus 6 includes, as operation means, a touch panel 62 on the screen of the LCD 61. In the exemplary embodiment, the touch panel 62 is, but is not limited to, a resistive film type touch panel. However, a touch panel of a given type, such as electrostatic capacitance type, may be used. The touch panel 62 may be of single touch type or multiple touch type. In the exemplary embodiment, the touch panel 62 has the same resolution (detection accuracy) as that of the LCD 61. The resolution of the touch panel 62 and the resolution of the LCD 61, however, do not need to be the same. Although an input to the touch panel 62 is usually performed using a touch pen, in addition to the touch pen, a finger of the user may be used to perform an input to the touch panel 62. The housing 60 may have an opening for accommodating the touch pen used to perform an operation to the touch panel 62. The terminal apparatus 6 has the touch panel 62, and therefore, the user is allowed to operate the touch panel 62 while moving the terminal apparatus 6. That is, the user is allowed to directly (using the touch panel 62) perform an input to the screen of the LCD 61 while moving the LCD 61.

As shown in FIG. 3, the terminal apparatus 6 has, as operation means, two analog sticks 63A and 63B, and a plurality of operation buttons 64A through 64L. The analog sticks 63A and 63B are each a device for designating a direction. The analog sticks 63A and 63B are each configured such that a stick part thereof to be operated by a finger of the user is slidable or tiltable in a given direction (at a given angle in a given direction such as the upward, the downward, the rightward, the leftward, or the diagonal direction) with respect to the front surface of the housing 60. The left analog stick 63A is provided to the left of the screen of the LCD 61, and the right analog stick 63B is provided to the right of the screen of the LCD 61. Therefore, the user is allowed to perform an input for designating a direction using the analog stick 63A or 63B with either the left or right hand. Further, as shown in FIG. 4, the analog sticks 63A and 63B are positioned so as to be operated by the user holding the right and left portions of the terminal apparatus 6. Therefore, the user is allowed to easily operate the analog sticks 63A and 63B when the user holds and moves the terminal apparatus 6.

The operation buttons 64A through 64L are each operation means for performing a predetermined input. As described below, the operation buttons 64A through 64L are positioned so as to be operated by the user holding the right and left portions of the terminal apparatus 6 (see FIG. 4). Accordingly, the user is allowed to easily operate the operation means when the user holds and moves the terminal apparatus 6.

As shown in (a) of FIG. 3, among the operation buttons 64A through 64L, the cross button (direction input button) 64A and the operation buttons 64B through 64H are provided on the front surface of the housing 60. The operation buttons 64A through 64H are positioned so as to be operated by a thumb of the user (see FIG. 4).

The cross button 64A is provided to the left of the LCD 61 and beneath the left analog stick 63A. That is, the cross button 64A is positioned so as to be operated by the left hand of the user. The cross button 64A is cross-shaped, and is capable of indicating an upward, a downward, a leftward, or a rightward direction. The operation buttons 64B through 64D are provided beneath the LCD 61. The three operation buttons 64B through 64D are positioned so as to be operated by the right and left hands of the user. The four operation buttons 64E through 64H are provided to the right of the LCD 61 and beneath the right analog stick 63B. That is, the four operation buttons 64E through 64H are positioned so as to be operated by the right hand of the user. Further, the four operation buttons 64E, 64H, 64F, and 64G are positioned upward, downward, leftward, and rightward, respectively, with respect to a center position of the four operation buttons. Accordingly, the terminal apparatus 6 may cause the four operation buttons 64E through 64H to function as buttons which allow the user to designate an upward, a downward, a leftward, or a rightward direction.

As shown in (a), (b), and (c) of FIG. 3, a first L button 64I and a first R button 64J are provided on diagonal upper portions (an upper left portion and an upper right portion) of the housing 60. Specifically, the first L button 64I is provided on the left end of the upper side surface of the plate-shaped housing 60 so as to protrude from the upper and left side surfaces. The first R button 64J is provided on the right end of the upper side surface of the housing 60 so as to protrude from the upper and right side surfaces. In this way, the first L button 64I is positioned so as to be operated by the index finger of the left hand of the user, and the first R button 64J is positioned so as to be operated by the index finger of the right hand of the user (see FIG. 4).

As shown in (b) and (c) of FIG. 3, leg parts 68A and 68B are provided so as to protrude from a rear surface (i.e., a surface reverse of the front surface on which the LCD 61 is provided) of the plate-shaped housing 60, and a second L button 64K and a second R button 64L are provided so as to protrude from the leg parts 68A and 68B, respectively. Specifically, the second L button 64K is provided at a slightly upper position on the left side (the left side as viewed from the front surface side) of the rear surface of the housing 60, and the second R button 64L is provided at a slightly upper position on the right side (the right side as viewed from the front-surface side) of the rear surface of the housing 60. In other words, the second L button 64K is provided at a position substantially opposite to the left analog stick 63A provided on the front surface, and the second R button 64L is provided at a position substantially opposite to the right analog stick 63B provided on the front surface. The second L button 64K is positioned so as to be operated by the middle finger of the left hand of the user, and the second R button 64L is positioned so as to be operated by the middle finger of the right hand of the user (see FIG. 4). Further, as shown in (c) of FIG. 3, the leg parts 68A and 68B each have a surface facing obliquely upward, and the second L button 64K and the second R button 64L are provided on the oblique surfaces of the leg parts 68A and 68B, respectively. Thus, the second L button 64K and the second R button 64L have button surfaces facing obliquely upward. It is supposed that the middle finger of the user moves vertically when the user holds the terminal apparatus 6, and therefore, the upward facing button surfaces allow the user to easily press the second L button 64K and the second R button 64L. Further, the leg parts 68A and 68B provided on the rear surface of the housing 60 allow the user to easily hold the housing 60. Moreover, the operation buttons provided on the leg parts 68A and 68B allow the user to easily perform operation while holding the housing 60.

In the terminal apparatus 6 shown in FIG. 3, the second L button 64K and the second R button 64L are provided on the rear surface of the housing 60. Therefore, if the terminal apparatus 6 is placed with the screen of the LCD 61 (the front surface of the housing 60) facing upward, the screen of the LCD 61 may not be perfectly horizontal. Accordingly, in another embodiment, three or more leg parts may be provided on the rear surface of the housing 60. In this case, if the terminal apparatus 6 is placed on a floor with the screen of the LCD 61 facing upward, the three or more leg parts contact the floor. Thus, the terminal apparatus 6 can be placed with the screen of the LCD 61 being horizontal. Such a horizontal placement of the terminal apparatus 6 may be achieved by providing detachable leg parts on the rear surface of the housing 60.

The respective operation buttons 64A through 64L are assigned functions, where necessary, in accordance with a game program. For example, the cross button 64A may be used for direction designation operation, selection operation, and the like, and the operation buttons 64E through 64H may be used for determination operation, cancellation operation, and the like.

The terminal apparatus 6 includes a power button (not shown) for turning on/off the power of the terminal apparatus 6. The terminal apparatus 6 may include an operation button for turning on/off screen display of the LCD 61, an operation button for performing connection setting (pairing) with the game apparatus body 5, and an operation button for adjusting the volume of loudspeakers (loudspeakers 607 shown in FIG. 5).

As shown in (a) of FIG. 3, the terminal apparatus 6 includes a marker section (a marker section 65 shown in FIG. 5) including a marker 65A and a marker 65B, on the front surface of the housing 60. For example, the marker section 65 is provided above the LCD 61. The markers 65A and 65B are each constituted by one or more infrared LEDs, like the markers 8L and 8R of the marker 8. The marker section 65 is used, like the marker 8, for causing the game apparatus body 5 to calculate a movement or the like of the controller 7 with respect to the marker section 65. The game apparatus body 5 is capable of controlling the infrared LEDs of the marker section 65 to be on or off.

The terminal apparatus 6 includes a camera 66 as imaging means. The camera 66 includes an image pickup element (e.g., a CCD image sensor or a CMOS image sensor) having a predetermined resolution, and a lens. For example, the camera 66 is provided on the front surface of the housing 60. Accordingly, the camera 66 is capable of taking an image of the face of the user holding the terminal apparatus 6. For example, the camera 66 is capable of taking an image of the user playing a game while viewing the LCD 61.

The terminal apparatus 6 has a microphone (a microphone 609 shown in FIG. 5) as sound input means. A microphone hole 60b is provided in the front surface of the housing 60. The microphone 609 is embedded in the housing 60 at a position inside the microphone hole 60b. The microphone 609 detects for a sound, such as user's voice, around the terminal apparatus 6.

The terminal apparatus 6 has loudspeakers (loudspeakers 607 shown in FIG. 5) as sound output means. As shown in (d) of FIG. 3, speaker holes 60a are provided in the lower side surface of the housing 60. A sound is output through the speaker holes 60a from the loudspeakers 607. In the exemplary embodiment, the terminal apparatus 6 has two loudspeakers, and the speaker holes 60a are provided at positions corresponding to a left loudspeaker and a right loudspeaker.

The terminal apparatus 6 includes an extension connector 67 for connecting another device to the terminal apparatus 6. In the exemplary embodiment, as shown in (d) of FIG. 3, the extension connector 67 is provided in the lower side surface of the housing 60. Any device may be connected to the extension connection 67. For example, a controller (a controller (a gun-shaped controller or the like) used for a specific game or an input device such as a keyboard may be connected to the extension connector 67. If another device does not need to be connected, the extension connector 67 does not need to be provided.

In the terminal apparatus 6 shown in FIG. 3, the shapes of the operation buttons and the housing 60, the number of the respective components, and the positions in which the components are provided are merely examples. The shapes, numbers, and positions may be different from those described above.

Next, with reference to FIG. 5, the internal configuration of the terminal apparatus 6 is described. FIG. 5 is a block diagram showing an example of the internal configuration of the terminal apparatus 6. As shown in FIG. 5, the terminal apparatus 6 includes, in addition to the components shown in FIG. 3, a touch panel controller 601, a magnetic sensor 602, a gyro sensor 604, a user interface controller (UI controller) 605, a codec LSI 606, loudspeakers 607, a sound IC 608, a microphone 609, a wireless module 610, an antenna 611, an infrared communication module 612, a flash memory 613, a power supply IC 614, a battery 615, and a vibrator 619. These electronic components are mounted on an electronic circuit board and accommodated in the housing 60.

The UI controller 605 is a circuit for controlling data input to various input/output sections and data output from various input/output sections. The UI controller 605 is connected to the touch panel controller 601, the analog stick 63 (the analog sticks 63A and 63B), the operation button 64 (the operation buttons 64A through 64L), the marker section 65, the magnetic sensor 602, the acceleration sensor 603, the gyro sensor 604, and the vibrator 619. Further, the UI controller 605 is connected to the codec LSI 606 and the extension connector 67. The power supply IC 614 is connected to the UI controller 605, so that power is supplied to the respective components through the UI controller 605. The internal battery 615 is connected to the power supply IC 614, so that power is supplied from the battery 615. Further, a battery charger 616 or a cable, which is supplied with power from an external power supply, may be connected to the power supply IC 614 via a connector or the like. In this case, the terminal apparatus 6 can be supplied with power and charged from the external power supply using the battery charger 616 or the cable. Charging of the terminal apparatus 6 may be performed by setting the terminal apparatus 6 on a cradle (not shown) having a charging function.

The touch panel controller 601 is a circuit which is connected to the touch panel 62 and controls the touch panel 62. The touch panel controller 601 generates a predetermined form of touch position data, on the basis of a signal from the touch panel 62, and outputs the touch position data to the UI controller 605. The touch position data represents coordinates of a position at which an input is performed on an input surface of the touch panel 62. The touch panel controller 601 reads a signal from the touch panel 62 and generates touch position data every predetermined period of time. Further, various control instructions on the touch panel 62 are output from the UI controller 605 to the touch panel controller 601.

The analog stick 63 outputs, to the UI controller 605, stick data representing a direction in which the stick part operated by a finger of the user slides (or tilts), and the amount of the sliding (tilting). The operation button 64 outputs, to the UI controller 605, operation button data representing an input state of each of the operation buttons 64A through 64L (whether or not the operation button is pressed).

The magnetic sensor 602 detects the magnitude and direction of a magnetic field to detect an orientation. Orientation data representing the detected orientation is output to the UI controller 605. The UI controller 605 outputs, to the magnetic sensor 602, a control instruction for the magnetic sensor 602. Examples of the magnetic sensor 602 include: an MI (Magnetic Impedance) sensor, a fluxgate sensor, a hall sensor, a GMR (Giant Magneto Resistance) sensor, a TMR (Tunneling Magneto Resistance) sensor, and an AMR (Anisotropic Magneto Resistance) sensor. Any sensor, however, may be adopted as long as the sensor can detect an orientation. Strictly speaking, the obtained orientation data does not represent an orientation in a place where a magnetic field is generated in addition to the geomagnetism. Even in such a case, it is possible to calculate a change in the attitude of the terminal apparatus 6 because the orientation data changes when the terminal apparatus 6 moves.

The acceleration sensor 603 is provided inside the housing 60. The acceleration sensor 603 detects the magnitudes of linear accelerations along three axial directions (the xyz axis directions shown in (a) of FIG. 3). Specifically, in the acceleration sensor 603, the long side direction of the housing 60 is defined as the x-axis direction (in the state where the marker section 65 is placed above the LCD 61, the right direction along the long side direction when facing the display screen of the LCD 61 is defined as an x-axis positive direction), the short side direction of the housing 60 is defined as the y-axis direction (in the state where the marker section 65 is placed above the LCD 61, the up direction along the short side direction when facing the display screen of the LCD 61 is a y-axis positive direction), and the direction orthogonal to the front surface of the housing 60 is defined as the z-axis direction (the perspective direction of the display screen of the LCD 61 is defined as a z-axis positive direction), thereby detecting the magnitudes of the linear accelerations in the respective axis directions. Acceleration data representing the detected accelerations is output to the UI controller 605. The UI controller 605 outputs, to the acceleration sensor 603, a control instruction for the acceleration sensor 603. In the exemplary embodiment, the acceleration sensor 603 is, for example, an electrostatic capacitance type MEMS acceleration sensor. In another embodiment, however, another type of acceleration sensor may be used. Further, the acceleration sensor 603 may be an acceleration sensor for detecting the magnitude of acceleration in one axial direction or two axial directions.

The gyro sensor 604 is provided inside the housing 60. The gyro sensor 604 detects the angular velocities about the three axes (the x, y, and z axes described above). Angular velocity data representing the detected angular velocities is output to the UI controller 605. The UI controller 605 outputs, to the gyro sensor 604, a control instruction for the gyro sensor 604. Any number and any combination of gyro sensors may be used as long as the angular velocities about three axes are detected. The gyro sensor 604 may be constituted by a two-axis gyro sensor and a one-axis gyro sensor. Alternatively, the gyro sensor 604 may be a gyro sensor for detecting the angular velocity about one axis or two axes.

The vibrator 619 is, for example, a vibration motor or a solenoid. The vibrator 619 is connected to the UI controller 605. The terminal apparatus 6 is vibrated by actuating the vibrator 619 in accordance with a control instruction outputted from the UI controller 605 to the vibrator 619. The vibration of the terminal apparatus 6 is transmitted to the user's hand holding the terminal apparatus 6. Thus, a so-called vibration-feedback game is achieved.

The UI controller 605 outputs, to the codec LSI 606, the operation data including the touch position data, the stick data, the operation button data, the orientation data, the acceleration data, and the angular velocity data, which have been received from the respective components. If another device is connected to the terminal apparatus 6 through the extension connector 67, data representing operation to said another device may be included in the operation data.

The codec LSI 606 is a circuit for performing a compression process on data to be transmitted to the game apparatus body 5, and a decompression process on data transmitted from the game apparatus body 5. The LCD 61, the camera 66, the sound IC 608, the wireless module 610, the flash memory 613, and the infrared communication module 612 are connected to the codec LSI 606. The codec LSI 606 includes a CPU 617 and an internal memory 618. Although the terminal apparatus 6 is configured not to perform game processing, the terminal apparatus 6 may execute a program for managing the terminal apparatus 6 or a program for communication. For example, a program stored in the flash memory 613 is loaded into the internal memory 618 and executed by the CPU 617 when the terminal apparatus 6 is powered on, thereby starting up the terminal apparatus 6. A part of the area of the internal memory 618 is used as a VRAM for the LCD 61.

The camera 66 takes an image in accordance with an instruction from the game apparatus body 5, and outputs data of the taken image to the codec LSI 606. The codec LSI 606 outputs, to the camera 66, a control instruction for the camera 66, such as an instruction to take an image. The camera 66 is also capable of taking a moving picture. That is, the camera 66 is capable of repeatedly performing image taking, and repeatedly outputting image data to the codec LSI 606.

The sound IC 608 is connected to the loudspeakers 607 and the microphone 609. The sound IC 608 is a circuit for controlling input of sound data from the microphone 609 to the codec LSI 606 and output of sound data from the codec LSI 606 to the loudspeakers 607. Specifically, when the sound IC 608 receives sound data from the codec LSI 606, the sound IC 608 performs D/A conversion on the sound data, and outputs a resultant sound signal to the loudspeakers 607 to cause the loudspeakers 607 to output a sound. The microphone 609 detects sound (such as user's voice) propagated to the terminal apparatus 6, and outputs a sound signal representing the sound to the sound IC 608. The sound IC 608 performs A/D conversion on the sound signal from the microphone 609, and outputs a predetermined form of sound data to the codec LSI 606.

The codec LSI 606 transmits the image data from the camera 66, the sound data from the microphone 609, and the operation data from the UI controller 605 (terminal operation data), to the game apparatus body 5 through the wireless module 610. In the exemplary embodiment, the codec LSI 606 subjects the image data and the sound data to a compression process similar to that performed by the codec LSI 27. The compressed image data and sound data, and the terminal operation data are output to the wireless module 610 as transmission data. The antenna 611 is connected to the wireless module 610, and the wireless module 610 transmits the transmission data to the game apparatus body 5 through the antenna 611. The wireless module 610 has the same function as the terminal communication module 28 of the game apparatus body 5. That is, the wireless module 610 has a function of connecting to a wireless LAN by a method based on, for example, the IEEE 802.11n standard. The data transmitted from the wireless module 610 may be encrypted where necessary, or may not be encrypted.

As described above, the transmission data transmitted from the terminal apparatus 6 to the game apparatus body 5 includes the operation data (terminal operation data), the image data, and the sound data. If another device is connected to the terminal apparatus 6 through the extension connector 67, data received from said another device may be included in the transmission data. The infrared communication module 612 performs, with another device, infrared communication based on, for example, the IRDA standard. The codec LSI 606 may include, in the transmission data, data received by the infrared communication, and transmit the transmission data to the game apparatus body 5, where necessary.

As described above, the compressed image data and sound data are transmitted from the game apparatus body 5 to the terminal apparatus 6. These data are received by the codec LSI 606 through the antenna 611 and the wireless module 610. The codec LSI 606 decompresses the received image data and sound data. The decompressed image data is output to the LCD 61, and an image according to the image data is displayed on the LCD 61. On the other hand, the decompressed sound data is output to the sound IC 608, and a sound based on the sound data is output from the loudspeakers 607.

When control data is included in the data received from the game apparatus body 5, the codec LSI 606 and the UI controller 605 make control instructions for the respective components, according to the control data. As described above, the control data represents control instructions for the respective components (in the exemplary embodiment, the camera 66, the touch panel controller 601, the marker section 65, the sensors 602 to 604, the vibrator 619, and the infrared communication module 612) included in the terminal apparatus 6. In the exemplary embodiment, the control instructions represented by the control data are considered to be instructions to start and halt (stop) the operations of the above components. That is, some components which are not used for a game may be halted to reduce power consumption. In this case, data from the halted components are not included in the transmission data transmitted from the terminal apparatus 6 to the game apparatus body 5. The marker section 65 is constituted by infrared LEDs, and therefore, the marker section 65 is controlled by simply turning on/off the supply of power thereto.

As described above, the terminal apparatus 6 includes the operation means such as the touch panel 62, the analog sticks 63, and the operation buttons 64. Alternatively, in another embodiment, the terminal apparatus 6 may include other operation means instead of or in addition to these operation means.

The terminal apparatus 6 includes the magnetic sensor 602, the acceleration sensor 603, and the gyro sensor 604 as sensors for calculating the movement (including the position and the attitude, or a change in the position or the attitude) of the terminal apparatus 6. Alternatively, in another embodiment, the terminal apparatus 6 may include one or two of these sensors. In still another embodiment, the terminal apparatus 6 may include other sensors instead of or in addition to these sensors.

The terminal apparatus 6 includes the camera 66 and the microphone 609. Alternatively, in another embodiment, the terminal apparatus 6 may not include the camera 66 and the microphone 609, or may include either of the cameral 66 and the microphone 609.

The terminal apparatus 6 includes the marker section 65 as a component for calculating the positional relation between the terminal apparatus 6 and the controller 7 (such as the position and/or the attitude of the terminal apparatus 6 as viewed from the controller 7). Alternatively, in another embodiment, the terminal apparatus 6 may not include the marker section 65. In still another embodiment, the terminal apparatus 6 may include other means as a component for calculating the above positional relation. For example, the controller 7 may include a marker section, and the terminal apparatus 6 may include an image pickup element. In this case, the marker 8 may include an image pickup element instead of an infrared LED.

Figure 7:
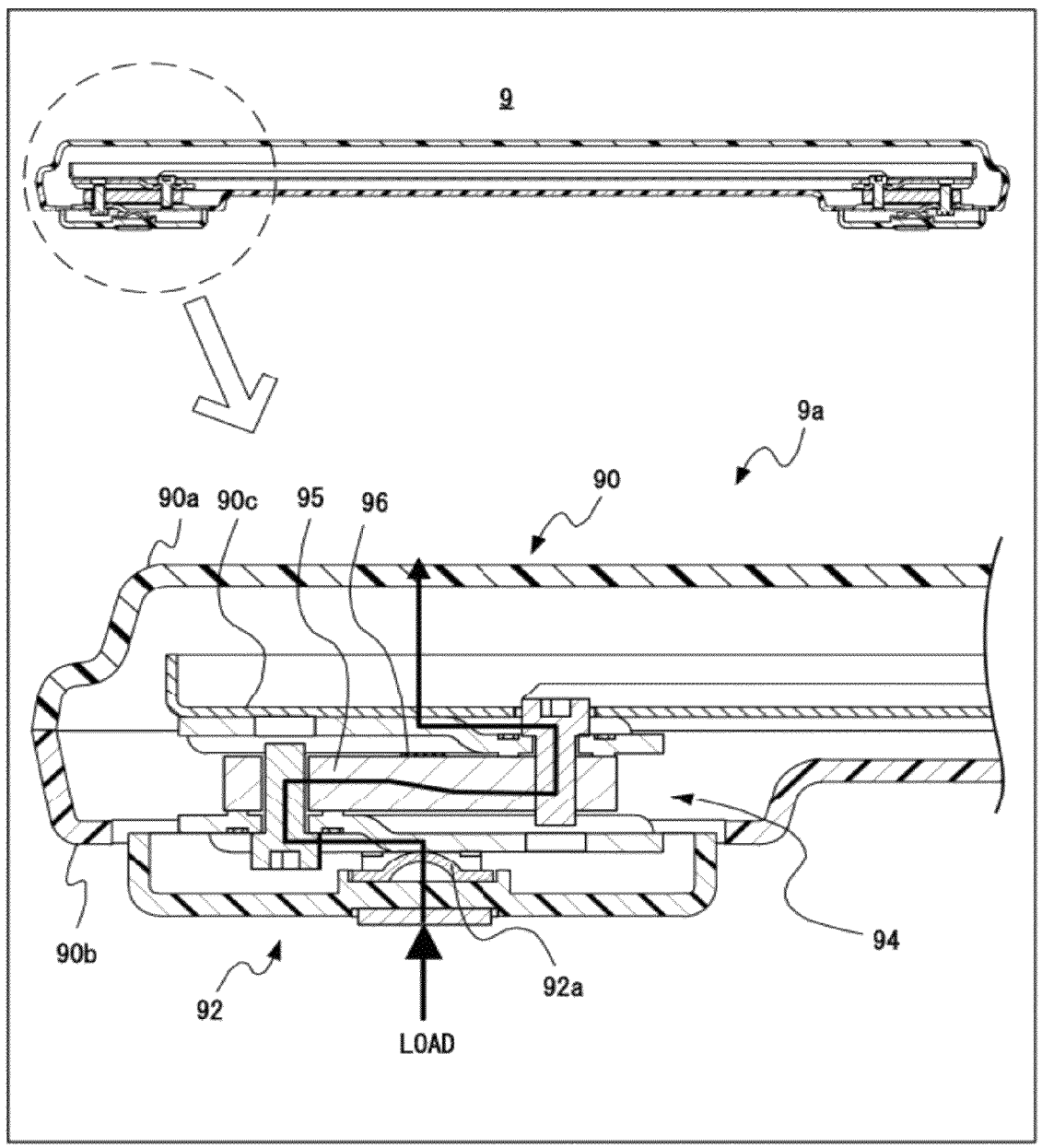
FIG. 7 is a diagram showing a non-limiting example of a cross-sectional view of the board-type controller 9 shown in FIG. 6 taken along line A-A, and a non-limiting example of an enlarged view of a corner portion where a load sensor 94 is arranged.
Figure 8:
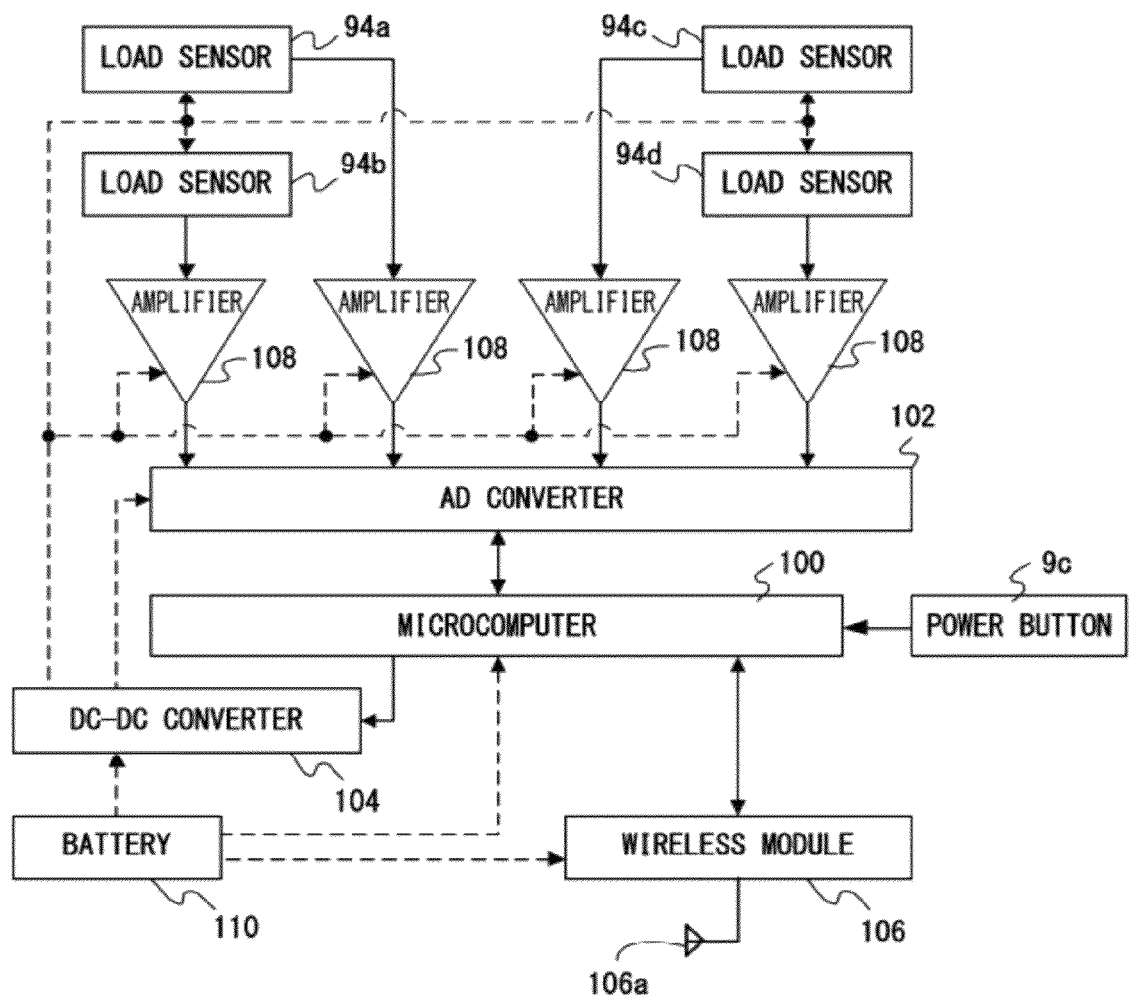
FIG. 8 is a block diagram showing a non-limiting example of the electrical configuration of the board-type controller 9 of FIG. 6.

Next, with reference to FIGS. 6 through 8, the configuration of the board-type controller 9 is described. FIG. 6 is a perspective view illustrating an example of the appearance of the board-type controller 9 shown in FIG. 1. As shown in FIG.

6, the board-type controller 9 includes a platform 9a on which a user stands (on which the user places their feet), and at least four load sensors 94a through 94d for detecting a load applied to the platform 9a. Each of the load sensors 94a through 94d is embedded in the platform 9a (see FIG. 7), and the positions where the load sensors 94a through 94d are provided are indicated by dotted lines in FIG. 6. In the following description, the four load sensors 94a through 94d may be collectively referred to as a load sensor 94.

The platform 9a is formed in the shape of substantially a rectangular parallelepiped, and is in the shape of substantially a rectangle as viewed from the top. For example, the short side of the rectangular shape of the platform 9a is approximately 30 cm, and the long side thereof is approximately 50 cm. The upper surface of the platform 9a is flat, and has a pair of planes on which the user stands with the bottoms of their feet contacting thereto. Specifically, the upper surface of the platform 9a has a plane (a back-left region enclosed with a double line in FIG. 6) on which the user's left foot is placed, and a plane (a front-right region enclosed with a double line in FIG. 6) on which the user's right foot is placed. The platform 9a has, at four corners thereof, side surfaces each partially projecting outward in a cylindrical shape.

In the platform 9a, the four load sensors 94a through 94d are arranged at predetermined intervals. In the exemplary embodiment, the four load sensors 94a through 94d are arranged on the periphery of the platform 9a, more specifically, at the four corners of the platform 9a. The intervals of the load sensors 94a through 94d are appropriately set such that the load sensors 94a through 94d can accurately detect the intention of a game operation which is expressed by a manner of applying a load to the platform 9a by the user.

FIG. 7 shows an example of a cross-sectional view of the board-type controller 9, taken along line A-A in FIG. 6, and an example of an enlarged view of a corner part where a load sensor 94 is arranged. In FIG. 7, the platform 9a includes a support plate 90 on which the user stands, and legs 92. The load sensors 94a through 94d are provided in positions where the legs 92 are provided. In the exemplary embodiment, the four legs 92 are provided at the four corners, and therefore, the four load sensors 94a through 94d are also provided at the corresponding four corners. Each leg 92 is formed by plastic molding in the shape of substantially a cylinder with a base. Each load sensor 94 is located on a spherical part 92a provided on the base of the corresponding leg 92. The support plate 90 is supported by the legs 92 via the load sensors 94.

The support plate 90 includes an upper plate 90a forming an upper surface and an upper side surface portion, a lower plate 90b forming a lower surface and a lower side surface portion, and an intermediate plate 90c provided between the upper plate 90a and the lower plate 90b. The upper plate 90a and the lower plate 90b are formed by, for example, plastic molding, and are integrated using an adhesive or the like. The intermediate plate 90c is, for example, formed of a single metal plate by press forming. The intermediate plate 90c is fixed onto the four load sensors 94a through 94d. The upper plate 90a has, on a lower surface thereof, a grid-patterned rib (not shown), and is supported by the intermediate plate 90c via the rib. Therefore, when the user stands on the platform 9a, the load is transferred to the four legs 92 via the support plate 90 and the load sensors 94a through 94d. As indicated by arrows in FIG. 7, a reaction from a floor, which is generated by the input load, is transferred from the legs 92 through the spherical parts 92a, the load sensors 94a through 94d and the intermediate plate 90c to the upper plate 90a.

Each load sensor 94 is, for example, a strain gauge (strain sensor) load cell, which is a load converter for converting an input load to an electrical signal. In the load sensor 94, a strain-generating body 95 is deformed according to an input load, resulting in a strain. The strain is converted into a change of electrical resistance and then converted into a change of voltage by a strain sensor 96 attached to the strain-generating body 95. Therefore, the load sensor 94 outputs, from an output terminal thereof, a voltage signal indicating the input load.

The load sensor 94 may be of other types, such as a tuning fork type, a string vibration type, an electrostatic capacitance type, a piezoelectric type, a magnetostrictive type, and a gyroscopic type.

Referring back to FIG. 6, the board-type controller 9 further includes a power button 9c. When the power button 9c is operated (e.g., when the power button 9c is pressed) in the state where the board-type controller 9 is not activated, power is supplied to each of circuit components (see FIG. 8) of the board-type controller 9. There are, however, cases in which the board-type controller 9 is powered on in accordance with an instruction from the game apparatus body 5 and thereby supply of power to the circuit components is started. The board-type controller 9 may be automatically powered off when a state where the user does not stand thereon continues for a predetermined period of time (e.g., 30 sec) or more. Further, when the power button 9c is again operated in the state where the board-type controller 9 is in the active state, the board-type controller 9 may be powered off to stop supply of power to the circuit components.

FIG. 8 is a block diagram showing an example of an electrical configuration of the board-type controller 9. In FIG. 8, flows of signals and data are indicated by solid arrows, and supply of power is indicated by dotted arrows.

As shown in FIG. 8, the board-type controller 9 includes a microcomputer 100 for controlling the operation thereof. The microcomputer 100 includes a CPU, a ROM, a RAM, and the like, which are not shown. The CPU controls the operation of the board-type controller 9 in accordance with a program stored in the ROM.

The power button 9c, an AD converter 102, a DC-DC converter 104, and a wireless module 106 are connected to the microcomputer 100. An antenna 106a is connected to the wireless module 106. The four load sensors 94a through 94d are connected to the AD converter 102 via amplifiers 108.

Further, the board-type controller 9 includes a battery 110 for supplying power to the circuit components. In another embodiment, an AC adapter may be connected to the board-type controller 9 instead of the battery 110 so that commercial power is supplied to the circuit components. In this case, instead of the DC-DC converter 104, a power circuit, which converts alternating current into direct current and lowers and rectifies a direct-current voltage, needs to be provided in the board-type controller 9. In the exemplary embodiment, power is supplied directly from the battery 110 to the microcomputer 100 and the wireless module 106. In other words, power is constantly supplied from the battery 110 to the wireless module 106 and some components (such as the CPU) in the microcomputer 100 to detect whether or not the power button 9c is turned on and whether or not a command that instructs power-on is transmitted from the game apparatus body 5. On the other hand, power is supplied from the battery 110 through the DC-DC converter 104 to the load sensors 94a through 94d, the AD converter 102, and the amplifiers 108. The DC-DC converter 104 converts a voltage value of direct current supplied from the battery 110 into a different voltage value, and supplies the resultant direct current to the load sensors 94a through 94d, the AD converter 102, and the amplifiers 108.

Supply of power to the load sensors 94*a* through 94*d*, the A/D converter 102 and the amplifiers 108 may be performed where necessary by the microcomputer 100 that controls the DC-DC converter 104. Specifically, when the microcomputer 100 determines that it is necessary to operate the load sensors 94*a* through 94*d* to detect a load, the microcomputer 100 may control the DC-DC converter 104 to supply power to the load sensors 94*a* through 94*d*, the A/D converter 102 and the amplifiers 108.

When power is supplied to the load sensors 94*a* through 94*d*, the load sensors 94*a* through 94*d* each output a signal indicating a load inputted thereto. These signals are amplified by the respective amplifiers 108, and converted from analog signals into digital data by the A/D converter 102. The digital data is input to the microcomputer 100. The detected values of the load sensors 94*a* through 94*d* are given identification information of the load sensors 94*a* through 94*d*, so that the load sensors 94*a* through 94*d* can be identified from the corresponding detected values. Thus, the microcomputer 100 can acquire the data indicating the detected load values of the four load sensors 94*a* through 94*d* at the same time.

On the other hand, when the microcomputer 100 determines that it is not necessary to operate the load sensors 94*a* through 94*d*, i.e., when it is not the time for load detection, the microcomputer 100 controls the DC-DC converter 104 to stop supply of power to the load sensors 94*a* through 94*d*, the A/D converter 102, and the amplifiers 108. Thus, the board-type controller 9 can operate the load sensors 94*a* through 94*d* to detect a load or a distance only when it is required, resulting in a reduction in power consumption for load detection.

Load detection is typically required when the game apparatus body 5 (FIG. 1) needs to acquire load data. For example, when game apparatus body 5 requires load information, the game apparatus body 5 transmits an information acquisition command to the board-type controller 9. When the microcomputer 100 receives the information acquisition command from the game apparatus body 5, the microcomputer 100 controls the DC-DC converter 104 to supply power to the load sensors 94*a* through 94*d* and the like, thereby detecting a load. On the other hand, when the microcomputer 100 does not receive a load acquisition command from the game apparatus body 5, the microcomputer 100 controls the DC-DC converter 104 to stop supply of power to the load sensors 94*a* through 94*d* and the like.

The microcomputer 100 may control the DC-DC converter 104 on the basis of a determination that the time of load detection arrives at predetermined intervals. When such periodic load detection is performed, information regarding the constant time period may be supplied and stored from the game apparatus body 5 to the microcomputer 100 of the board-type controller 9 when the game is started, or it may be preinstalled in the microcomputer 100.

The data indicating the detected values from the load sensors 94*a* through 94*d* are transmitted as board operation data (input data) for the board-type controller 9 from the microcomputer 100 via the radio module 106 and an antenna 106*b* to the game apparatus body 5. For example, when the microcomputer 100 has performed load detection according to a command from the game apparatus body 5, the microcomputer 100 transmits the detected value data of the load sensors 94*a* through 94*d* to the game apparatus body 5 on receipt of the detected value data from the A/D converter 102. The microcomputer 100 may transmit the detected value data to the game apparatus body 5 at predetermined intervals. If the interval of the data transmission is longer than the interval of the load detection, data containing load values which have been detected at a plurality of detection times up to the subsequent time of transmission may be transmitted.

The wireless module 106 is set so as to perform communication according to the same wireless standard (the Bluetooth, wireless LAN, and the like) as that for the controller communication module 19 of the game apparatus body 5. Accordingly, the CPU 10 of the game apparatus body 5 is allowed to transmit an information acquisition command to the board-type controller 9 through the controller communication module 19 and the like. Thus, the board-type controller 9 is allowed to receive the command from the game apparatus body 5 through the wireless module 106 and the antenna 106*a*. Further, the board-type controller 9 is allowed to transmit the board operation data including the load detection values (or load calculation values) of the load sensors 94*a* through 94*d* to the game apparatus body 5.

For example, in a game which is performed on the basis of a simple sum of four load values detected by the four load sensors 94*a* through 94*d*, the user is allowed to stand at a given position with respect to the four load sensors 94*a* through 94*d* of the board-type controller 9. That is, the user is allowed to stand on the platform 9*a* at a given position and in a given direction to play a game. In some kinds of games, however, the direction of the load value detected by each of the four load sensors 94 viewed from the user needs to be identified. That is, a positional relation between the four load sensors 94 of the board-type controller 9 and the user needs to be recognized. In this case, for example, the positional relation between the four load sensors 94 and the user may be defined in advance, and the user may be supposed to stand on the platform 9*a* in a manner which allows the predetermined positional relation. Typically, a positional relation in which two of the load sensors 94*a* through 94*d* are present in front of, behind, to the right of, and to the left of the user standing in the center of the platform 9*a*, i.e., a positional relation in which the user stands in the center of the platform 9*a* of the board-type controller 9, is defined. In this case, the platform 9*a* of the board-type controller 9 is rectangular in shape as viewed from the top, and the power button 9*c* is provided at one side (long side) of the rectangle. Therefore, it is ruled in advance that the user, using the power button 9*c* as a guide, stands on the platform 9*a* such that the long side at which the power button 9*c* is provided is located in a predetermined direction (front, rear, left or right). In this case, each of the load values detected by the load sensors 94*a* through 94*d* is a load value of a predetermined direction (front right, front left, rear right, or rear left) as viewed from the user. Therefore, the board-type controller 9 and the game apparatus body 5 can find out a direction to which each detected load value corresponds as viewed from the user, on the basis of the identification information of the load sensors 94 contained in the detected load value data, and arrangement data indicating the positions or the directions of the load sensors 94 with respect to the user that is set (stored) in advance. As a result, it is possible to understand the intention of a game operation performed by the user, such as an operating direction, for example, forward, backward, rightward, or leftward direction, or a user's foot being lifted.

Figure 9:
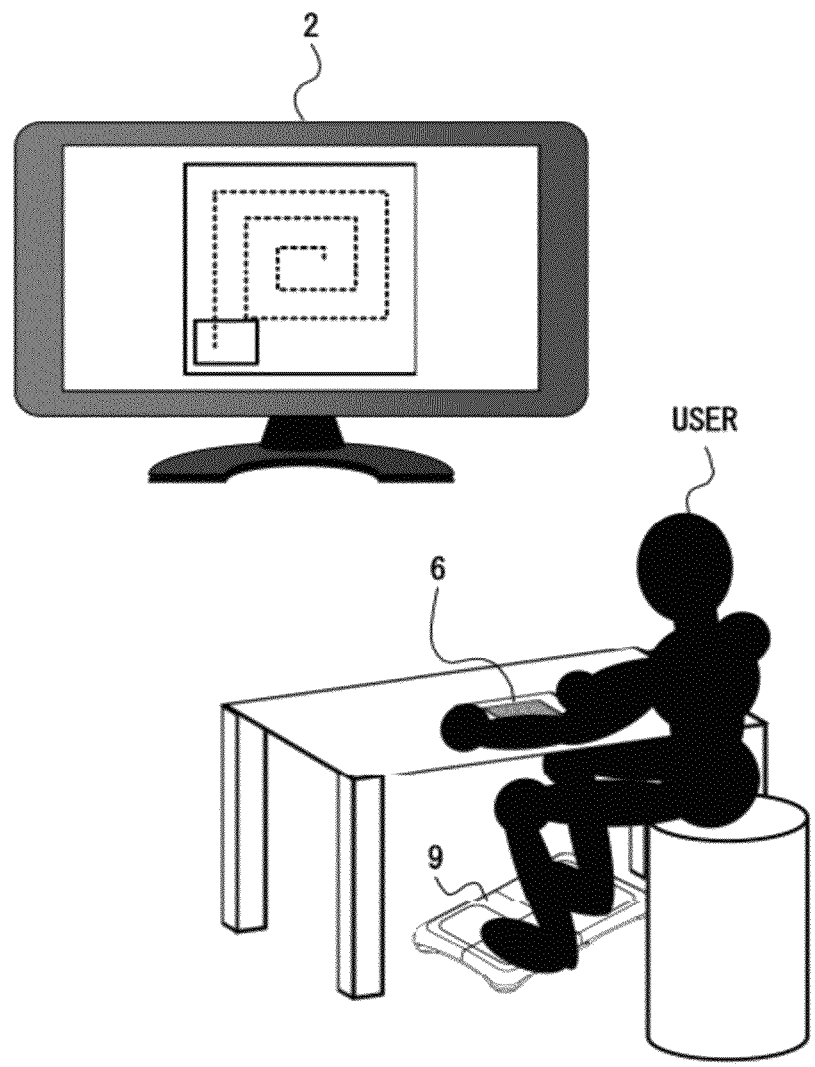
FIG. 9 is a diagram showing a non-limiting example of the state of a user performing an operation using the terminal apparatus 6 and the board-type controller 9.
Figure 10A:
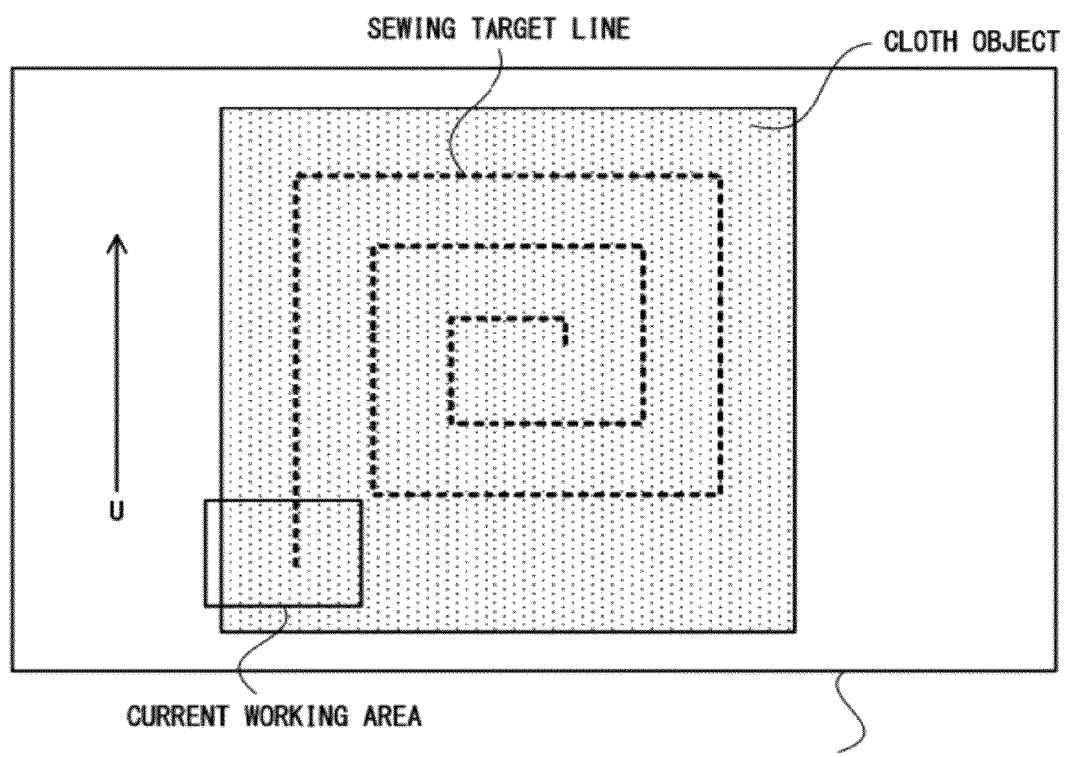
FIG. 10A is a diagram showing a non-limiting example of an image displayed on a monitor 2.
Figure 10B:
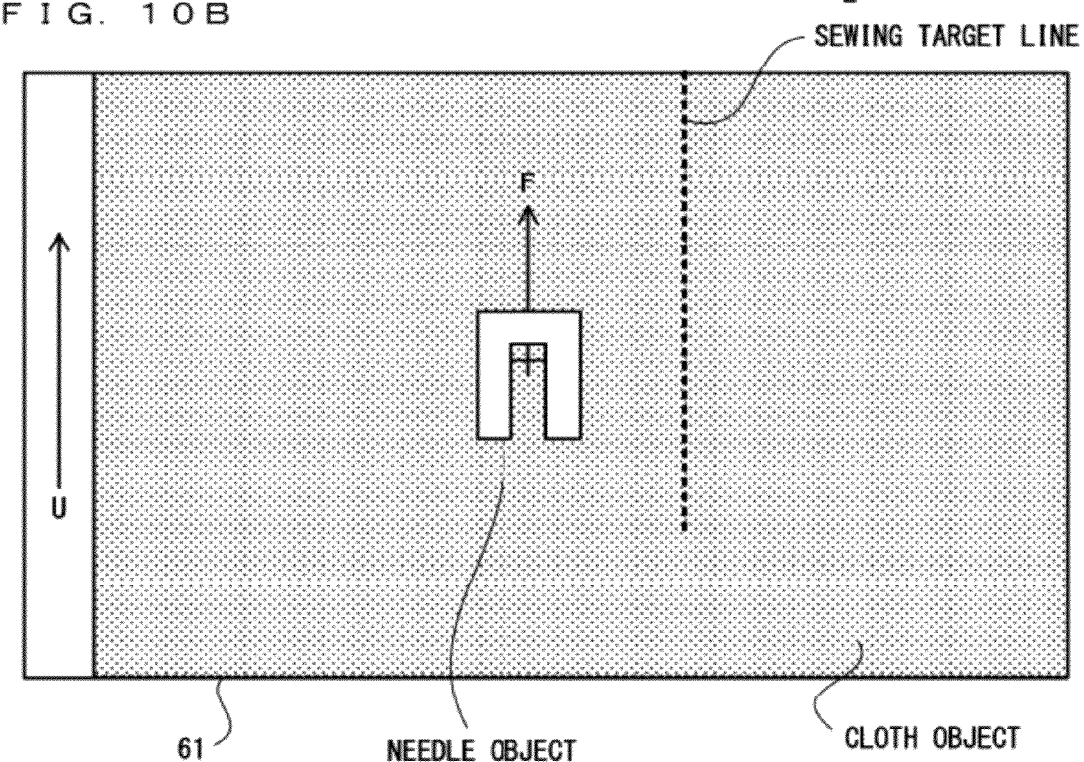
FIG. 10B is a diagram showing a non-limiting example of an image displayed on an LCD 61 of the terminal apparatus 6.
Figure 11A:
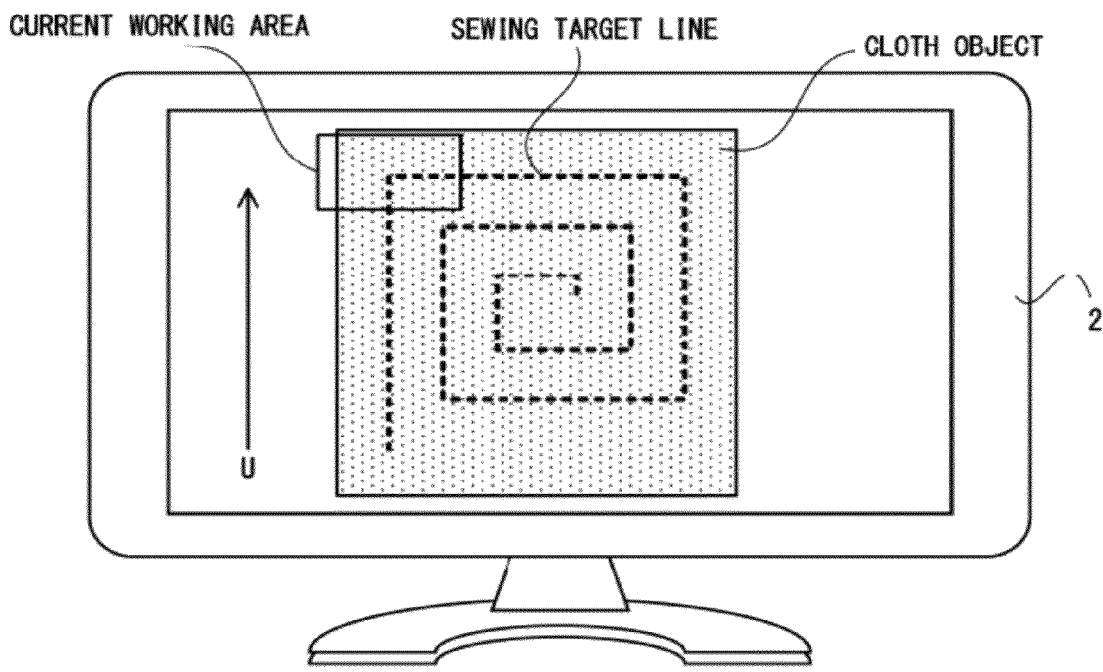
FIG. 11A is a diagram showing a non-limiting example of an image displayed on the monitor 2 in the case where an operation based on the attitude of the terminal apparatus 6 indicates a reference operation indication direction.
Figure 11B:
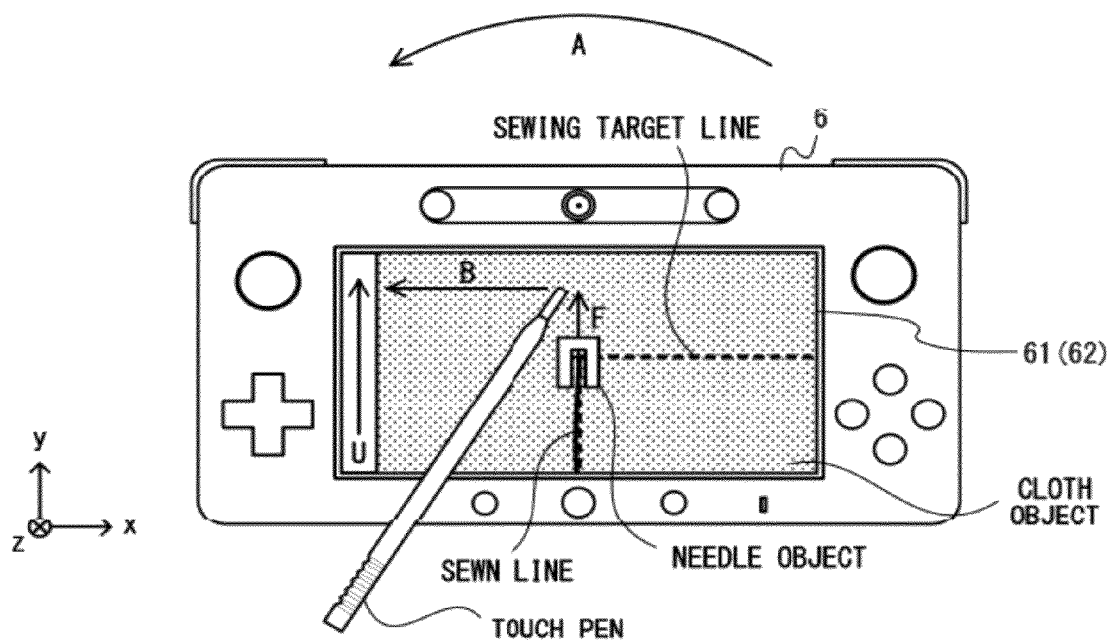
FIG. 11B is a diagram showing a non-limiting example of an image displayed on the LCD 61 of the terminal apparatus 6 in the state where the operation based on the attitude of the terminal apparatus 6 indicates the reference operation indication direction.
Figure 12A:
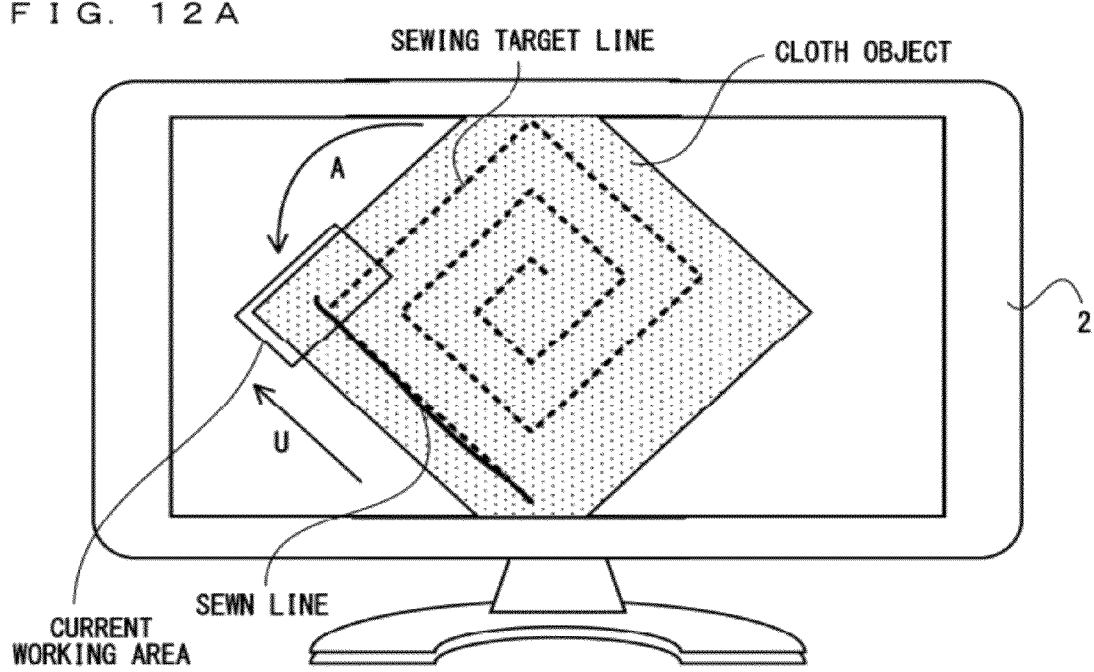
FIG. 12A is a diagram showing a non-limiting example of an image displayed on the monitor 2 in the case where the terminal apparatus 6 has been roll-rotated counterclockwise on a table from the state shown in FIG. 11B.
Figure 12B:
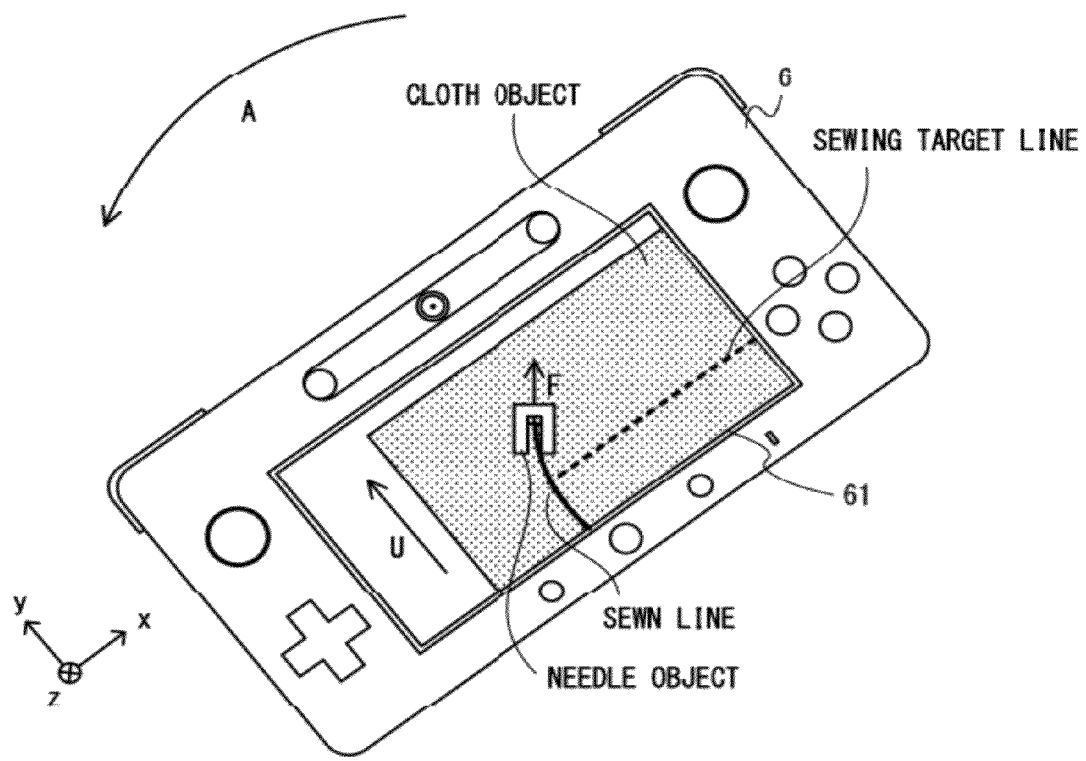
FIG. 12B is a diagram showing a non-limiting example of an image displayed on the LCD 61 of the terminal apparatus 6 in the case where the terminal apparatus 6 has been roll-rotated counterclockwise on the table from the state shown in FIG. 11B.
Figure 13A:
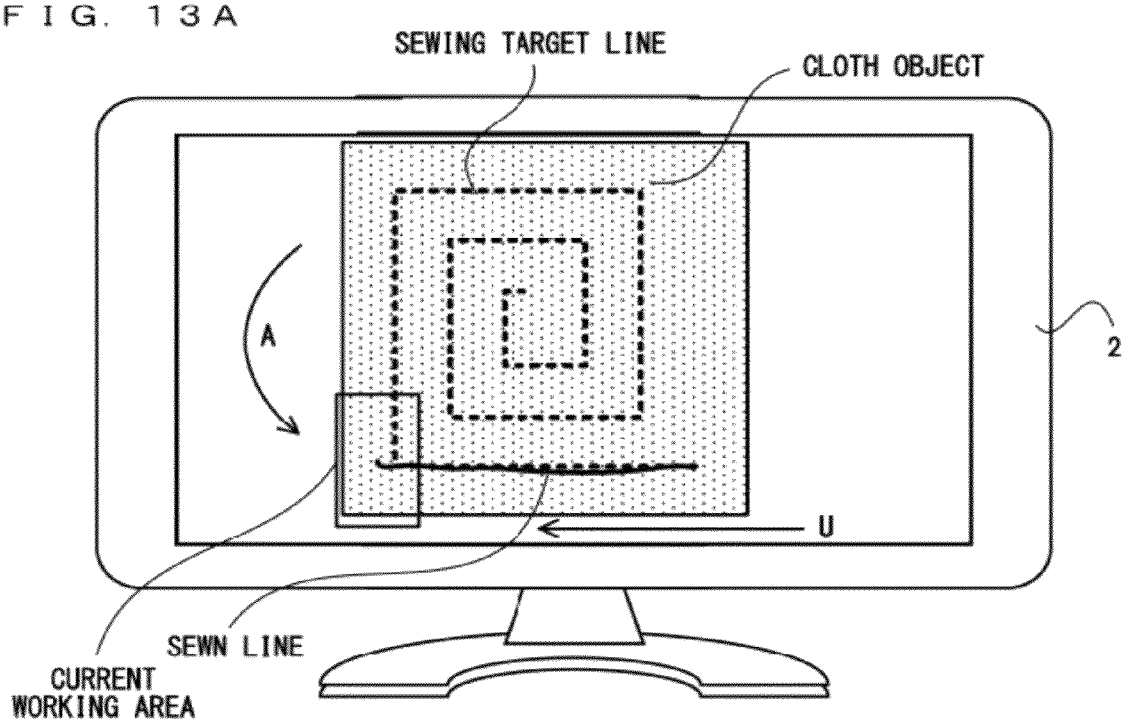
FIG. 13A is a diagram showing a non-limiting example of an image displayed on the monitor 2 in the case where the terminal apparatus 6 has been roll-rotated counterclockwise 90° on the table from the state shown in FIG. 11B.
Figure 13B:
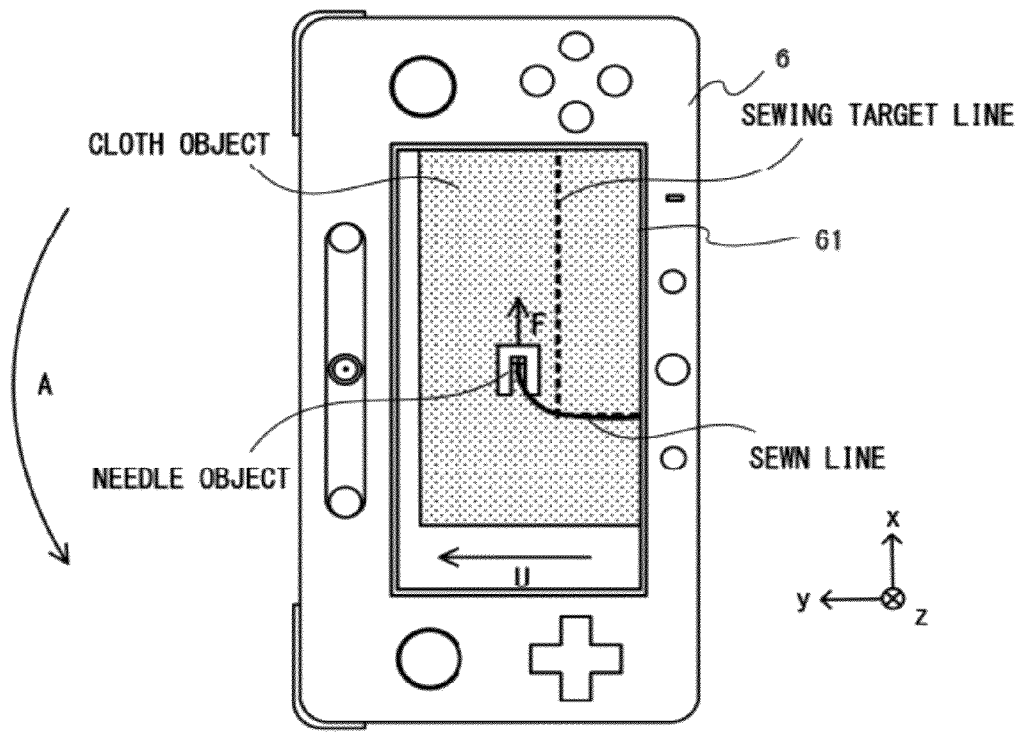
FIG. 13B is a diagram showing a non-limiting example of an image displayed on the LCD 61 of the terminal apparatus 6 in the case where the terminal apparatus 6 has been roll-rotated counterclockwise 90° on the table from the state shown in FIG. 11B.
Figure 14:
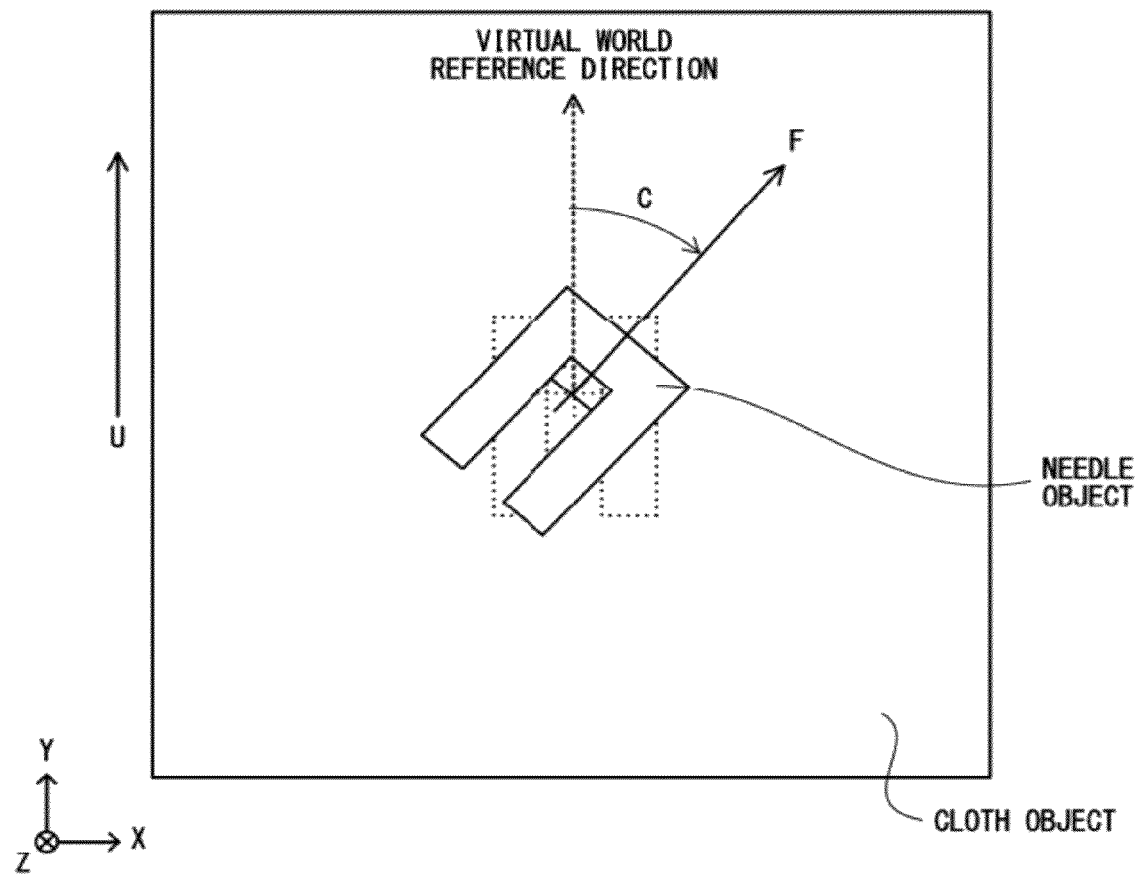
FIG. 14 is a diagram illustrating a non-limiting rotational movement of a needle object as an example corresponding to a change in an operation indication direction that is obtained from the attitude of the terminal apparatus 6.
Figure 14:
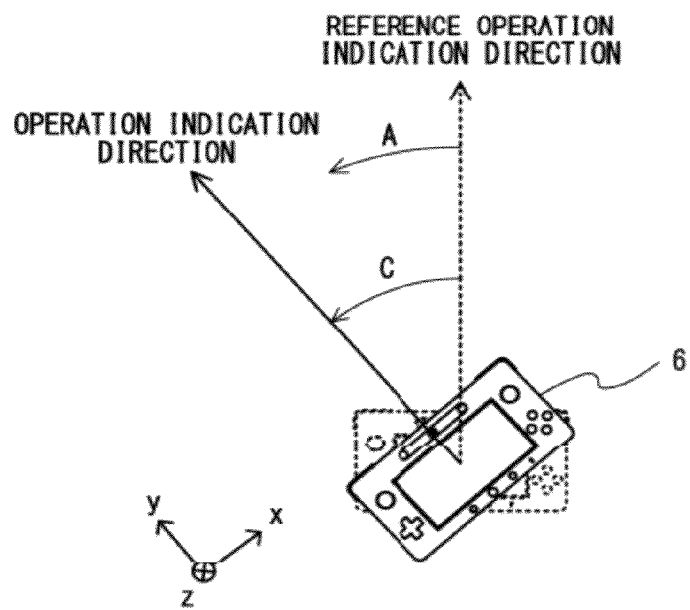
Figure 15A:
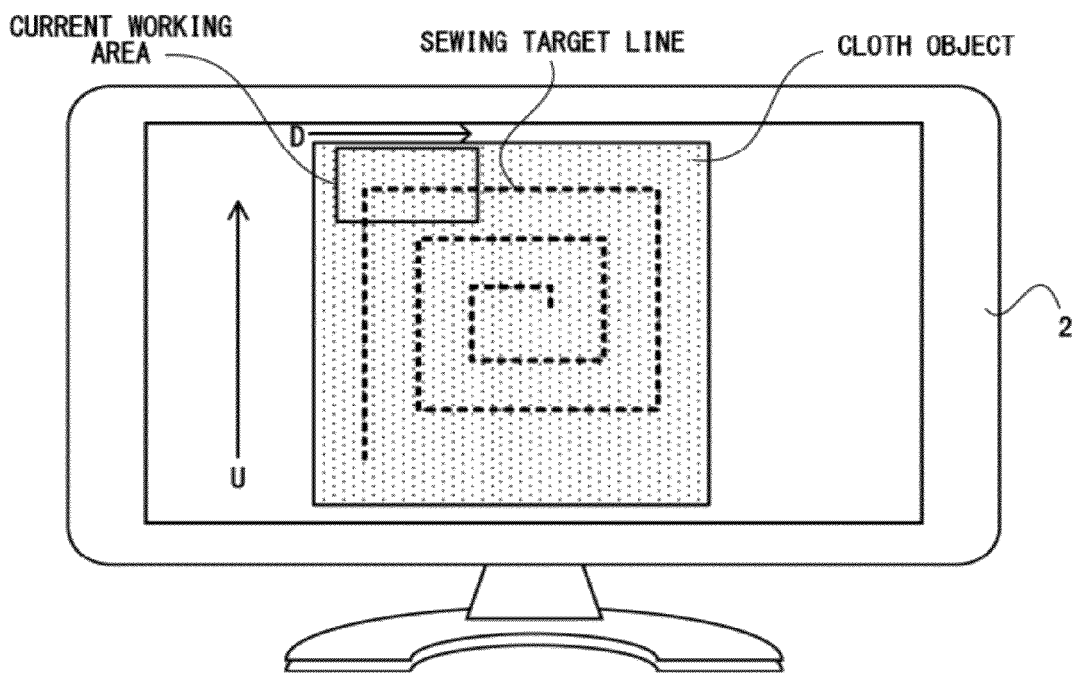
FIG. 15A is a diagram showing a non-limiting example of an image displayed on the monitor 2 in the case where a touch operation has been performed on a touch panel 62 of the terminal apparatus 6 in the state shown in FIG. 11B.
Figure 15B:
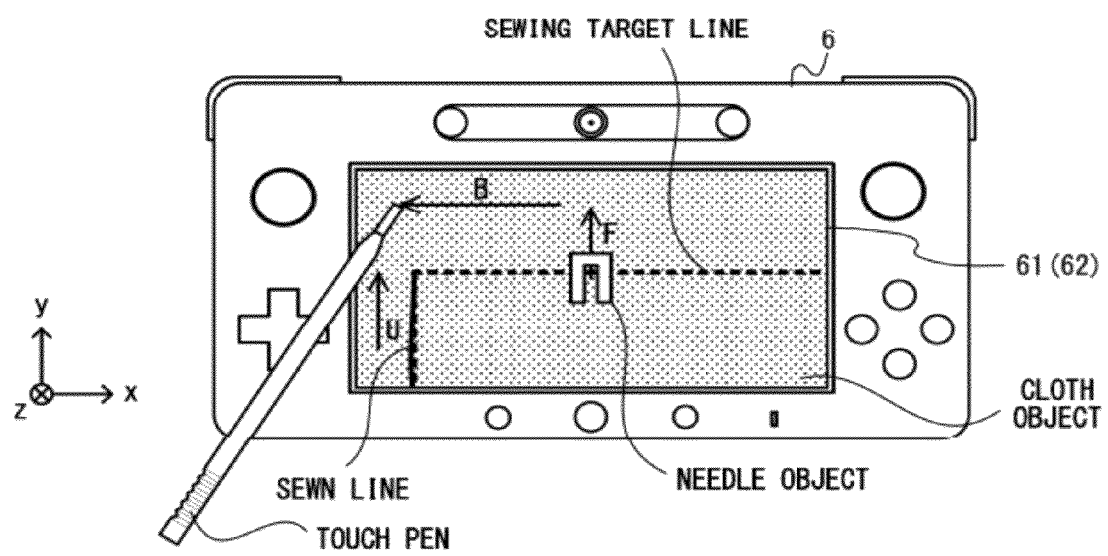
FIG. 15B is a diagram showing a non-limiting example of an image displayed on the LCD 61 of the terminal apparatus 6 in the case where the touch operation has been performed on the touch panel 62 of the terminal apparatus 6 in the state shown in FIG. 11B.
Figure 16:
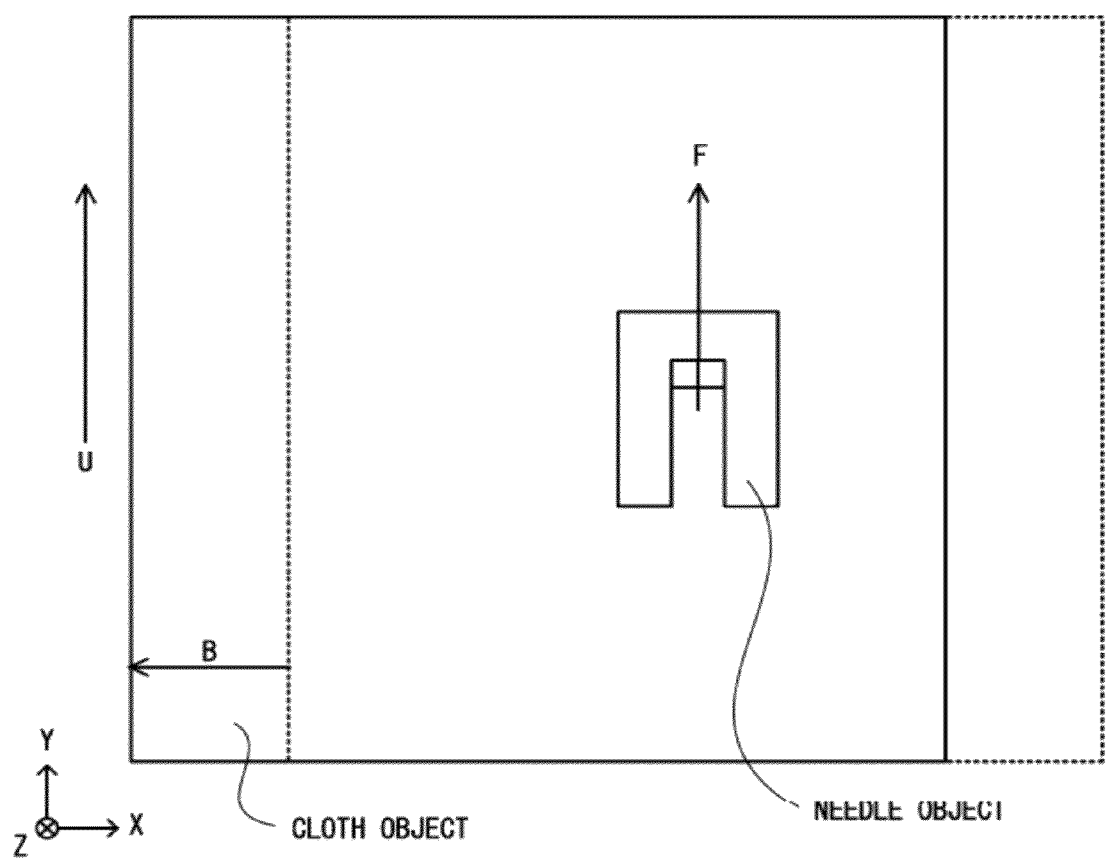
FIG. 16 is a diagram illustrating a non-limiting shifting movement of a cloth object as an example corresponding to the touch operation performed on the touch panel 62 of the terminal apparatus 6.
Figure 16:
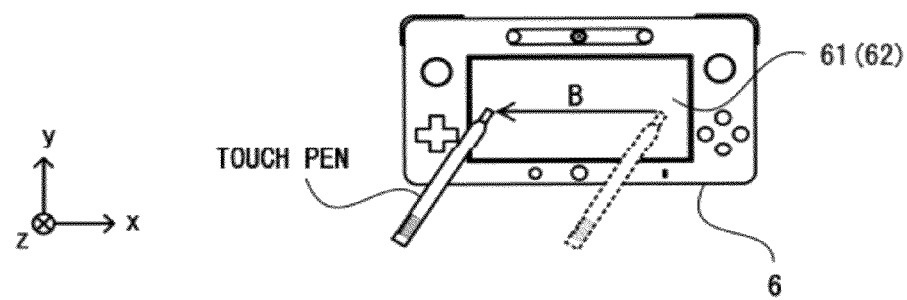

Next, with reference to the drawings, a description is given of an overview of the game processing performed by the game apparatus body 5, before descriptions are given of specific processes performed by the game apparatus body 5. It should be noted that FIG. 9 is a diagram showing an example of the state of a user performing an operation using the terminal apparatus 6 and the board-type controller 9. FIG. 10A is a diagram showing an example of an image displayed on the monitor 2. FIG. 10B is a diagram showing an example of an image displayed on the LCD 61 of the terminal apparatus 6. FIG. 11A is a diagram showing an example of an image displayed on the monitor 2 in the case where an operation based on the attitude of the terminal apparatus 6 indicates a reference operation indication direction. FIG. 11B is a diagram showing an example of an image displayed on the LCD 61 of the terminal apparatus 6 in the state where the operation based on the attitude of the terminal apparatus 6 indicates the reference operation indication direction. FIG. 12A is a diagram showing an example of an image displayed on the monitor 2 in the case where the terminal apparatus 6 has been roll-rotated counterclockwise on a table from the state shown in FIG. 11B. FIG. 12B is a diagram showing an example of an image displayed on the LCD 61 of the terminal apparatus 6 in the case where the terminal apparatus 6 has been roll-rotated counterclockwise on the table from the state shown in FIG. 11B. FIG. 13A is a diagram showing an example of an image displayed on the monitor 2 in the case where the terminal apparatus 6 has been roll-rotated counterclockwise 90° on the table from the state shown in FIG. 11B. FIG. 13B is a diagram showing an example of an image displayed on the LCD 61 of the terminal apparatus 6 in the case where the terminal apparatus 6 has been roll-rotated counterclockwise 90° on the table from the state shown in FIG. 11B. FIG. 14 is a diagram illustrating the rotational movement of a needle object as an example corresponding to a change in an operation indication direction that is obtained from the attitude of the terminal apparatus 6. FIG. 15A is a diagram showing an example of an image displayed on the monitor 2 when a touch operation has been performed on the touch panel 62 of the terminal apparatus 6 in the state shown in FIG. 11B. FIG. 15B is a diagram showing an example of an image displayed on the LCD 61 of the terminal apparatus 6 when the touch operation has been performed on the touch panel 62 of the terminal apparatus 6 in the state shown in FIG. 11B. FIG. 16 is a diagram illustrating the shifting movement of a cloth object as an example corresponding to the touch operation performed on the touch panel 62 of the terminal apparatus 6.

As shown in FIG. 9, the user performs an operation using the terminal apparatus 6 and the board-type controller 9. The user performs the operation of changing the attitude and the direction of the terminal apparatus 6, the operation of touching the touch panel 62 of the terminal apparatus 6, and the operation of changing a load to be applied to the board-type controller 9. Specifically, the user holds the body of the terminal apparatus 6 in the state where the terminal apparatus 6 is mounted on a table, and places both feet on the board-type controller 9. Then, the user takes action on the board-type controller 9 while viewing an image displayed on the monitor 2 or an image displayed on the LCD 61 of the terminal apparatus 6 (e.g., performs the operation of repeatedly applying loads back and forth to the board-type controller 9 by moving both feet on the board-type controller 9 as if stepping back and forth on the pedal of a sewing machine). Further, the user plays by performing the operation of moving the terminal apparatus 6 on the table, and performing a touch operation on the touch panel 62 of the terminal apparatus 6. Then, on the LCD 61 and the monitor 2 of the terminal apparatus 6, game images are represented such that objects (a needle object and a cloth object) in a virtual world take action (e.g., the actions of changing their attitudes and directions, and the actions of moving their positions) in accordance with the direction (attitude) of the terminal apparatus 6 on the table and the touch operation performed on the touch panel 62 of the terminal apparatus 6, and the attitudes and the positions of virtual cameras set in the virtual world are changed in accordance with the directions and the positions of the objects. Furthermore, an object (e.g., the cloth object) takes action (e.g., moves its position) in the virtual world in accordance with the action taken by the user on the board-type controller 9. It should be noted that descriptions are given below using exemplary information processing (hereinafter occasionally referred to as "game processing") where the user operates the board-type controller 9 as if operating the pedal of a sewing machine, and performs the operation of moving the terminal apparatus 6 on a table as if moving a piece of cloth to be sewn with the sewing machine, thereby simulating the state of the cloth object in the virtual world being sewn in accordance with the position of the needle object.

As shown in FIG. 10A, on the monitor 2, an image of a virtual world is displayed that is obtained by looking down, upon the state of a cloth object placed in the virtual world, from a position directly above and far from the cloth object. In the example shown in FIG. 10A, a sewing target line (the dashed line shown in FIG. 10A), which is a target line for sewing the cloth object, is drawn on the cloth object. In the example shown in FIG. 10A, a current working area, which is the area where sewing work is currently being performed, is also drawn on the cloth object. It should be noted that the current working area indicates the area corresponding to the range of the virtual world displayed on the LCD 61. Then, when an operation based on the attitude of the terminal apparatus 6 indicates a reference operation indication direction described later, display is performed on the monitor 2 such that the up direction of the cloth object (the direction U shown in the figures) is directed in a virtual world reference direction (e.g., the up direction of the virtual world displayed on the monitor 2). The state of the virtual world that is obtained by looking down upon the entire cloth object is thus displayed on the monitor 2, whereby the user can easily understand the state of the entire cloth object and the positional relationship between the cloth object and the current working area, and another person viewing the state of the user playing the game can also enjoy viewing the state of the cloth object being sewn.

In addition, as shown in FIG. 10B, on the LCD 61 of the terminal apparatus 6, an image of the virtual world is displayed that is obtained by looking down, upon the state of a needle object sewing the cloth object in the virtual world, from a position directly above and close to the needle object. It should be noted that the point of view toward the virtual world displayed on the LCD 61 is relatively close to the cloth object (the needle object). Accordingly, it is set such that the distance from the point of view to the needle object is short relative to the distance from the point of view toward the virtual world displayed on the monitor 2 to the cloth object. In the example shown in FIG. 10B, the cloth object and the needle object placed on the cloth object are displayed. Then, on the LCD 61, the part of the cloth object that is included within the current working area is displayed, and the needle object is displayed at the position on the cloth object that is substantially the center of the LCD 61. Further, when an operation based on the attitude of the terminal apparatus 6 indicates the reference operation indication direction described later, the cloth object is displayed such that the up direction of the cloth object (the direction U shown in the figures) is the up direction of the LCD 61 (the y-axis positive direction), and the needle object is displayed at the central position of the LCD 61 so as to have such an attitude that the forward direction of the needle object (the direction F shown in the figures) is the up direction of the LCD 61. The part of the cloth object and the needle object are thus displayed on the LCD 61 as viewed from a position directly above and close to the cloth object to be sewn with a sewing machine and the needle object corresponding to the needle of the sewing machine, whereby it is possible to perform information processing of simulating sewing as if the user, viewing the display on the LCD 61 while operating the terminal apparatus 6 on a table, views a piece of cloth and a needle through the LCD 61 when operating the terminal apparatus 6 as a sewing machine. This makes it possible to provide a sense of presence in the virtual world.

It should be noted that in the example shown in FIG. 10A, on the monitor 2, the state of the virtual world is displayed that is obtained by looking down from a position directly above and far from the cloth object. Alternatively, the virtual world viewed from another point of view may be displayed on the monitor 2. The same virtual world may be displayed not only on the terminal apparatus 6 but also on the monitor 2, and images of the virtual world that are different from each other in the point of view may be displayed, whereby, in accordance with the state of the operation or preference, the user can appropriately use either one of the images displayed on the two display apparatuses when performing an operation. The point of view toward the virtual world displayed on the monitor 2 may be, for example, a position obliquely above the cloth object instead of the position directly above the cloth object, so long as the range of the virtual world displayed on the monitor 2 is wider than the range of the virtual world displayed on the terminal apparatus 6.

As an example, when the user has performed the operation of repeatedly applying loads back and forth to the board-type controller 9, the cloth object moves so as to slide in the backward direction of the needle object (the direction opposite to the direction F shown in the figures). Then, the cloth object is sewn at on the line along which the needle object has passed on the cloth object by the slide, and a sewn line is drawn on the line. At this time, the shorter the cycle of the user repeatedly applying loads to a front portion and a back portion of the board-type controller 9, the greater the moving velocity of the cloth object sliding. By thus taking action on the board-type controller 9, the user can control the velocity of the cloth object moving (i.e., the speed of the cloth object being sewn).

For example, as described above, the board-type controller 9 outputs detected load values based on the action taken by the user on the board-type controller 9. Then, the use of the detected load values makes it possible to calculate a front load value of the load applied to the front portion of the board-type controller 9 (i.e., the total value of the loads detected by the load sensors 94c and 94d) and a back load value of the load applied to the back portion of the board-type controller 9 (i.e., the total value of the loads detected by the load sensors 94a and 94b), using the detected load values. The use of the front load value and the back load value makes it possible to estimate whether the user is putting weight on the front portion of the board-type controller 9, or is putting weight on the back portion of the board-type controller 9, or is decreasing the load applied to the board-type controller 9. The speed of the cloth object being sewn while sliding is set in accordance with the action of the user thus estimated on the board-type controller 9.

In addition, the direction of the needle object relative to the cloth object in the virtual world changes in accordance with the direction (attitude) of the terminal apparatus 6 on the table. For example, the direction of the needle object relative to the cloth object in the virtual world changes to the right and left in accordance with the user rotating (rolling) the terminal apparatus 6 about the perspective direction of the LCD 61 (a terminal apparatus perspective direction) in the state where the back surface of the terminal apparatus 6 is in surface contact with the table.

As shown in FIG. 11A, when the operation based on the attitude of the terminal apparatus 6 indicates the reference operation indication direction, display is performed on the monitor 2 such that the up direction of the cloth object (the direction U shown in the figures) is directed in the virtual world reference direction (e.g., the up direction of the virtual world displayed on the monitor 2). Further, as shown in FIG. 11B, when the operation based on the attitude of the terminal apparatus 6 indicates the reference operation indication direction, the cloth object is displayed such that the up direction described above of the cloth object is the up direction of the LCD 61 (the y-axis positive direction), and the needle object is displayed at the central position of the LCD 61 so as to have such an attitude that the forward direction of the needle object (the direction F shown in the figures) is the up direction of the LCD 61. Here, the state where the operation based on the attitude of the terminal apparatus 6 indicates the reference operation indication direction means the state of the terminal apparatus 6 directed in the same direction as the direction in which the terminal apparatus 6 has been placed on the table when initially set. This means the state where the terminal apparatus 6 is mounted on the table such that, typically, the up direction of the terminal apparatus 6 (the y-axis positive direction) is directed in the forward direction of the user (i.e., such that the y-axis negative direction is the direction toward the user). That is, when the operation based on the attitude of the terminal apparatus 6 indicates the reference operation indication direction, the cloth object and the needle object are displayed such that the up direction of the cloth object (the direction U shown in the figures) is both the up directions of the monitor 2 and the LCD 61, and the forward direction of the needle object (the direction F shown in the figures) is the up direction of the LCD 61.

Then, when the terminal apparatus 6 indicating the reference operation indication direction has been rotated counterclockwise about the perspective direction of the LCD 61 (the z-axis direction) on the table (i.e., rolled on the table in the direction A shown in FIG. 11B), the images as shown in FIGS. 12A and 12B are displayed on the monitor 2 and the LCD 61, respectively. As shown in FIG. 12A, when the terminal apparatus 6 has been roll-rotated counterclockwise from the state indicating the reference operation indication direction, an image of the virtual world is displayed on the monitor 2 such that the entire cloth object rotates by the angle of rotation by which the terminal apparatus 6 has roll-rotated (e.g., the angle by which the y-axis has moved rotationally about the z-axis), and in the direction of the roll rotation (e.g., the direction in which the y-axis has moved rotationally about the z-axis). Further, as shown in FIG. 12B, when the terminal apparatus 6 has been roll-rotated counterclockwise from the state indicating the reference operation indication direction, an image of the virtual world is displayed on the LCD 61 such that the needle object rotates by the angle of rotation by which the terminal apparatus 6 has roll-rotated, and in the direction opposite to the direction of rotation in which the terminal apparatus 6 has roll-rotated (e.g., the direction opposite to the direction in which the y-axis has moved rotationally about the z-axis).

As an example, as shown in FIG. 14, when the terminal apparatus 6 has rotated counterclockwise by an angle of rotation C (i.e., the y-axis has moved rotationally about the z-axis in the direction A and by the angle C), the attitude of the needle object is controlled such that the needle object rotates clockwise on the cloth object about a predetermined position (e.g., the position of the needle of the needle object) by the angle of rotation C. Then, the needle object and the cloth object are displayed such that the up direction of the cloth object (the direction U shown in the figures) is the up direction of the LCD 61. That is, the direction in which the cloth object is displayed on the LCD 61 does not change from the state indicating the reference operation indication direction even when the terminal apparatus 6 has roll-rotated. As is clear by comparing FIGS. 11B and 12B, this places the cloth object in a fixed manner in the virtual world even when the terminal apparatus 6 has roll-rotated. The LCD 61 (the terminal apparatus 6), however, has rotated counterclockwise by the angle of rotation C. As a result, the cloth object seems to rotate in real space in the same direction as that of the terminal apparatus 6. On the other hand, the needle object rotates clockwise in the virtual world by the angle of rotation C. The LCD 61 (the terminal apparatus 6), however, has rotated counterclockwise by the angle of rotation C. As a result, the needle object seems to be displayed in the same direction in real space.

The above-described method of generating a virtual world image is, as an example, performed by causing the needle object to rotate in the virtual world while fixing in the virtual world a first virtual camera for generating an image of the virtual world to be displayed on the LCD 61. As another example, however, when the image of the virtual world shown in FIG. 11B, where the cloth object and the needle object are placed, is changed to the image as shown in FIG. 12B in accordance with the roll rotation of the terminal apparatus 6, the first virtual camera for generating an image of the virtual world may be caused to rotate about the direction of the line of sight of the first virtual camera in accordance with the roll rotation of the terminal apparatus 6. In this case, even when the terminal apparatus 6 has rotated counterclockwise by the angle of rotation C, the needle object is placed in a fixed manner in the virtual world. On the other hand, when the terminal apparatus 6 has rotated counterclockwise by the angle of rotation C, the cloth object is caused to rotate counterclockwise about a predetermined position (the position of the needle of the needle object) by the angle of rotation C, and the first virtual camera is also caused to rotate counterclockwise about the direction of the line of sight by the angle of rotation C. Such a method of generating a virtual world image also makes it possible to display a similar image on the LCD 61.

Meanwhile, when the terminal apparatus 6 has rotated counterclockwise by the angle of rotation C, an image to be displayed on the monitor 2 is, as an example, generated by causing a second virtual camera, for generating an image of the virtual world to be displayed on the monitor 2, to rotate clockwise (i.e., in the direction opposite to the direction of rotation of the terminal apparatus 6) in the virtual world about the direction of the line of sight by the angle of rotation C, in accordance with the roll rotation of the terminal apparatus 6. As another example, however, when the image of the virtual world shown in FIG. 11A, where the cloth object is placed, is changed to the image as shown in FIG. 12A in accordance with the roll rotation of the terminal apparatus 6, the cloth object may be caused to rotate about a predetermined position (e.g., the position of the needle of the needle object, the fixation point of the second virtual camera, or the center of gravity of the cloth object) in accordance with the roll rotation of the terminal apparatus 6, while the second virtual camera is fixed. Such a method of generating a virtual world image also makes it possible to display a similar image on the monitor 2.

When the terminal apparatus 6 has been roll-rotated counterclockwise 90° on the table from the state shown in FIG. 11B by roll-rotating the terminal apparatus 6 further in the direction A, the images as shown in FIGS. 13A and 13B are displayed on the monitor 2 and the LCD 61, respectively. As shown in FIG. 13A, when the terminal apparatus 6 has been roll-rotated counterclockwise 90° on the table from the state shown in FIG. 11B, an image of the virtual world is displayed on the monitor 2 such that the entire cloth object rotates by the angle of rotation by which the terminal apparatus 6 has further roll-rotated, and in the direction of the roll rotation. Further, as shown in FIG. 13B, when the terminal apparatus 6 has been roll-rotated counterclockwise 90° on the table from the state shown in FIG. 11B, an image of the virtual world is displayed on the LCD 61 such that the needle object rotates by the angle of rotation by which the terminal apparatus 6 has further roll-rotated, and in the direction opposite to the direction of the roll rotation. As is clear by comparing FIGS. 11A and 13A, this causes the cloth object to be displayed on the monitor 2 such that the cloth object rotates in the virtual world by an angle of rotation of 90° and in the direction A. Further, as is clear by comparing FIGS. 11B and 13B, the cloth object is fixed in the virtual world even when the terminal apparatus 6 has roll-rotated counterclockwise 90°. The LCD 61 (the terminal apparatus 6), however, has rotated counterclockwise by an angle of rotation of 90°. As a result, the cloth object seems to rotate counterclockwise 90° in real space as does the terminal apparatus 6. On the other hand, the needle object rotates clockwise by an angle of rotation of 90° in the virtual world. The LCD 61 (the terminal apparatus 6), however, has rotated counterclockwise by an angle of rotation of 90°. As a result, the needle object seems to be displayed in the the same direction in real space.

As a result of the user thus roll-rotating the terminal apparatus 6 on the table, it is possible to display the needle object on the LCD 61 so as to rotate relative to the cloth object. Then, the angle of rotation of the terminal apparatus 6 and the angle of rotation of the needle object may be set to coincide with each other, and the needle object may be caused to rotate relative to the cloth object in the direction opposite to the direction of rotation of the terminal apparatus 6, whereby it is possible to achieve information processing of simulating sewing having verisimilitude that allows the handling of the terminal apparatus 6 like a piece of cloth to be sewn with a sewing machine.

For example, acceleration data or angular velocity data based on a change in the attitude of the terminal apparatus 6 is output from the terminal apparatus 6. Then, the direction of the gravitational acceleration applied to the terminal apparatus 6 can be calculated using the acceleration indicated by the acceleration data. This makes it possible to estimate the attitude of the terminal apparatus 6 with respect to the vertical direction in real space, that is, the x-axis, y-axis, and z-axis directions of the terminal apparatus 6 with respect to the vertical direction. Further, the use of the angular velocity and/or the dynamic acceleration applied to the terminal apparatus 6 using the angular velocity indicated by the angular velocity data and/or the acceleration indicated by the acceleration data, makes it possible to estimate a change in the attitude of the terminal apparatus from its initial attitude in real space (i.e., changes in the x-axis, y-axis, and z-axis directions about the x, y, and z axes) using the angular velocity and/or the dynamic acceleration. In accordance with the thus estimated change in the attitude of the terminal apparatus 6 (changes in the x-axis, y-axis, and z-axis directions), the directions, the attitudes, and the moving directions of the needle object and the cloth object, and the attitudes and the positions of the virtual cameras are set.

In addition, it is possible to cause the objects to move, by performing the touch operation on the touch panel 62 of the terminal apparatus 6. For example, when the user has performed the touch operation so as to drag the touch panel 62, which covers the surface of the LCD 61, in the left direction (the direction B shown in FIG. 11B), the images as shown in FIGS. 15A and 15B are displayed on the monitor 2 and the LCD 61, respectively. As shown in FIG. 11B, when the user has performed the touch operation so as to drag the touch panel 62 in the left direction, an image of the virtual world is displayed on the LCD 61 such that the cloth object moves at the distance based on the length at which the drag operation has been performed, and in the direction in which the drag operation has been performed (the direction B shown in the figures). Further, as shown in FIG. 15A, when the user has performed the touch operation so as to drag the touch panel 62 in the left direction, an image of the virtual world is displayed on the monitor 2 such that the current working area moves in accordance with the movement of the range of the cloth object (the range of the virtual world) displayed on the LCD 61 (i.e., at the distance based on the length at which the drag operation has been performed, and in the direction opposite to the direction in which the drag operation has been performed). It should be noted that while the user is performing the touch operation on the touch panel 62, the process of sewing the cloth object is not performed even when the cloth object has moved relative to the needle object by the touch operation. Further, while the user is performing the touch operation on the touch panel 62, the process of sewing the cloth object is not performed even when the cloth object has moved relative to the needle object by the operation performed using the board-type controller 9. That is, by adding the operation using the board-type controller 9 to the operation of changing the direction of the terminal apparatus 6, the user can sew forward on the cloth object with a thread to a desired position and in a desired direction. The touch operation, however, enables the user to change the position of the cloth object relative to the needle object without needing to perform such sewing. This makes it possible to perform the operation of placing the needle object on the sewing target line without sewing, and subsequently sewing forward with a thread by aiming at the sewing target line.

As an example, as shown in FIG. 16, when the user has performed the touch operation so as to drag the touch panel 62 in the left direction (the direction B shown in the figures), the cloth object moves in the direction B in which the drag operation has been performed. Here, the moving direction and the moving distance of the cloth object are set such that the cloth object displayed on the LCD 61 follows the movement of the touch position during the drag operation performed on the touch panel 62, that is, the position of the cloth object that is displayed so as to overlap the touch position is displayed so as to always overlap the touch position during the drag operation. On the other hand, even when the user has performed the drag operation on the touch panel 62, none of the direction, the attitude, and the position of the needle object changes in the virtual world. Consequently, as is clear by comparing FIGS. 11B and 15B, when the user has performed the touch operation so as to drag the touch panel 62 in the left direction, the cloth object is displayed on the LCD 61 so as to move at the distance based on the drag operation and in the direction based on the drag operation. As a result, the cloth object seems to move so as to follow the movement of the touch position in real space as well. On the other hand, even when the touch operation has been performed on the touch panel 62, the needle object is placed in a fixed manner in the virtual world, and is, as a result, displayed at the same position and in the same direction in real space, unless the terminal apparatus 6 moves.

The above-described method of generating a virtual world image is, as an example, performed by causing the needle object to move in the virtual world while fixing in the virtual world the first virtual camera for generating an image of the virtual world to be displayed on the LCD 61. As another example, however, when the image of the virtual world shown in FIG. 11B, where the cloth object and the needle object are placed, is changed to the image as shown in FIG. 15B in accordance with the touch operation, the first virtual camera for generating an image of the virtual world may be caused to move in accordance with the touch operation. In this case, even when the drag operation has been performed using the touch panel 62, the cloth object is placed in a fixed manner in the virtual world. On the other hand, when the drag operation has been performed using the touch panel 62, the needle object and the first virtual camera are caused to move in the virtual world in the direction based on the drag operation and at the distance based on the drag operation. Such a method of generating a virtual world image also makes it possible to display a similar image on the LCD 61.

It should be noted that as an example, an image is displayed on the monitor 2 such that the center of the cloth object (e.g., the center of gravity) is placed at the center of the screen. Alternatively, an image may be displayed on the monitor 2 such that the center of the cloth object is shifted from the center of the screen. For example, the placement position of the needle object placed on the cloth object may be set to the fixation point of the second virtual camera, and the cloth object may be placed such that the placement position of the needle object is always placed at the center of the screen of the monitor 2. Consequently, even when the cloth object has rotated or moved, the current working area is always placed at the center of the monitor 2, and therefore, the display position of the current working area does not move significantly by the rotation and the movement of the cloth object. This makes it possible to expect the effect of making the position of the current working area easily understandable for the user.

As a result of the user thus performing the touch operation on the touch panel 62 of the terminal apparatus 6, it is possible to display the cloth object on the LCD 61 so as to move relative to the needle object. Then, the moving direction and the moving distance of the cloth object may be set so as to follow the moving direction and the moving distance of the touch position performed on the touch panel 62, whereby it is possible to achieve information processing of simulating sewing having verisimilitude as if moving a piece of cloth to be sewn with a sewing machine, by performing the touch operation.

Figure 17:
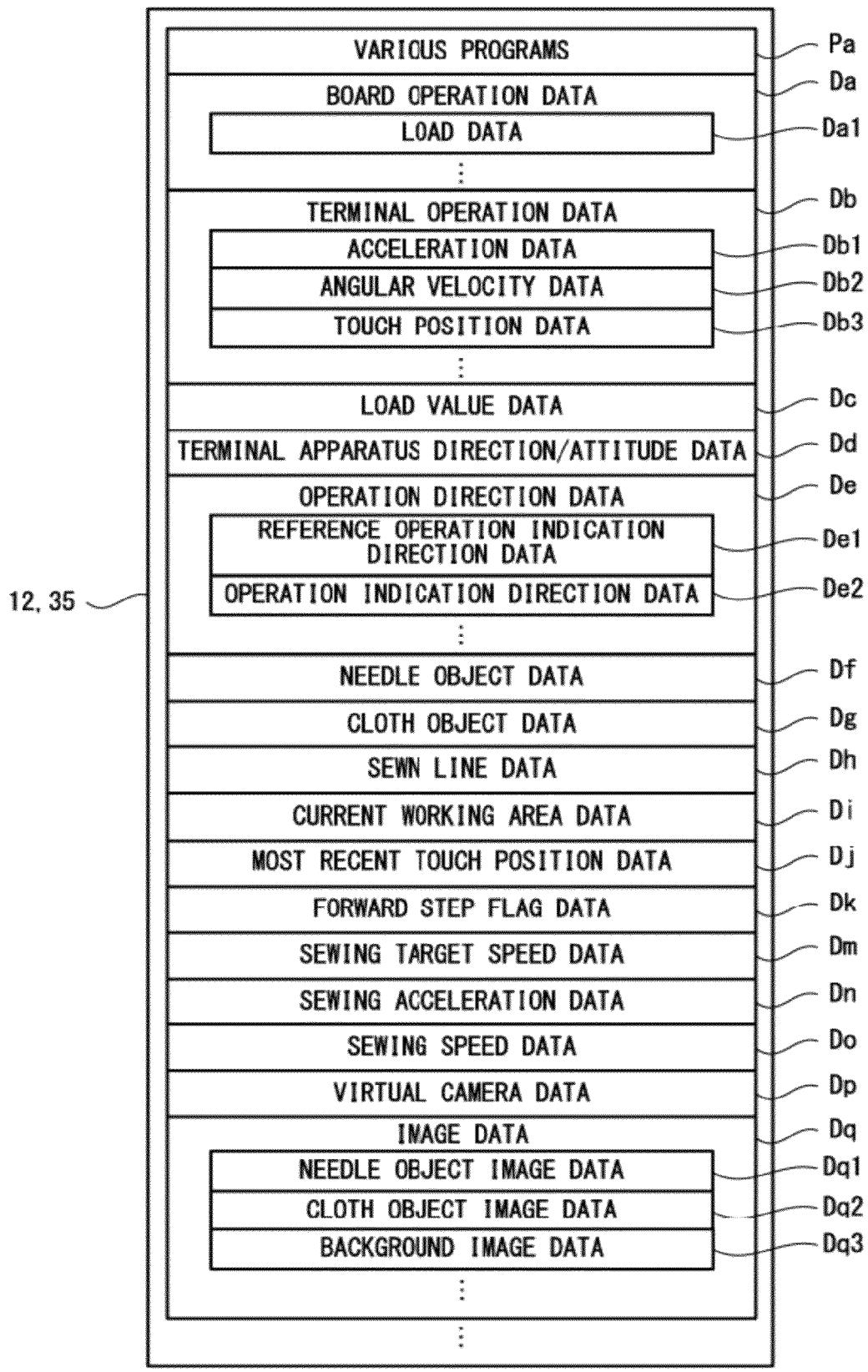
FIG. 17 is a diagram showing a non-limiting example of data and programs that are stored in a main memory of the game apparatus body 5 of FIG. 1.

Next, the processing performed by the game system 1 is described in detail. First, with reference to FIG. 17, main data used in the processing is described. FIG. 17 is a diagram showing an example of main data and programs that are stored in a main memory of the game apparatus body 5.

As shown in FIG. 17, in a data storage area of the main memory, the following are stored: board operation data Da; terminal operation data Db; load value data Dc; terminal apparatus direction/attitude data Dd; operation direction data De; needle object data Df; cloth object data Dg; sewn line data Dh; current working area data Di; most recent touch position data Dj; forward step flag data Dk; sewing target speed data Dm; sewing acceleration data Dn; sewing speed data Do; virtual camera data Dp; image data Dq; and the like. It should be noted that the main memory appropriately stores, as well as the data shown in FIG. 17, data used for the processing, such as image data of various objects displayed on the monitor 2 and the LCD 61, and sound data used for the processing. Further, in a program storage area of the main memory, various programs Pa included in the information processing program are stored.

As the board operation data Da, a series of operation information (board operation data) transmitted as transmission data from the board-type controller 9 is stored, and updated to the latest board operation data. For example, the board operation data Da includes load data Da1 and the like. The load data Da1 is data indicating load values detected by the load sensors 94a through 94d of the board-type controller 9.

As the terminal operation data Db, a series of operation information (terminal operation data) transmitted as transmission data from the terminal apparatus 6 is stored, and updated to the latest terminal operation data. For example, the terminal operation data Db includes acceleration data Db1, angular velocity data Db2, touch position data Db3, and the like. The acceleration data Db1 is data indicating an acceleration (an acceleration vector) detected by the acceleration sensor 603. For example, the acceleration data Db1 represents a three-dimensional acceleration vector whose components are accelerations in the three axial (x-axis, y-axis, and z-axis) directions shown in FIG. 3. In another embodiment, the acceleration data Db1 may represent accelerations in given one or more directions. The angular velocity data Db2 is data representing an angular velocity detected by the gyro sensor 604. For example, the angular velocity data Db2 represents angular velocities about the three axes (x-axis, y-axis, and z-axis) shown in FIG. 3. In another example, the angular velocity data Db2 may represent angular velocities about given one or more axes. The touch position data Db3 is data representing the coordinates of the position at which an input has been provided on the input surface of the touch panel 62.

It should be noted that the game apparatus body 5 sequentially receives the data (e.g., the data indicating the detected load values, the acceleration, and the angular velocity) included in the operation information transmitted from the controller 7, the board-type controller 9, and the terminal apparatus 6 at predetermined intervals (e.g., at intervals of 1/200 seconds). For example, the received data is sequentially stored in the main memory by the I/O processor 31. In a processing flow described later, the CPU 10 reads the latest board operation data and the latest terminal operation data from the main memory every frame period (e.g., 1/60 seconds), to thereby update the board operation data Da and the terminal operation data Db.

In addition, the operation information transmitted from the controller 7, the board-type controller 9, and the terminal apparatus 6 at the predetermined intervals may be temporarily stored in the buffer (not shown) included in the controller communication module 19 or the terminal communication module 28. In this case, the data stored in the buffer is read every frame period, and the board operation data Da (e.g., the load data Da1) or the terminal operation data Db (e.g., the acceleration data Db1, the angular velocity data Db2, and the touch position data Db3) in the main memory is updated for use. At this time, the cycle of receiving the operation information is different from the processing cycle, and therefore, a plurality of pieces of information received at a plurality of times are stored in the buffer. The processing is performed using only the latest operation information among the plurality of pieces of operation information received at the plurality of times.

The load value data Dc is an aggregate of data indicating the load values detected by the board-type controller 9. For example, the load value data Dc is an aggregate of data indicating the sum of the load values detected by the load sensors 94a and 94d (the front load value) and an aggregate of data indicating the sum of the load values detected by the load sensors 94a and 94b (the back load value). Specifically, the load value data Dc is an array of data indicating the front load value and the back load value within a predetermined period that are chronologically calculated, and the data indicating the front load value and the back load value is chronologically stored in the elements of the array.

The terminal apparatus direction/attitude data Dd is data indicating the current direction and attitude of the terminal apparatus 6 in real space. For example, the terminal apparatus direction/attitude data Dd is calculated on the basis of the acceleration data Db1 and the angular velocity data Db2 that are included in the terminal operation data Db.

The operation direction data De includes reference operation indication direction data De1, operation indication direction data De2, and the like. The reference operation indication direction data De1 is data indicating the direction that serves as a reference for an operation indication direction, and is set at initial settings. The operation indication direction data De2 is data indicating the operation indication direction currently indicated by the user. It should be noted that the method of calculating the reference operation indication direction and the operation indication direction will be described later.

The needle object data Df is data concerning the needle object in the virtual world. For example, the needle object data Df is data indicating the position, the attitude, the direction, and the like of the needle object in the virtual world.

The cloth object data Dg is data concerning the cloth object in the virtual world. For example, the cloth object data Dg is data indicating the position, the attitude, the direction, and the like of the cloth object in the virtual world.

The sewn line data Dh is data indicating the sewn line that is drawn when the cloth object has been sewn by the needle object. For example, the sewn line data Dh is data indicating the drawing position, the line type, and the like of the sewn line on the cloth object.

The current working area data Di is data indicating the current working area that is drawn on the cloth object. For example, the current working area data Di is data indicating the drawing position and the like of the current working area on the cloth object.

The most recent touch position data Dj is data indicating the touch position at which the touch operation has been performed on the touch panel 62 in the most recent processing.

The forward step flag data Dk is data indicating a forward step flag that is set to on when a load equal to or greater than a threshold has been applied to the front portion of the board-type controller 9, and is set to off when a load equal to or greater than the threshold has been applied to the back portion of the board-type controller 9.

The sewing target speed data Dm is data indicating the speed that serves as a target for the speed of the cloth object being sewn by the needle object (a sewing target speed). The sewing acceleration data Dn is data indicating the acceleration to reach the sewing target speed from the speed of the cloth object currently sewn by the needle object (a sewing acceleration). The sewing speed data Do is data indicating the speed of the cloth object being sewn by the needle object (a sewing speed).

The virtual camera data Dp is data concerning virtual cameras set in the virtual world. For example, the virtual camera data Dp includes data concerning a first virtual camera for generating a game image to be displayed on the LCD 61 of the terminal apparatus 6, and data concerning a second virtual camera for generating a game image to be displayed on the monitor 2.

The image data Dq includes needle object image data Dq1, cloth object image data Dq2, background image data Dq3, and the like. The needle object image data Dq1 is data for placing the needle object in the virtual world to generate a game image. The cloth object image data Dq2 is data for placing the cloth object in the virtual world to generate a game image. The background image data Dq3 is data for placing a background in the virtual world to generate a game image.

Figure 18:
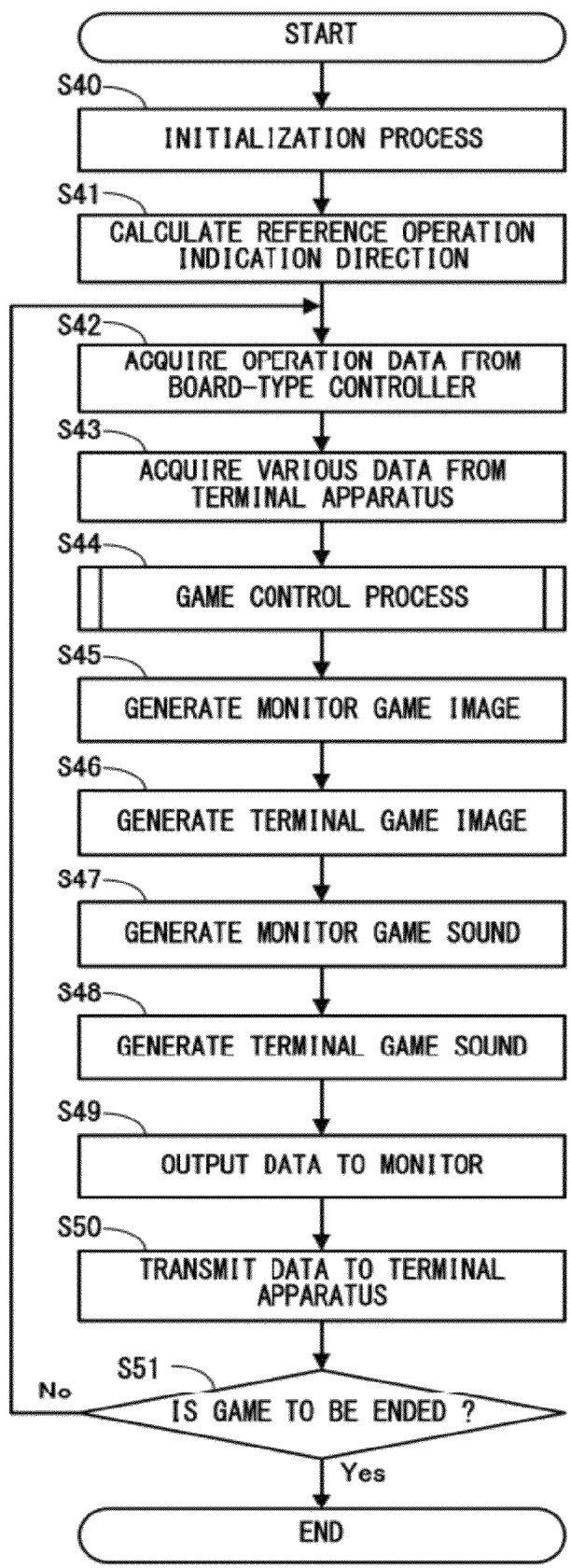
FIG. 18 is a flow chart showing a non-limiting example of game processing performed by the game apparatus body 5 of FIG. 1.
Figure 19:
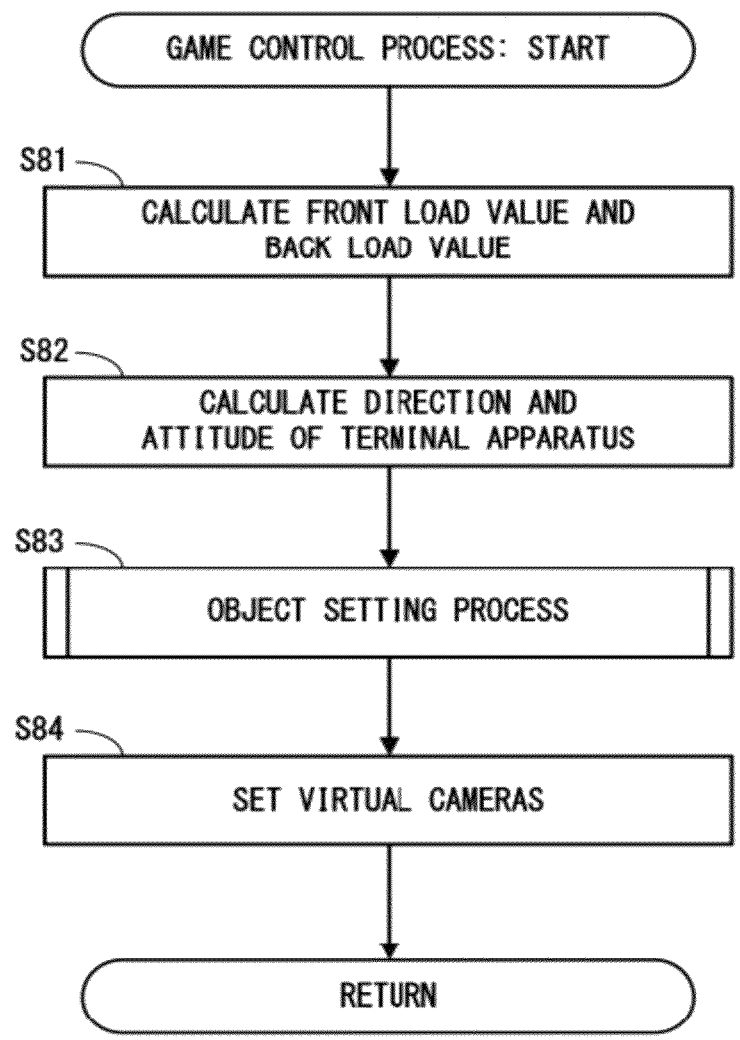
FIG. 19 is a subroutine flow chart showing a non-limiting example of a game control process in step 44 in FIG. 18.

Next, with reference to FIGS. 18 through 21, the game processing performed by the game apparatus body 5 is described in detail. It should be noted that FIG. 18 is a flow chart showing an example of the game processing performed by the game apparatus body 5. FIG. 19 is a subroutine flow chart showing an example of a game control process in step 44 in FIG. 18. FIG. 20 is a subroutine flow chart showing an example of an object setting process in step 83 in FIG. 19. FIG. 21 is a subroutine flow chart showing an example of a sewing process in step 118 in FIG. 20. Here, in the flow charts shown in FIGS. 18 through 21, descriptions are given mainly of, among the processes of the game processing, a process where the needle object and the cloth object are displayed so as to move in accordance with the operation performed by the user using the terminal apparatus 6 and the board-type controller 9, while detailed descriptions of the other processes not directly related to the exemplary embodiment are omitted. Further, in FIGS. 18 through 21, each step performed by the CPU 10 is abbreviated as "S".

When the game apparatus body 5 has been powered on, the CPU 10 of the game apparatus body 5 executes a boot program stored in the ROM/RTC 13 to initialize each unit such as the main memory. Then, the game program stored in the optical disk 4 is loaded to the main memory, and the CPU 10 starts to execute the program. The flow charts shown in FIGS. 18 through 21 show processes to be performed after the above processes are completed.

Referring to FIG. 18, the CPU 10 performs an initialization process (step 40), and proceeds to the subsequent step. For example, in the initialization process in step 40, the CPU 10 constructs the virtual world, places the needle object, the cloth object, and the virtual cameras (the first virtual camera and the second virtual camera) in the virtual world at predetermined positions, and sets the initial values of various parameters used for the game processing. It should be noted that the first virtual camera is initially placed at a position of looking down from directly above the needle object, such that the forward direction of the needle object is the up direction of the first virtual camera (the Y-axis positive direction).

Next, the CPU 10 calculates the reference operation indication direction on the basis of data transmitted from the terminal apparatus 6 (step 41), and proceeds to the subsequent step. A description is given below of an example where the CPU 10 calculates the reference operation indication direction.

The terminal apparatus 6 repeatedly transmits data as described above to the game apparatus body 5. In the game apparatus body 5, the terminal communication module 28 sequentially receives the data described above, and the I/O processor 31 sequentially stores terminal operation data, camera image data, and microphone sound data in the main memory. In step 41 described above, the CPU 10 reads the most recent terminal operation data from the main memory, to thereby update the acceleration data Db1, the angular velocity data Db2, and the touch position data Db3.

Next, the CPU 10 calculates the direction and the attitude of the terminal apparatus 6 in real space. For example, the CPU 10 calculates data indicating the current direction and attitude of the terminal apparatus 6 (e.g., data indicating the x-axis, y-axis, and z-axis directions of the terminal apparatus 6), on the basis of the acceleration indicated by the acceleration data Db1 and the angular velocity indicated by the angular velocity data Db2, to thereby update the terminal apparatus direction/attitude data Dd using data indicating the calculated direction and attitude of the terminal apparatus 6. For example, the CPU 10 can calculate the amount of rotation (the amount of change in direction) of the terminal apparatus 6 in real space per unit time, using the angular velocity indicated by the angular velocity data Db2. Further, in the state where the terminal apparatus 6 is substantially stationary (in a static state) in real space, the acceleration applied to the terminal apparatus 6 is the gravitational acceleration. This makes it possible to calculate the direction of gravity applied to the terminal apparatus 6 (i.e., the attitude of the terminal apparatus 6 with respect to the vertical direction in real space), using the acceleration indicated by the acceleration data Db1. This enables the CPU 10 to calculate data indicating the direction and the attitude of the terminal apparatus 6 on the basis of the acceleration indicated by the acceleration data Db1 and the angular velocity indicated by the angular velocity data Db2.

It should be noted that in the exemplary embodiment, the direction and the attitude of the terminal apparatus 6 are calculated on the basis of the data indicating the acceleration and the angular velocity that are detected by the terminal apparatus 6. Alternatively, in another embodiment, the direction and the attitude of the terminal apparatus 6 may be calculated using any one piece of data or three or more pieces of data. For example, the magnetic sensor 602 included in the terminal apparatus 6 detects a geomagnetism applied to the terminal apparatus 6. This makes it possible to calculate a predetermined orientation with respect to the terminal apparatus 6 (i.e., the attitude of the terminal apparatus 6 with respect to the predetermined orientation) on the basis of the direction of the geomagnetism applied to the terminal apparatus 6. Even when a magnetic field is generated in addition to the geomagnetism in the real space where the terminal apparatus 6 is located, it is possible to calculate the amount of rotation of the terminal apparatus 6. This enables the CPU 10 to calculate the direction and the attitude of the terminal apparatus 6 using at least one of the data indicating the acceleration, the data indicating the angular velocity, and the data indicating the magnetism, which are detected by the terminal apparatus 6.

Any calculation method may be used to calculate the direction and the attitude of the terminal apparatus 6. For example, a calculation method is possibly used of correcting the direction and the attitude of the terminal apparatus 6, which are calculated on the basis of the angular velocity indicated by the angular velocity data Db2, using the acceleration indicated by the acceleration data Db1 and the direction of the magnetism detected by the magnetic sensor 602.

Specifically, the CPU 10 first calculates the attitude of the terminal apparatus 6 on the basis of the angular velocity indicated by the angular velocity data Db2. Any method may be used to calculate the attitude of the terminal apparatus 6 from the angular velocity. For example, the attitude of the terminal apparatus 6 may be calculated using the most recent attitude (the most recently calculated x-axis, y-axis, and z-axis directions) and the current angular velocity (the angular velocity currently acquired in step 42 in the processing loop). The CPU 10 causes the most recent x-axis, y-axis, and z-axis directions to rotate about the axes along the respective directions at the current angular velocity for a unit time, to thereby calculate new x-axis, y-axis, and z-axis directions. It should be noted that the most recent x-axis, y-axis, and z-axis directions are represented by the terminal apparatus direction/attitude data Dd, and the current angular velocity is represented by the angular velocity data Db2. Accordingly, the CPU 10 reads the terminal apparatus direction/attitude data Dd and the angular velocity data Db2, and calculates the attitude of the terminal apparatus 6 (new x-axis, y-axis, and z-axis directions). It should be noted that, as described above, the initial attitude of the terminal apparatus 6 is defined in step 41 described above. Thus, when the attitude of the terminal apparatus 6 is calculated from the angular velocity, the CPU 10 can calculate the current attitude of the terminal apparatus 6 with respect to the initial attitude of the terminal apparatus 6 that has been calculated first.

Next, the CPU 10 corrects the attitude of the terminal apparatus 6 (the x-axis, y-axis, and z-axis directions), calculated on the basis of the angular velocity, using the acceleration indicated by the acceleration data Db1. Specifically, the CPU 10 calculates the attitude of the terminal apparatus 6 (the x-axis, y-axis, and z-axis directions) on the basis of the acceleration indicated by the acceleration data Db1. Here, in the state where the terminal apparatus 6 is substantially stationary, the acceleration applied to the terminal apparatus 6 is the gravitational acceleration. Accordingly, in this state, it is possible to calculate the direction of the gravitational acceleration (the direction of gravity) using the direction of the acceleration indicated by the acceleration data Db1. This makes it possible to calculate the direction of the terminal apparatus 6 relative to the direction of gravity (the x-axis, y-axis, and z-axis directions with respect to the direction of gravity).

When the attitude of the terminal apparatus 6 based on the acceleration is calculated, the CPU 10 corrects the attitude based on the angular velocity, using the attitude based on the acceleration. Specifically, the CPU 10 makes a correction to approximate at a predetermined rate the attitude of the terminal apparatus 6 (the x-axis, y-axis, and z-axis directions) calculated on the basis of the angular velocity to the attitude of the terminal apparatus 6 (the x-axis, y-axis, and z-axis directions) calculated on the basis of the acceleration. The predetermined rate may be a fixed value set in advance, or may be set in accordance with, for example, the acceleration indicated by the acceleration data Db1. Further, the attitude of the terminal apparatus 6 calculated on the basis of the acceleration cannot be calculated in the direction of rotation about the direction of gravity, and therefore, the CPU 10 may not make a correction to the attitude in this rotation direction. When correcting, on the basis of the direction of magnetism detected by the magnetic sensor 602, the attitude of the terminal apparatus 6 calculated on the basis of the angular velocity, the CPU 10 may approximate at a predetermined rate the attitude of the terminal apparatus 6 calculated on the basis of the angular velocity to the attitude of the terminal apparatus 6 calculated on the basis of the direction of magnetism detected by the magnetic sensor 602. This enables the CPU 10 to accurately calculate the attitude of the terminal apparatus 6.

Then, the reference operation indication direction that serves as a reference for the operation indication direction is calculated on the basis of the direction and the attitude of the terminal apparatus 6 in real space. It should be noted that in the following descriptions, as an example, the operation indication direction is set on the basis of the direction in which the top surface of the terminal apparatus 6 is directed in real space (the y-axis positive direction shown in FIG. 3, i.e., the up direction of the terminal apparatus). In the process of calculating the operation indication direction, the operation indication direction is calculated by making various corrections on the attitude and the direction of the terminal apparatus 6. Then, the reference operation indication direction is set using the operation indication direction calculated in step 41 described above, to thereby update the reference operation indication direction data De1 using the set reference operation indication direction.

When the operation indication direction is calculated, the tilts of the terminal apparatus 6 about the x-axis and the y-axis are corrected. For example, the x-axis direction and the y-axis direction are forcibly corrected to the horizontal directions (e.g., the vertical direction components of the x-axis direction and the y-axis direction are set to 0, and the x-axis direction and the y-axis direction are corrected to the directions obtained by projecting the respective directions in a direction vertical to a horizontal surface in real space) using the x-axis, y-axis, and z-axis directions indicated by the terminal apparatus direction/attitude data Dd. Subsequently, the z-axis direction is newly calculated on the basis of the exterior product of the x-axis direction and the y-axis direction that have been corrected to the horizontal directions. Then, the y-axis direction is newly calculated on the basis of the exterior product of the newly calculated z-axis direction and the x-axis component corrected to the horizontal direction, to thereby update the reference operation indication direction data De1 using the newly calculated y-axis positive direction (operation indication direction).

It should be noted that when calculated, the reference operation indication direction may be corrected on the basis of the acceleration indicated by the acceleration data Db1, or may be corrected on the basis of the direction of magnetism detected by the magnetic sensor 602. Alternatively, the reference operation indication direction may be calculated on the assumption that as a result of the user performing a predetermined operation in the state where the terminal apparatus 6 is in a specific attitude (e.g., in the state where the terminal apparatus 6 is mounted in a stationary manner on the table), the x-axis direction and the y-axis direction when the predetermined operation has been performed are directed in the horizontal directions. Timing may be set such that the setting of the reference operation indication direction, that is, step 41 described above, is performed at the start of the game, or is performed in accordance with a predetermined operation performed by the user using the terminal apparatus 6 (e.g., the operation of pressing a predetermined operation button 64).

Subsequent to step 41 described above, the process in step 42 is performed. Thereafter, the processing loop of a series of processes 42 through 51 is performed every predetermined period (one frame period) and repeated.

In step 42, the CPU 10 acquires board operation data transmitted from the board-type controller 9, and proceeds to the subsequent step. Here, the board-type controller 9 repeatedly transmits the board operation data to the game apparatus body 5. Accordingly, in the game apparatus body 5, the controller communication module 19 sequentially receives the board operation data, and the I/O processor 31 sequentially stores the received board operation data in the main memory. The interval of transmission of the board operation data from the board-type controller 9 may be shorter than the game processing period (one frame period), and it is ½00 seconds, for example. In step 42, the CPU 10 reads the latest board operation data from the main memory, to thereby update the board operation data Da. The board operation data includes data indicating identification information of the load sensors 94$a$ through 94$d$, and data indicating the load values detected by the load sensors 94$a$ through 94$d$. The load data Da1 is updated using the data identified by the identification information.

Next, the CPU 10 acquires various data transmitted from the terminal apparatus 6 (step 43), and proceeds to the subsequent step. The terminal apparatus 6 repeatedly transmits the data to the game apparatus body 5. Accordingly, in the game apparatus body 5, the terminal communication module 28 sequentially receives the data, and the codec LSI 27 sequentially performs a decompression process on the camera image data and the microphone sound data. Then, the I/O processor 31 sequentially stores the terminal operation data, the camera image data, and the microphone sound data in the main memory. In step 43 described above, the CPU 10 reads the latest terminal operation data from the main memory, to thereby update the acceleration data Db1, the angular velocity data Db2, and the touch position data Db3.

Next, the CPU 10 performs a game control process (step 44), and proceeds to the subsequent step. The game control process is the process of, for example, causing the needle object, the cloth object, and the virtual cameras in the virtual world to move in accordance with a game operation performed by the user, to thereby advance the game. In this exemplary game, the user is allowed to play various games using the terminal apparatus 6 and the board-type controller 9. With reference to FIG. 19, a description is given below of the game control process in step 44 described above.

In FIG. 19, the CPU 10 calculates the front load value and the back load value (step 81), and proceeds to the subsequent step. For example, the CPU 10 calculates the front load value by summing up the loads indicated by the load data Da1 and detected by the load sensors 94c and 94d, to thereby update the latest data indicating the front load value in the chronological data array of the load value data Dc, using the data indicating the calculated front load value. In addition, the CPU 10 calculates the back load value by summing up the loads indicated by the load data Da1 and detected by the load sensors 94a and 94b, to thereby update the latest data indicating the back load value in the chronological data array of the load value data Dc, using the data indicating the calculated back load value. Specifically, the load data Da1 indicates the latest load values detected by the load sensors 94a through 94d, and therefore, the front load value and the back load value are calculated using the detected load values. The thus calculated front load value and back load value change in accordance with the action taken by the user on the board-type controller 9. As an example, when the user has taken action so as to apply a load to the front portion of the board-type controller 9, the front load value increases and the back load value decreases, in accordance with the applied load.

Next, the CPU 10 calculates the direction and the attitude of the terminal apparatus 6 (step 82), and proceeds to the subsequent step. For example, the CPU 10 calculates data indicating the current direction and attitude of the terminal apparatus 6 (e.g., data indicating the x-axis, y-axis, and z-axis directions of the terminal apparatus 6), on the basis of the acceleration indicated by the acceleration data Db1 and the angular velocity indicated by the angular velocity data Db2, to thereby update the terminal apparatus direction/attitude data Dd using data indicating the calculated direction and attitude of the terminal apparatus 6. It should be noted that the method of calculating data indicating the current direction and attitude of the terminal apparatus 6 is similar to the method described in step 41, and therefore is not described in detail here.

Next, the CPU 10 performs an object setting process (step 83), and proceeds to the subsequent step. With reference to FIG. 20, a description is given below of the object setting process in step 83 described above.

Referring to FIG. 20, the CPU 10 calculates the operation indication direction (step 111), and proceeds to the subsequent step. For example, the CPU 10 forcibly corrects the x-axis direction and the y-axis direction to the horizontal directions using the x-axis, y-axis, and z-axis directions indicated by the terminal apparatus direction/attitude data Dd, and newly calculates the z-axis direction on the basis of the exterior product of the x-axis direction and the y-axis direction that have been corrected to the horizontal directions. Then, the CPU 10 newly calculates the y-axis direction on the basis of the exterior product of the newly calculated z-axis direction and the x-axis component corrected to the horizontal direction, to thereby update the operation indication direction data De2 using the newly calculated y-axis positive direction (operation indication direction).

Next, the CPU 10 sets the direction of the needle object in the virtual world in accordance with the operation indication direction calculated in step 111 described above (step 112), and proceeds to the subsequent step. For example, the CPU 10 calculates the angle of change and the direction of change in the operation indication direction relative to the reference operation indication direction, using the reference operation indication direction indicated by the reference operation indication direction data De1 and the operation indication direction indicated by the operation indication direction data De2. Then, the CPU 10 sets the forward direction of the needle object using the direction in the virtual world that is obtained by causing the needle object to rotate relative to the virtual world reference direction (e.g., the up direction of the virtual world displayed on the monitor 2) by the angle of change and in the direction opposite to the direction of change, to thereby update the needle object data Df. For example, as shown in FIG. 14, when the angle of change in the operation indication direction relative to the reference operation indication direction is the angle of rotation C, and the direction of change is counterclockwise with respect to the z-axis positive direction, the forward direction of the needle object (the direction F shown in the figures) is set to the direction obtained by causing the needle object to rotate counterclockwise with respect to the vertical direction in the virtual world by the angle of rotation C from the virtual world reference direction. It should be noted that any method may be used to calculate the forward direction of the needle object on the basis of the operation indication direction. As is clear from FIG. 14, however, the operation indication direction and the forward direction of the needle object are symmetric with each other with respect to a line along a reference direction (the reference operation indication direction or the virtual world reference direction). Thus, on the basis of such a positional relationship, the forward direction of the needle object may be calculated from the operation indication direction by a different calculation method.

Next, the CPU 10 determines whether or not the touch operation has been performed on the touch panel 62 (step 113). For example, the CPU 10 determines, with reference to the touch position data Db3, whether or not the user has performed the touch operation on the touch panel 62. Then, when the touch operation has been performed on the touch panel 62, the CPU 10 proceeds to the subsequent step 114. On the other hand, when the touch operation has not been performed on the touch panel 62, the CPU 10 proceeds to the subsequent step 117.

In step 114, the CPU 10 sets the sewing speed to 0, and proceeds to the subsequent step. For example, the CPU 10 updates the sewing speed data Do using the sewing speed set to 0.

Next, on the basis of the moving distance and the moving direction from the most recent touch position to the current touch position, the CPU 10 moves the position of the cloth object in the virtual world (step 115), and proceeds to the subsequent step. For example, the CPU 10 calculates the distance and the direction from the position in the virtual world that overlaps the most recent touch position to the position in the virtual world that overlaps the current touch position, using the most recent touch position indicated by the most recent touch position data Di and the current touch position indicated by the touch position data Db3. Then, the CPU 10 moves the position of the cloth object at the calculated distance (moving distance) in the virtual world and in the calculated direction (moving direction) in the virtual world, to thereby update the cloth object data Dg using the resulting positions. Consequently, the position of the cloth object in the virtual world is set such that the cloth object displayed on the LCD 61 follows the movement of the touch position during the drag operation performed on the touch panel 62

Next, the CPU 10 updates the most recent touch position using the current touch position (step 116), and proceeds to the subsequent step 119. For example, the CPU 10 newly sets the most recent touch position data using the current touch position indicated by the touch position data Db3, to thereby update the most recent touch position data Dj using the newly set most recent touch position data.

On the other hand, in step 117, the CPU 10 initializes the most recent touch position, and proceeds to the subsequent step. For example, the CPU 10 initializes the most recent touch position to null, to thereby update the most recent touch position data Dj using the initialized most recent touch position.

Next, the CPU 10 performs a sewing process (step 118), and proceeds to the subsequent step 119. With reference to FIG. 21, a description is given below of the sewing process performed in step 118 described above.

Referring to FIG. 21, the CPU 10 determines whether or not the forward step flag indicated by the forward step flag data Dk is set to on (step 121). Then, when the forward step flag is set to on, the CPU 10 proceeds to the subsequent step 122. On the other hand, when the forward step flag is set to off, the CPU 10 proceeds to the subsequent step 126.

In step 122, the CPU 10 determines whether or not the back load value indicated by the load value data Dc is equal to or greater than a predetermined threshold. Then, when the back load value is equal to or greater than the predetermined threshold, the CPU 10 proceeds to the subsequent step 123. On the other hand, when the back load value is less than the predetermined threshold, the CPU 10 proceeds to the subsequent step 130. Here, the threshold used in step 122 described above is a value for detecting that the user has applied a load to the back portion of the board-type controller 9. The threshold may be a value set in advance, or may be a value set by an operation of the user.

In step 123, the CPU 10 sets the sewing target speed, and proceeds to the subsequent step. For example, the CPU 10 calculates a sewing target speed Vt by $$Vt=(1/F)*Vts$$

to thereby update the sewing target speed data Dm using the calculated sewing target speed Vt. Here, F represents the number of frames from the setting of the forward step flag to on to the present time (the number of times the processing cycle of the game has been repeated; the processing time of the game=one frame period), and represents the number of frames from the detection that the user has applied a load to the front portion of the board-type controller 9 to the present time. Further, Vts represents a maximum value of the sewing target speed, the maximum value defined in advance.

Next, the CPU 10 sets the sewing acceleration to reach the sewing target speed (step 124), and proceeds to the subsequent step. For example, the CPU 10 calculates a sewing acceleration Va by $$Va=(Vt-V)/Fs$$

to thereby update the sewing acceleration data Dn using the calculated sewing acceleration Va. Here, V represents the currently set sewing speed, which is a value obtained with reference to the sewing speed data Do. Further, Fs is a parameter set in advance that represents the time taken to increase/decrease the current sewing speed to the sewing target speed (the number of frames).

Next, the CPU 10 sets the forward step flag to off, to thereby update the forward step flag data Dk (step 125), and proceeds to the subsequent step 130.

On the other hand, when it has been determined in step 121 described above that the forward step flag is set to off, the CPU 10 determines whether or not the front load value indicated by the load value data Dc is equal to or greater than the predetermined threshold (step 126). Then, when the front load value is equal to or greater than the predetermined threshold, the CPU 10 proceeds to the subsequent step 127. On the other hand, when the front load value is less than the predetermined threshold, the CPU 10 proceeds to the subsequent step 130. Here, the threshold used in step 126 described above is a value for detecting a decrease in the load once having increased when the user has applied a load to the front portion of the board-type controller 9. The threshold may be a value set in advance, or may be a value set by an operation of the user.

In step 127, the CPU 10 sets the sewing target speed, and proceeds to the subsequent step. For example, as in step 123 described above, the CPU 10 calculates the sewing target speed Vt by $$Vt=(1/F)*Vts$$

to thereby update the sewing target speed data Dm using the calculated sewing target speed Vt. Here, F represents the number of frames from the setting of the forward step flag to off to the present time, and represents the number of frames from the detection that the user has applied a load to the back portion of the board-type controller 9 to the present time.

Next, the CPU 10 sets the sewing acceleration to reach the sewing target speed (step 128), and proceeds to the subsequent step. It should be noted that the method of calculating the sewing acceleration Va is similar to that of step 124 described above, and therefore is not described in detail here.

Next, in step 126, the CPU 10 sets the forward step flag to on, to thereby update the forward step flag data Dk (step 129), and proceeds to the subsequent step 130.

In step 130, the CPU 10 reduces the sewing acceleration, and proceeds to the subsequent step. For example, the CPU 10 reduces the sewing acceleration by multiplying the sewing acceleration, indicated by the sewing acceleration data Dn, by a predetermined positive value less than 1, or subtracting a predetermined value from the sewing acceleration until the sewing acceleration is 0. Then, the CPU 10 updates the sewing acceleration data Dn using the reduced sewing acceleration.

Next, the CPU 10 reduces the sewing speed (step 131), and proceeds to the subsequent step. For example, the CPU 10 reduces the sewing speed by multiplying the sewing speed, indicated by the sewing speed data Do, by a predetermined positive value less than 1, or subtracting a predetermined value from the sewing speed until the sewing speed is 0. Then, the CPU 10 updates the sewing speed data Do using the reduced sewing speed.

Next, the CPU 10 adds the sewing acceleration to the sewing speed (step 132), and proceeds to the subsequent step. For example, the CPU 10 adds the sewing acceleration indicated by the sewing acceleration data Dn to the sewing speed indicated by the sewing speed data Do, to thereby update the sewing speed data Do using the sewing speed after the addition.

Next, the CPU 10 moves the position of the cloth object in the virtual world in the backward direction of the needle object in accordance with the sewing speed (step 133), and proceeds to the subsequent step. For example, the CPU 10 moves the position of the cloth object in the virtual world in the backward direction of the needle object (i.e., the direction opposite to the forward direction of the needle object) and at the distance based on the sewing speed, using the direction of the needle object indicated by the needle object data Df and the sewing speed indicated by the sewing speed data Do, to thereby update the cloth object data Dg using the resulting position.

Next, the CPU 10 generates the sewn line on the track formed as a result of the needle object moving on the cloth object (step 134), and ends the process of this subroutine. For example, in accordance with the line type of the sewn line indicated by the sewn line data Dh, the CPU 10 generates a drawing line to be drawn on the track formed on the cloth object as a result of the needle object moving relative to the cloth object by the movement process in step 133 described above (more specifically, the track formed on the cloth object as a result of the needle of the needle object moving relative to the cloth object). Then, the CPU 10 adds the newly generated sewn line to the sewn line indicated by the sewn line data Dh, to thereby update the sewn line data Dh using the added sewn line.

It should be noted that in the above description of the sewing process, as an example, when the user has taken action so as to step back and forth on the board-type controller 9, the sewing target speed is newly set. The sewing target speed, however, may be newly set in response to another type of action taken by the user. For example, even when the user has taken action so as to intermittently step only on the front portion of the board-type controller 9, the sewing target speed may be newly set. Alternatively, even when the user has taken action so as to intermittently step only on the back portion of the board-type controller 9, the sewing target speed may be newly set. In this case, various directions of processing are possible. For example, the forward step flag described above is not set, and a first flag and a second flag are prepared. The first flag is set to on when the front load value is less than a threshold, and the second flag is set to on when the back load value is less than the threshold. Then, when the first flag is on and the front load value has become equal to or greater than the threshold, the sewing target speed is newly set and the first flag is set to off. When the front load value has become less than the threshold, the first flag is set to on. Further, when the second flag is on and the back load value has become equal to or greater than the threshold, the sewing target speed is newly set and the second flag is set to off. When the back load value has become less than the threshold, the second flag is set to on. By performing such a sewing process, the sewing target speed is newly set even when the user has taken action so as to intermittently step only on the front portion or the back portion of the board-type controller 9. This makes it possible to perform the operation of sewing forward on the cloth object with a thread.

Referring back to FIG. 20, in step 119, the CPU 10 sets the current working area on the basis of the position of the needle object relative to the cloth object, to thereby update the current working area data Di, and ends the process of this subroutine. For example, the CPU 10 sets the position of the current working area on the basis of the position of the needle object indicated by the needle object data Df and the position of the cloth object indicated by the cloth object data Dg. Specifically, the CPU 10 sets the position of the current working area relative to the cloth object such that the position of the needle object is the central position of the current working area. Then, the CPU 10 sets the shape and the direction of the current working area so as to substantially coincide with the shape and the direction of the range of the virtual world displayed on the LCD 61.

Referring back to FIG. 19, after the object setting process in step 83 described above, the CPU 10 sets parameters concerning the virtual cameras, to thereby update the virtual camera data Dp (step 84), and ends the process of this subroutine. For example, a terminal game image and a monitor game image are generated as, for example, three-dimensional CG images obtained by calculating a game space viewed from the virtual cameras placed in the virtual world. As an example, the first virtual camera for generating a terminal game image is placed at a position directly above and close to the needle object in the virtual world. Then, the attitude of the first virtual camera is set such that the vertical direction in the virtual world is the direction of the line of sight of the first virtual camera, and the virtual world reference direction is the up direction of the first virtual camera. Further, the second virtual camera for generating a monitor game image is set in the same virtual world where the first virtual camera is set, the second virtual camera placed in a fixed manner at a position directly above and far from the cloth object placed in the virtual world. Then, the attitude of the second virtual camera is set such that the vertical direction in the virtual world is the direction of the line of sight of the second virtual camera, and the up direction of the second virtual camera (i.e., the direction of roll about the direction of the line of sight) is set in accordance with the operation indication direction. For example, in the examples shown in FIGS. 11A, 12A, and 13A, the attitude of the second virtual camera is set such that the forward direction of the needle object is the up direction of the second virtual camera. A terminal game image and a monitor game image are game images of the virtual world that are thus viewed from different points of view. This causes the game images of the virtual world viewed from the different points of view to be displayed on the LCD 61 and the monitor 2.

Referring back to FIG. 18, after the game control process in step 44, the CPU 10 and the GPU 32 generate a monitor game image to be displayed on the monitor 2 (step 45), and proceed to the subsequent step. For example, the CPU 10 and the GPU 32 read from the main memory the data indicating the result of the game control process performed in step 44, and read from the VRAM 34 the data used to generate a monitor game image. Then, the CPU 10 and the GPU 32 generate a game image using the read data, and store the generated monitor game image in the VRAM 34. Any monitor game image may be generated by any method so long as the monitor game image represents the result of the game control process performed in step 44. For example, the monitor game image may be a three-dimensional CG image generated by the steps of: placing the second virtual camera in the virtual world on the basis of the parameters concerning the second virtual camera that are indicated by the virtual camera data Dp; placing in the virtual world the cloth object, on which the needle object, the sewn line, and the current working area are drawn, on the basis of the needle object data Df, the cloth object data Dg, the sewn line data Dh, and the current working area data Di; and calculating the virtual world viewed from the second virtual camera. Specifically, the CPU 10 draws the sewn line and the current working area on the cloth object (or the current working area may be drawn outside the cloth object) on the basis of the sewn line data Dh and the current working area data Di. Then, the CPU 10 places the needle object and the cloth object in the virtual world on the basis of the positions and the directions indicated by the needle object data Df and the cloth object data Dg.

Next, the CPU 10 and the GPU 32 generate a terminal game image to be displayed on the terminal apparatus 6 (step 46), and proceed to the subsequent step. For example, the CPU 10 and the GPU 32 read from the main memory the data indicating the result of the game control process performed in step 44, and read from the VRAM 34 the data used to generate a terminal game image. Then, the CPU 10 and the GPU 32 generate a terminal game image using the read data, and store the generated terminal game image in the VRAM 34. Similarly to the monitor game image, any terminal game image may be generated by any method so long as the terminal game image represents the result of the game control process performed in step 44. Further, the terminal game image may be generated by the same method as, or a different method from, that for the monitor game image. For example, the terminal game image may be a three-dimensional CG image generated as a virtual world image by the steps of: placing the first virtual camera in the virtual world on the basis of the parameters concerning the first virtual camera that are indicated by the virtual camera data Dp; placing the needle object and the cloth object in the virtual world as in step 45 described above; and calculating the virtual world viewed from the first virtual camera.

Next, the CPU 10 generates a monitor game sound to be output to the loudspeakers 2a of the monitor 2 (step 47), and proceeds to the subsequent step. For example, the CPU 10 causes the DSP 33 to generate a monitor game sound to be output from the loudspeakers 2a, in accordance with the result of the game control process performed in step 44. As an example, the CPU 10 causes the DSP 33 to generate a monitor game sound in which BGM or the like to be output from the monitor 2 is added to the action sounds of the objects, sound effects, and the like that are supposed to be heard on the basis of the position of the second virtual camera in the virtual world set in accordance with the result of the game control process in step 44.

Next, the CPU 10 generates a terminal game sound to be output to the loudspeakers 607 of the terminal apparatus 6 (step 48), and proceeds to the subsequent step. For example, the CPU 10 causes the DSP 33 to generate a terminal game sound to be output from the loudspeakers 607, in accordance with the result of the game control process performed in step 44. As an example, the CPU 10 causes the DSP 33 to generate a terminal game sound in which BGM or the like to be output from the terminal apparatus 6 is added to the action sounds of the objects, sound effects, and the like that are supposed to be heard on the basis of the position of the first virtual camera in the virtual world set in accordance with the result of the game control process in step 44. The terminal game sound may be the same as, or different from, the monitor game sound. Alternatively, the terminal game sound may be partially different from the monitor game sound (e.g., the terminal game sound and the monitor game sound include the same BGM and different sound effects). It should be noted that when the monitor game sound and the terminal game sound are the same, the terminal game sound generation step in step 48 may not need to be performed.

Next, the CPU 10 outputs the monitor game image and the monitor game sound to the monitor 2 (step 49), and proceeds to the subsequent step. For example, the CPU 10 transmits to the AV-IC 15 the data of the monitor game image stored in the VRAM 34 and the data of the monitor game sound generated by the DSP 33. In response to this, the AV-IC 15 transmits the data of the monitor game image and the data of the monitor game sound to the monitor 2 through the AV connector 16. This causes the monitor game image to be displayed on the monitor 2, and causes the monitor game sound to be output from the loudspeakers 2a.

Next, the CPU 10 transmits the terminal game image and the terminal game sound to the terminal apparatus 6 (step 50), and proceeds to the subsequent step. For example, the CPU 10 transmits to the codec LSI 27 the data of the terminal game image stored in the VRAM 34 and the data of the terminal game sound generated by the DSP 33. The codec LSI 27 performs a predetermined compression process on the transmitted data. The compressed data of the terminal game image and the compressed data of the terminal game sound are transmitted from the codec LSI 27 to the terminal communication module 28, and then transmitted from the terminal communication module 28 to the terminal apparatus 6 via the antenna 29. The data of the terminal game image and the data of the terminal game sound that have been transmitted from the game apparatus body 5 are received by the wireless module 610 of the terminal apparatus 6, and are subjected to a predetermined decompression process by the codec LSI 606. Then, the decompressed data of the terminal game image is output to the LCD 61, and the decompressed data of the terminal game sound is output to the sound IC 608. This causes the terminal game image to be displayed on the LCD 61, and causes the terminal game sound to be output from the loudspeakers 607.

Next, the CPU 10 determines whether or not the game is to be ended (step 51). Conditions for ending the game may be, for example: that particular conditions have been satisfied so that the game is over, or the game is completed; or that the user has performed an operation for ending the game. When the game is not to be ended, the CPU 10 returns to step 42 and repeats the same processing. On the other hand, when the game is to be ended, the CPU 10 ends the processing of the flow chart. Thereafter, the series of processes 42 through 51 is repeatedly performed until the CPU 10 determines in step 51 that the game is to be ended.

The processing described above makes it possible to control a plurality of objects (the needle object and the cloth object) in the virtual world by the operation based on the attitude and the motion of the terminal apparatus 6, the touch operation performed on the touch panel 62 of the terminal apparatus 6, and the operation based on the load applied to the board-type controller 9. For example, it is possible to control a first object (the needle object) so as to rotate in the virtual world by the operation based on the attitude and the motion of the terminal apparatus 6, and it is also possible to control a second object (the cloth object) so as to move in the virtual world by the drag operation performed on the touch panel 62, or the operation based on the load applied to the board-type controller 9. As described above, the processing described above makes it possible to, when a plurality of objects appear in a virtual world, vary the operations of the user to be performed on the objects.

In addition, the processing described above causes the needle object to be displayed on the LCD 61 so as to rotate relative to the cloth object in the opposite direction, as a result of the user roll-rotating the terminal apparatus 6 on the table. Further, display is performed on the LCD 61 such that the cloth object moves so as to follow the touch operation performed on the touch panel 62. This achieves information processing of simulating sewing having verisimilitude as if, while handling the terminal apparatus 6 like a piece of cloth to be sewn with a sewing machine, moving the piece of cloth to be sewn with the sewing machine, by performing the touch operation.

In addition, in the exemplary game described above, the cloth object moves in the backward direction of the needle object in accordance with the action taken by the user on the board-type controller 9. That is, the user is provided, by an image displayed on the LCD 61, with a feeling as if operating a sewing machine, and is also provided with an operation feeling as if stepping on the pedal of the sewing machine themselves. This makes it possible to achieve information processing of simulating sewing having verisimilitude as if performing sewing work with a sewing machine, using the terminal apparatus 6 and the board-type controller 9.

In addition, in the exemplary game described above, the game image displayed on the LCD 61 of the terminal apparatus 6 and the game image displayed on the monitor 2 are images both representing the state of the same virtual world, but are images different from each other in the point of view toward the virtual world and in the range. This enables the user to view the virtual world displayed on the two display screens in different fields of view and different display ranges, and therefore enables the user to appropriately view a suitable game image depending on the state of the game. Further, the exemplary game described above enables the user to perform an operation by moving the terminal apparatus 6 on the table, to thereby change the direction of the needle object in accordance with the attitude and the position of the terminal apparatus 6 in real space, and also change an image displayed on the LCD 61 in accordance with the change. This makes it possible to provide a sense of presence in the virtual world to the user viewing an image displayed on the LCD 61 while moving the terminal apparatus 6. On the other hand, viewing only an image displayed on the LCD 61 may make it difficult to understand the position relative to the entire virtual world and the circumstance of the needle object. The display of the virtual world in a relatively wide range on the monitor 2 can solve such a problem.

It should be noted that in the exemplary game described above, the second virtual camera for generating an image of the virtual world to be displayed on the monitor 2 is set so as to rotate in accordance with the direction of the needle object. Alternatively, the second virtual camera may be set so as to be fixed in the virtual world.

In addition, in the examples shown in FIGS. 10A, 11A, 12A, 13A, and 15A, the needle object is not displayed on the monitor 2 by way of example. Alternatively, the needle object may be displayed on the monitor 2 so as to be placed on the cloth object. For example, the second virtual camera may be placed in the virtual world, and the needle object and the cloth object may be placed in the virtual world. Then, a virtual world image to be displayed on the monitor 2 may be generated on the basis of a three-dimensional CG image obtained by calculating the virtual world viewed from the first virtual camera, whereby it is possible to display on the monitor 2 an image of the virtual world in which the needle object is also displayed.

In addition, during the period when the cloth object is being sewn by the needle object, vibration may be provided to the terminal apparatus 6. As described above, the terminal apparatus 6 includes the vibrator 619, and therefore, vibration can be provided to the terminal apparatus 6 in accordance with control data transmitted from the game apparatus body 5. For example, when the sewing speed calculated in the process of step 132 described above is greater than 0, the CPU 10 sets the cycle and the magnitude of vibration to be provided to the terminal apparatus 6 in accordance with the magnitude of the sewing speed. Then, in step 50 described above, the CPU 10 generates control data indicating the set vibration, and transmits the control data to the terminal apparatus 6, and thereby can provide the vibration based on the sewing speed to the terminal apparatus 6. During the period when the cloth object is being sewn by the needle object, the vibration based on the sewing speed may thus be provided to the terminal apparatus 6, whereby it is possible to provide the user with a feeling as if vibration to be generated when a piece of cloth is sewn with a sewing machine is generated in the terminal apparatus 6.

In addition, in the above embodiment, on the LCD 61 and the monitor 2, three-dimensional CG images or the like are displayed that are obtained by calculating a game space viewed from the virtual cameras. Alternatively, images of the virtual world generated by another type of image processing may be displayed on the LCD 61 and the monitor 2. For example, two-dimensional virtual world images in each of which the needle object and the cloth object are represented as two-dimensional images may be displayed on the LCD 61 and the monitor 2.

In addition, the game system 1 allows the user to perform various games using the terminal apparatus 6 and the board-type controller 9 as operation means. The terminal apparatus 6 can be used as a controller that allows the user to provide an input by an operation based on the motion of the body of the terminal apparatus 6, a touch operation, a button operation, or the like, while it can be used as a portable display or a second display. Accordingly, the game system 1 achieves a wide range of games. That is, the terminal apparatus 6 functions as an operation device as well as a display apparatus, and therefore, there may be a game system in which the terminal apparatus 6 is used as display means while the monitor 2 and the controller 7 are not used, and the terminal apparatus 6 and the board-type controller 9 are used as operation means. Further, the terminal apparatus 6 functions as an operation device as well as a display apparatus, and therefore, there may be a game system in which the terminal apparatus 6 is used as display means while the monitor 2, the board-type controller 9, and the controller 7 are not used, and the terminal apparatus 6 is used as operation means.

In addition, in the exemplary embodiment, the terminal apparatus 6 functions as a so-called thin client terminal, which does not perform game processing. In the exemplary embodiment, however, at least a part of the series of steps in the game processing to be performed by the game apparatus body 5 may be performed by the terminal apparatus 6. As an example, the terminal game image generation process may be performed by the terminal apparatus 6. As another example, all the series of steps in the game processing to be performed by the game apparatus body 5 may be performed by the terminal apparatus 6. In this case, the terminal apparatus 6 functions as a processing device that performs the steps in the game processing, as well as a display apparatus, and therefore, there may be a game system in which: the terminal apparatus 6 is used as display means while the monitor 2, the game apparatus body 5, and the controller 7 are not used; the board-type controller 9 is used as operation means; and the terminal apparatus 6 is used as processing means. In this game system, only the terminal apparatus 6 and the board-type controller 9 are connected wirelessly or wired, and board operation data is transmitted from the board-type controller 9 to the terminal apparatus 6, thereby achieving various games. Further, it is needless to say that when the board-type controller 9 is not used either, the terminal apparatus 6 may be used as display means, operation means, and processing means.

In addition, in the above embodiment, attitude data (e.g., at least one piece of data output from the magnetic sensor 602, the acceleration sensor 603, and the gyro sensor 604) used to calculate the attitude and/or the motion of the terminal apparatus 6 (including the position and the attitude per se, or changes in the position and the attitude) is output from the terminal apparatus 6 to the game apparatus body 5, and the attitude and/or the motion of the terminal apparatus 6 are calculated by the information processing performed by the game apparatus body 5. The attitude and/or the motion of the terminal apparatus 6 to be calculated by the game apparatus body 5, however, may be calculated by the terminal apparatus 6. In this case, the data indicating the attitude and/or the motion of the terminal apparatus 6 that have been calculated by the terminal apparatus 6 (i.e., data indicating the position and the attitude per se of the terminal apparatus 6, or changes in the position and the attitude that have been calculated using the attitude data) is output from the terminal apparatus 6 to the game apparatus body 5, and the data is used in the information processing performed by the game apparatus body 5.

In addition, in the above descriptions, the terminal apparatus 6 and the game apparatus body 5 are connected by wireless communication, and the board-type controller 9 and the game apparatus body 5 are connected by wireless communication. Alternatively, wireless communication between devices may be performed in a manner other than the above. As a first example, the terminal apparatus 6 functions as a relay device for another wireless communication. In this case, board operation data of the board-type controller 9 is wirelessly transmitted to the terminal apparatus 6, and the terminal apparatus 6 wirelessly transmits, to the game apparatus body 5, terminal operation data of the terminal apparatus 6 together with the received board operation data. In this case, while the terminal apparatus 6 and the game apparatus body 5 are directly connected by wireless communication, the board-type controller 9 is connected to the game apparatus body 5 via the terminal apparatus 6 by wireless communication. As a second example, the board-type controller 9 functions as a relay device for another wireless communication. In this case, terminal operation data of the terminal apparatus 6 is wirelessly transmitted to the board-type controller 9, and the board-type controller 9 wirelessly transmits, to the game apparatus body 5, board operation data of the board-type controller 9 together with the received terminal operation data. In this case, the board-type controller 9 and the game apparatus body 5 are directly connected by wireless communication, while the terminal apparatus 6 is connected to the game apparatus body 5 via the board-type controller 9 by wireless communication.

In addition, the terminal apparatus 6 and/or the board-type controller 9 may be electrically connected to the game apparatus body 5 via cables. In this case, the cables connected to the terminal apparatus 6 and/or the board-type controller 9 are connected to a connection terminal of the game apparatus body 5. As a first example, the terminal apparatus 6 and the game apparatus body 5 are electrically connected via a first cable, and the board-type controller 9 and the game apparatus body 5 are electrically connected via a second cable. As a second example, the terminal apparatus 6 and the game apparatus body 5 are electrically connected via a cable. In this case, board operation data of the board-type controller 9 may be wirelessly transmitted to the terminal apparatus 6 and then transmitted to the game apparatus body 5 via the cable. As a third example, the board-type controller 9 and the game apparatus body 5 are electrically connected via a cable. In this case, terminal operation data of the terminal apparatus 6 may be wirelessly transmitted to the board-type controller 9 and then transmitted to the game apparatus body 5 via the cable. Alternatively, terminal operation data of the terminal apparatus 6 may be wirelessly transmitted to the game apparatus body 5 directly from the terminal apparatus 6.

In addition, in the exemplary embodiment, the game system 1 includes one terminal apparatus 6 and one board-type controller 9. Alternatively, the game system 1 may be configured to include a plurality of terminal apparatuses 6 and a plurality of board-type controllers 9. That is, the game apparatus body 5 may be capable of wirelessly communicating with each terminal apparatus 6 and each type controller 9, and may transmit game image data, game sound data, and control data to each terminal apparatus, and receive terminal operation data, camera image data, microphone sound data, and board operation data from each terminal apparatus 6 and each board-type controller 9. When the game apparatus body 5 wirelessly communicates with the plurality of terminal apparatuses 6 and the plurality of board-type controllers 9, the game apparatus body 5 may perform the wireless communication in a time division manner or in a frequency division manner.

As described above, when the game system 1 includes a plurality of terminal apparatuses 6 and a plurality of board-type controllers 9, a plurality of users are allowed to play more games. For example, when the game system 1 includes two pairs of terminal apparatuses 6 and board-type controllers 9, two users are allowed to play a game simultaneously. Further, when the game system 1 includes two pairs of terminal apparatuses 6 and board-type controllers 9, the game system 1 includes three display apparatuses, and therefore can generate game images for three users to be displayed on the respective display apparatuses.

In addition, in the above descriptions, a plurality of load sensors 94 are provided in the board-type controller 9. Information of the position of the center of gravity of a load applied to the board-type controller 9, however, is not used in the above processing. Thus, two load sensors 94 may be provided in the board-type controller 9, one in the front portion and the other in the back portion. Further, when the sewing process is performed in accordance with the load applied to the board-type controller 9 (e.g., in accordance with the presence or absence of a load, or the value of a load) without distinguishing between the front portion and the back portion of the board-type controller 9, at least one load sensor 94 may be provided in the board-type controller 9.

In addition, the exemplary embodiment is described using the stationary game apparatus 3. The exemplary embodiment, however, may be achieved by executing the information processing program according to the exemplary embodiment with an information processing apparatus such as a hand-held game apparatus or a general personal computer. Further, in another embodiment, the exemplary embodiment may be applied not only to a game apparatus but also to a given hand-held electronic device (e.g., a PDA (Personal Digital Assistant) or a mobile telephone), a personal computer, a camera, and the like. Any device may be connected to the terminal apparatus 6 and the board-type controller 9 wirelessly or wired, whereby the exemplary embodiment can be achieved.

In addition, in the above descriptions, the game processing is performed by the game apparatus body 5. At least a part of the processing steps in the game processing, however, may be performed by another apparatus provided outside the game system 1. For example, when the game apparatus body 5 is configured to communicate with another apparatus (e.g., a server or another game apparatus), the processing steps in the game processing may be performed by the game apparatus body 5 in combination with said another apparatus. As an example, said another apparatus performs the process of setting an object, a virtual world, and the like, and data concerning the motion and the attitude of the object is transmitted from the game apparatus body 5 to said another apparatus, whereby the game processing is performed. Then, image data indicating the virtual world generated by said other apparatus is transmitted to the game apparatus body 5, and the virtual world is displayed on the monitor 2 and the LCD 61. At least a part of the processing steps in the game processing is thus performed by another apparatus, whereby the same processing as the game processing is achieved. It should be noted that at least a part of the processing steps in the information processing may be performed by the board-type controller 9 (the microcomputer 100). Further, the above game processing can be performed by one processor or by a cooperation of a plurality of processors, the one processor or the plurality of processors included in an information processing system including at least one information processing apparatus. Further, in the exemplary embodiment, the processes shown in the above flow charts are performed as a result of the CPU 10 of the game apparatus body 5 executing a predetermined program. Alternatively, a part or all of the processes may be performed by a dedicated circuit included in the game apparatus body 5.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

In addition, the shape of the game apparatus body 5 described above, the shapes of the terminal apparatus 6, the controller 7, and the board-type controller 9, and the shapes, the number, the placement, or the like of the various operation buttons and sensors are merely illustrative, and the exemplary embodiment can be achieved with other shapes, numbers, placements, and the like. Further, the processing orders, the setting values, the display forms, the criterion values, and the like that are used in the information processing described above are also merely illustrative, and it is needless to say that the exemplary embodiment can be achieved with other orders, display forms, and values.

In addition, the information processing program described above may be supplied to the game apparatus body 5 not only from an external storage medium such as the optical disk 4, but also via a wireless or wired communication link. Further, the information processing program may be stored in advance in a nonvolatile storage device of the game apparatus body 5. It should be noted that examples of an information storage medium for storing the information processing program may include a CD-ROM, a DVD, given another optical disk storage medium similar to these, a flexible disk, a hard disk, a magnetic optical disk, and a magnetic tape, as well as a nonvolatile memory. Furthermore, the information storage medium for storing the information processing program may be a nonvolatile semiconductor memory or a volatile memory. Such storage media can be defined as storage media readable by a computer or the like. For example, a computer or the like is caused to read and execute programs stored in each of the storage media, and thereby can be caused to provide the various functions described above.

While some exemplary systems, exemplary methods, exemplary devices, and exemplary apparatuses have been described in detail, the foregoing description is in all aspects illustrative and not restrictive. It is understood that numerous other modifications and variations can be devised without departing from the spirit and scope of the appended claims. It is understood that the scope of the exemplary embodiment should be interpreted only by the scope of the appended claims. It is also understood that one skilled in the art can implement the exemplary embodiment in the equivalent range on the basis of the description of the exemplary embodiment and common technical knowledge, from the description of the specific embodiments. It should be understood that when used in the present specification, components and the like described in singular form with the words "a" and "an" before them do not exclude the plurality of these components. Furthermore, it should be understood that terms used in the present specification have meanings generally used in the art unless otherwise specified. Therefore, unless otherwise defined, all the jargons and technical terms have the same meanings as those generally understood by one skilled in the art of the exemplary embodiment. In the event of any contradiction, the present specification (including meanings defined herein) has priority.

A storage medium having stored thereon an information processing program, an information processing apparatus, an information processing system, and an information processing method according to the exemplary embodiment are capable of, when a plurality of objects appear in a virtual world, varying the operations of a user to be performed on the objects, and therefore are suitable for use as an information processing program, an information processing apparatus, an information processing system, and an information processing method that perform, for example, a process of controlling objects on the basis of the operations of a user.

What is claimed is:

1. A non-transitory computer-readable storage medium storing an information processing program to be executed by a computer of an information processing apparatus capable of displaying an image on a portable display apparatus that outputs at least body state data based on an attitude and/or a motion of the portable display apparatus body and touch position data based on a touch position on a touch panel provided in the portable display apparatus, the information processing program, when executed, causing the computer to provide comprising:

calculating the attitude and/or the motion of the portable display apparatus on the basis of the body state data;

controlling, on the basis of the calculated attitude and/or motion of the portable display apparatus, an action of a first object without causing a second object to perform an action, the first object and the second object placed in a virtual world;

controlling, on the basis of the touch position data, an action of the second object without causing the first object to perform an action, the first object and the second object placed in the virtual world;

generating a first image including at least a part of the first object and at least a part of the second object; and displaying the first image on the portable display apparatus, if a motion of rotation of the portable display apparatus is calculated, the action of the first object is controlled so that the first object rotates relative to a display screen of the portable display apparatus, and the action of the second object is controlled so that the second object does not rotate relative to the display screen of the portable display apparatus.

2. The non-transitory computer-readable storage medium having stored thereon the information processing program according to claim 1, wherein the action of the first object is controlled on the basis of the attitude and/or the motion of the portable display apparatus such that the first object rotates, and the action of the second object is controlled on the basis of the touch position data such that the second object moves.

3. The non-transitory computer-readable storage medium having stored thereon the information processing program according to claim 2, wherein the action of the first object is controlled such that the first object rotates relative to the second object, and the action of the second object is controlled such that the second object moves relative to the first object.

4. The non-transitory computer-readable storage medium having stored thereon the information processing program according to claim 2, the information processing program further causing the computer to provide execution comprising:

acquiring data based on a load applied to a load detection device, wherein the second object is controlled on the basis of the acquired data so as to move in a moving direction defined by a direction of the first object.

5. The non-transitory computer-readable storage medium having stored thereon the information processing program according to claim 4, wherein only when the touch position data indicates that a touch operation is not being performed on the touch panel, the second object is controlled on the basis of the acquired data so as to move.

6. The non-transitory computer-readable storage medium having stored thereon the information processing program according to claim 2, the information processing program further causing the computer to provide execution comprising:

calculating, on the basis of the touch position data, a displacement of the touch position input to the touch panel, wherein the second object is controlled on the basis of the displacement of the touch position so as to move.

7. The non-transitory computer-readable storage medium having stored thereon the information processing program according to claim 6, wherein a moving direction in which the second object is to be caused to move is calculated on the basis of a direction of the displacement of the touch position, and the second object is controlled so as to move in the moving direction.

8. The non-transitory computer-readable storage medium having stored thereon the information processing program according to claim 7, wherein a direction corresponding to the direction of the displacement and included in the virtual world displayed so as to overlap the displacement of the touch position is calculated as the moving direction, and the second object is controlled so as to move in the moving direction.

9. The non-transitory computer-readable storage medium having stored thereon the information processing program according to claim 6, wherein a moving distance at which the second object is to be caused to move is calculated on the basis of an amount of the displacement of the touch position, and the second object is controlled so as to move at the moving distance.

10. The non-transitory computer-readable storage medium having stored thereon the information processing program according to claim 9, wherein a distance corresponding to the amount of the displacement and included in the virtual world displayed so as to overlap the displacement of the touch position is calculated as the moving distance, and the second object is controlled so as to move at the moving distance.

11. The non-transitory computer-readable storage medium having stored thereon the information processing program according to claim 1, wherein at least an attitude and/or a motion of the portable display apparatus that are obtained by rotating the portable display apparatus about a perspective direction of, and perpendicular to, a display screen of the portable display apparatus are calculated, and the action of the first object is controlled in accordance with the attitude and/or the motion of the portable display apparatus that are obtained by rotating the portable display apparatus about the perspective direction.

12. The non-transitory computer-readable storage medium having stored thereon the information processing program according to claim 11, wherein the action of the first object is controlled such that in accordance with a direction of rotation in which the portable display apparatus rotates about the perspective direction, the first object rotates or moves about a predetermined direction set in the virtual world and in a direction opposite to the direction of rotation.

13. The non-transitory computer-readable storage medium having stored thereon the information processing program according to claim 11, wherein the action of the first object is controlled such that the first object rotates or moves in accordance with an angle by which a facing direction of the portable display apparatus body changes about the perspective direction.

14. The non-transitory computer-readable storage medium having stored thereon the information processing program according to claim 13, wherein the action of the first object is controlled such that the first object rotates or moves by the same angle as the angle by which the facing direction of the portable display apparatus body changes.

15. The non-transitory computer-readable storage medium having stored thereon the information processing program according to claim 11, wherein the action of the first object is controlled such that in accordance with the attitude and/or the motion of the portable display apparatus that are obtained by rotating the portable display apparatus about the perspective direction, the first object rotates or moves about a predetermined direction set in the virtual world.

16. The non-transitory computer-readable storage medium having stored thereon the information processing program according to claim 11, wherein the action of the first object is controlled such that on the basis of the attitude and/or the motion of the portable display apparatus with respect to a direction of gravity in real space, and in accordance with the attitude and/or the motion of the portable display apparatus that are obtained by rotating the portable display apparatus about the perspective direction, the first object rotates or moves about a direction of gravity set in the virtual world.

17. The non-transitory computer-readable storage medium having stored thereon the information processing program according to claim 11, wherein the action of the first object is controlled such that in accordance with a direction of rotation and an angle of rotation in and by which the portable display apparatus rotates about the perspective direction, the first object rotates about a predetermined direction in the virtual world in a direction opposite to the direction of rotation and by the angle of rotation, and when the touch position data indicates an operation of dragging the touch panel, the action of the second object is controlled such that in accordance with a moving direction and a moving distance of the touch position in the virtual world displayed on the display screen so as to overlap the touch position indicated by the touch position data, the second object moves along a plane perpendicular to the predetermined direction in the virtual world in the moving direction and at the moving distance.

18. The non-transitory computer-readable storage medium having stored thereon the information processing program according to claim 2, the information processing program further causing the computer to provide execution comprising:

setting a first virtual camera for generating the first image, and control an attitude and/or a position of the first virtual camera on the basis of the calculated attitude and/or motion of the portable display apparatus, wherein at least an attitude and/or a motion of the portable display apparatus that are obtained by rotating the portable display apparatus about a perspective direction of, and perpendicular to, a display screen of the portable display apparatus are calculated, the action of the first object is controlled such that in accordance with a direction of rotation and an angle of rotation in and by which the portable display apparatus rotates about the perspective direction, the first object rotates about a direction of a line of sight of the first virtual camera in the direction of rotation and by the angle of rotation, the attitude of the first virtual camera is controlled such that in accordance with the direction of rotation and the angle of rotation in and by which the portable display apparatus rotates about the perspective direction, the first virtual camera rotates about the direction of the line of sight in the direction of rotation and by the angle of rotation, when the touch position data indicates an operation of dragging the touch panel, the action of the second object is controlled such that in accordance with a moving direction and a moving distance of the touch position in the virtual world displayed on the display screen so as to overlap the touch position indicated by the touch position data, the second object moves along a plane perpendicular to the direction of the line of sight in the virtual world in a direction opposite to the moving direction and at the moving distance, and when the touch position data indicates the operation of dragging the touch panel, the position of the first virtual camera is controlled such that in accordance with the moving direction and the moving distance of the touch position in the virtual world displayed on the display screen so as to overlap the touch position indicated by the touch position data, the first virtual camera moves along the plane perpendicular to the direction of the line of sight in the virtual world in the direction opposite to the moving direction and at the moving distance.

19. The non-transitory computer-readable storage medium having stored thereon the information processing program according to claim 1, wherein the portable display apparatus includes at least one of a gyro sensor and an acceleration sensor, and the attitude and/or the motion of the portable display apparatus are calculated on the basis of data output from the at least one of the gyro sensor and the acceleration sensor.

20. The non-transitory computer-readable storage medium having stored thereon the information processing program according to claim 1, wherein image data indicating the first image is output to the portable display apparatus, the portable display apparatus includes an image data acquisition device that acquires the image data output from the information processing apparatus, and a display screen of the portable display apparatus displays the first image indicated by the acquired image data.

21. The non-transitory computer-readable storage medium having stored thereon the information processing program according to claim 20, the information processing program further causing the computer to provide execution comprising:

generating compression image data by compressing the image data indicating the first image, wherein the generated compression image data is output to the portable display apparatus, the image data acquisition device acquires the compression image data output from the information processing apparatus, the portable display apparatus further includes a display image decompression device that decompresses the compression image data to obtain the image data indicating the first image, and the display screen of the portable display apparatus displays the first image indicated by the image data that has been acquired by the image data acquisition device and has been decompressed by the display image decompression device.

22. The non-transitory computer-readable storage medium having stored thereon the information processing program according to claim 1, wherein besides the first image, a second image representing the virtual world is further displayed on another display apparatus connected to the information processing apparatus.

23. The non-transitory computer-readable storage medium having stored thereon the information processing program according to claim 22, the information processing program further causing the computer to provide execution comprising:

generating compression image data by compressing the image data indicating the first image, wherein the generated compression image data is output to the portable display apparatus, and, besides the compression image data, image data indicating the second image is output to said another display apparatus without being compressed, and the portable display apparatus configured to:
acquire the compression image data output from the information processing apparatus; and
decompress the compression image data to obtain the image data indicating the first image, wherein
a display screen of the portable display apparatus displays the first image indicated by the acquired and decompressed image data.

24. The non-transitory computer-readable storage medium having stored thereon the information processing program according to claim 22, wherein an image including at least a part of the first object and at least a part of the second object in the virtual world viewed from a point of view different from a point of view toward the virtual world for generating the first image is displayed as the second image on said another display apparatus.

25. The non-transitory computer-readable storage medium having stored thereon the information processing program according to claim 22, wherein a point of view toward the virtual world for generating the second image is set at a position further away from the first object or the second object than a point of view toward the virtual world for generating the first image is from the first object or the second object, and a range wider than a range of the virtual world represented by the first image is displayed as the second image on said another display apparatus.

26. The non-transitory computer-readable storage medium having stored thereon the information processing program according to claim 22, wherein a point of view for generating the second image is set at a position of viewing from a bird's-eye view the first object and the second object in the virtual world, and an image obtained by viewing from a bird's-eye view at least a part of the first object placed in the virtual world and at least a part of the second object placed in the virtual world is displayed as the second image on said another display apparatus.

27. The non-transitory computer-readable storage medium having stored thereon the information processing program according to claim 22, the information processing program further causing the computer to provide execution comprising:

setting a second virtual camera for generating the second image, and control an attitude and/or a position of the second virtual camera, wherein the attitude of the second virtual camera is controlled such that in accordance with a direction of rotation and an angle of rotation in and by which the portable display apparatus rotates about a perspective direction of, and perpendicular to, a display screen of the portable display apparatus and which are calculated on the basis of the body state data, the second virtual camera rotates about a direction of a line of sight in a direction opposite to the direction of rotation and by the angle of rotation.

28. An information processing apparatus comprising processing circuitry having at least one processor, the information processing apparatus capable of displaying an image on a portable display apparatus that outputs at least body state data based on an attitude and/or a motion of the portable display apparatus body and touch position data based on a touch position on a touch panel provided in the portable display apparatus, the processing circuitry controlling the information processing apparatus to:

calculate the attitude and/or the motion of the portable display apparatus on the basis of the body state data;

control, on the basis of the calculated attitude and/or motion of the portable display apparatus, an action of a first object without causing a second object to perform an action, the first object and the second object placed in a virtual world;

control, on the basis of the touch position data, an action of the second object without causing the first object to perform an action, the first object and the second object placed in the virtual world;

generate a first image including at least a part of the first object and at least a part of the second object; and display the first image on the portable display apparatus, if a motion of rotation of the portable display apparatus is calculated, the action of the first object is controlled so that the first object rotates relative to a display screen of the portable display apparatus, and the action of the second object is controlled so that the second object does not rotate relative to the display screen of the portable display apparatus.

29. An information processing system including a plurality of apparatuses configured to communicate with each other, the information processing system capable of displaying an image on a portable display apparatus that outputs at least body state data based on an attitude and/or a motion of the portable display apparatus body and touch position data based on a touch position on a touch panel provided in the portable display apparatus, the information processing system comprising:

a processing system having at least one processor, the processing system configured to:
calculate the attitude and/or the motion of the portable display apparatus on the basis of the body state data;
control, on the basis of the calculated attitude and/or motion of the portable display apparatus, an action of a first object without causing a second object to perform an action, the first object and the second object placed in a virtual world;
control, on the basis of the touch position data, an action of the second object without causing the first object to perform an action, the first object and the second object placed in the virtual world;

generate a first image including at least a part of the first object and at least a part of the second object; and display the first image on the portable display apparatus, if a motion of rotation of the portable display apparatus is calculated, the action of the first object is controlled so that the first object rotates relative to a display screen of the portable display apparatus, and the action of the second object is controlled so that the second object does not rotate relative to the display screen of the portable display apparatus.

30. An image processing method performed by a processor or a cooperation of a plurality of processors included in an image processing system including at least one information processing apparatus capable of displaying an image on a portable display apparatus that outputs at least body state data based on an attitude and/or a motion of the portable display apparatus body and touch position data based on a touch position on a touch panel provided in the portable display apparatus, the information processing method comprising:

calculating the attitude and/or the motion of the portable display apparatus on the basis of the body state data;

controlling, on the basis of the calculated attitude and/or motion of the portable display apparatus, an action of a first object without causing a second object to perform an action, the first object and the second object placed in a virtual world;

controlling, on the basis of the touch position data, an action of the second object without causing the first object to perform an action, the first object and the second object placed in the virtual world;

generating a first image including at least a part of the first object and at least a part of the second object; and displaying the first image on the portable display apparatus, if a motion of rotation of the portable display apparatus is calculated, the action of the first object is controlled so that the first object rotates relative to a display screen of the portable display apparatus, and the action of the second object is controlled so that the second object does not rotate relative to the display screen of the portable display apparatus.

* * * * *